US011451833B2

(12) United States Patent
Kawai et al.

(10) Patent No.: US 11,451,833 B2
(45) Date of Patent: Sep. 20, 2022

(54) ENCODING DEVICE, ENCODING METHOD, DECODING DEVICE, AND DECODING METHOD

(71) Applicant: SONY CORPORATION, Tokyo (JP)

(72) Inventors: Takuro Kawai, Tokyo (JP); Kenichiro Hosokawa, Kanagawa (JP); Takafumi Morifuji, Tokyo (JP); Masaru Ikeda, Kanagawa (JP); Kenji Kondo, Tokyo (JP); Takahiro Nagano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 93 days.

(21) Appl. No.: 16/766,508

(22) PCT Filed: Nov. 16, 2018

(86) PCT No.: PCT/JP2018/042428
§ 371 (c)(1),
(2) Date: May 22, 2020

(87) PCT Pub. No.: WO2019/107182
PCT Pub. Date: Jun. 6, 2019

(65) Prior Publication Data
US 2020/0382812 A1 Dec. 3, 2020

(30) Foreign Application Priority Data
Dec. 1, 2017 (JP) .............................. JP2017-232061

(51) Int. Cl.
*H04N 19/80* (2014.01)
*H04N 19/182* (2014.01)
(Continued)

(52) U.S. Cl.
CPC ........... *H04N 19/80* (2014.11); *H04N 19/182* (2014.11); *H04N 19/184* (2014.11); *H04N 19/50* (2014.11)

(58) Field of Classification Search
CPC ....... H04N 19/80; H04N 19/86; H04N 19/182
See application file for complete search history.

(56) References Cited

U.S. PATENT DOCUMENTS 8,897,591 B2 * 11/2014 Wilkins ............... H04N 19/139
382/268
9,179,148 B2 * 11/2015 Li ......................... H04N 19/176
(Continued)

FOREIGN PATENT DOCUMENTS

CN 101578880 A 11/2009
JP 63-107319 A 5/1988
(Continued)

OTHER PUBLICATIONS

Algorithm description of JVET Test Model 7; 2017. (Year: 2017).*
(Continued)

*Primary Examiner* — Luis Perez-Fuentes
(74) *Attorney, Agent, or Firm* — Chip Law Group

(57) ABSTRACT

The present technology relates to an encoding device, an encoding method, a decoding device, and a decoding method that make it possible to accurately restore an image. The encoding device generates a filter image by performing, on a decoded image locally decoded, filter processing of applying a prediction equation including a second-order or higher higher-order term and performing a product-sum calculation of predetermined tap coefficients and pixels of the decoded image. Moreover, the encoding device encodes an original image by using the filter image. The decoding device decodes coded data included in an encoded bit stream by using a filter image, to generate a decoded image. Moreover, the decoding device generates the filter image by performing, on the decoded image, filter processing of
(Continued)

applying a prediction equation. The present technology can be applied to a case where encoding and decoding of an image are performed.

22 Claims, 31 Drawing Sheets

(51) Int. Cl.
*H04N 19/184* (2014.01)
*H04N 19/50* (2014.01)

(56) References Cited

U.S. PATENT DOCUMENTS

| | | | | |
|---|---|---|---|---|
| 9,924,191 | B2 * | 3/2018 | Chen | H04N 19/82 |
| 10,645,384 | B2 * | 5/2020 | Nishida | H04N 19/196 |
| 2013/0077884 | A1 * | 3/2013 | Ikai | H04N 19/86 382/233 |
| 2014/0086501 | A1 * | 3/2014 | Ikeda | H04N 19/182 382/233 |
| 2015/0242999 | A1 * | 8/2015 | Ikai | G06T 5/003 382/260 |
| 2017/0238020 | A1 * | 8/2017 | Karczewicz | H04N 19/176 375/240.29 |
| 2019/0104308 | A1 * | 4/2019 | Nishida | H04N 19/82 |
| 2019/0124327 | A1 * | 4/2019 | Kawai | H04N 19/14 |
| 2019/0268594 | A1 * | 8/2019 | Lim | H04N 19/122 |
| 2020/0021832 | A1 * | 1/2020 | Kawai | H04N 19/61 |
| 2020/0204799 | A1 * | 6/2020 | Lee | H04N 19/11 |
| 2021/0136364 | A1 * | 5/2021 | Ko | H04N 19/80 |

FOREIGN PATENT DOCUMENTS

| | | |
|---|---|---|
| JP | 2001-285881 A | 10/2001 |
| JP | 2003-299096 A | 10/2003 |
| WO | 2010/076856 A1 | 7/2010 |
| WO | 2017/191750 A1 | 11/2017 |

OTHER PUBLICATIONS

Transform-Domain In-Loop Filter with Block similarity for HEVC; Zhang—2016. (Year: 2016).*
Improvement of adaptive loop filters; Karczewicz—2016. (Year: 2016).*
Geometry transformation based adaptive In-loop filters; Karczewicz—2016. (Year: 2016).*
Chen,Y Yu, et al., "Decoder-Derived Adaptive Intra Prediction", Joint Collaborative Team on Video Coding of ISO/IEC JTC1/SC29/WG11 and ITU-T SG.16, JCT-VC meeting 2, Geneva, Jul. 21-28, 2010, pp. 1-6.
Karczewicz, et al., "Geometry Transformation-based Adaptive In-Loop Filter", IEEE Picture Coding Symposium (PCS), 2016, 5 pages.
Chen, et al., "Algorithm Description of Joint Exploration Test Model 7 (JEM7)", Joint Video Exploration Team (JVET) of ITU-T SG 16 WP 3 and ISO/IEC JTC 1/SC 29/WG 11, 7th Meeting, Torino, Jul. 13-12, 2017, pp. 1-46.
International Search Report and Written Opinion of PCT Application No. PCT/JP2018/042428, dated Feb. 5, 2019, 09 pages of ISRWO.
Office Action for CN Patent Application No. 201880076051.9, dated Nov. 19, 2021, 12 pages of English Translation and 11 pages of Office Action.
Tabus, et al., "Context Coding of Depth Map Images Under the Piecewise-Constant Image Model Representation", IEEE Transactions on Image Processing, vol. 22, Issue 11, Jun. 26, 2013, pp. 4195-4210.
Wang, et al., "Objective Evaluation and Analysis of HEVC, H.264 Encoded/Decoded Image Quality Based on UHD" , Radio and Television Information, Apr. 15, 2016.

* cited by examiner

FIG. 2

| NUMBER OF PREDICTION TAPS (N1, N2) | NUMBER OF FIRST-ORDER COEFFICIENTS N1' | NUMBER OF SECOND-ORDER COEFFICIENTS N2' |
|---|---|---|
| 41 | 41 | 861 |
| 25 | 25 | 325 |
| 13 | 13 | 91 |
| 5 | 5 | 15 |

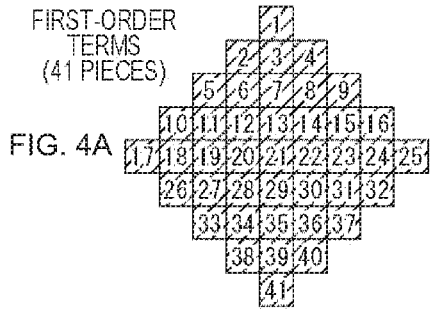
FIG. 4A
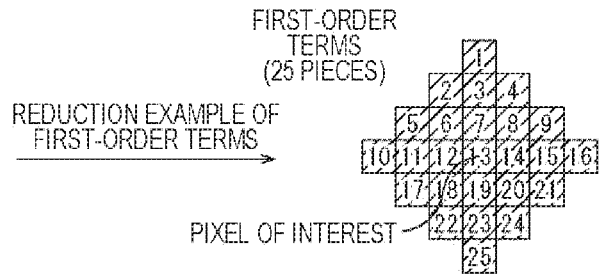
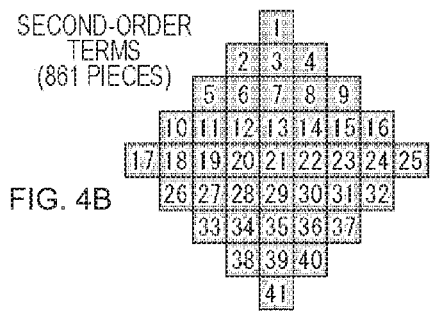
FIG. 4B
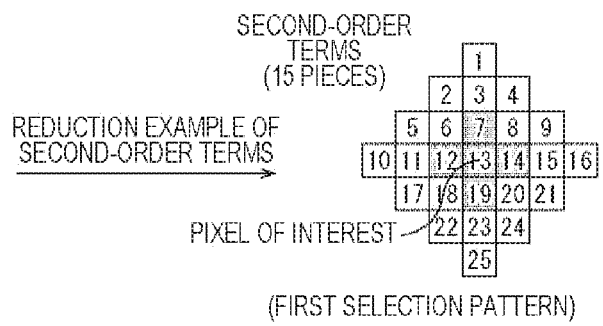
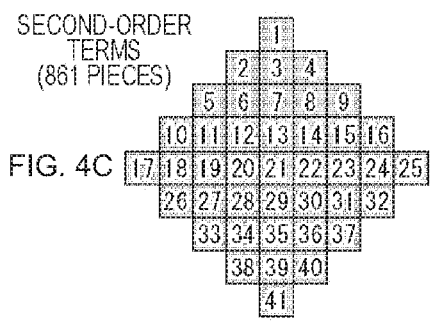
FIG. 4C
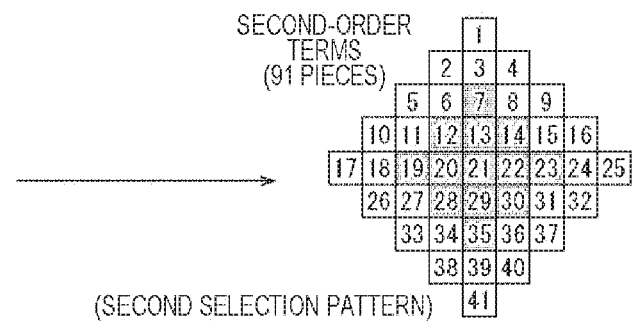
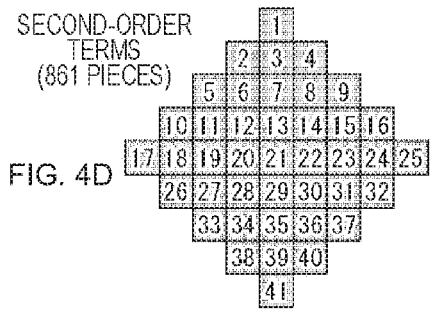
FIG. 4D
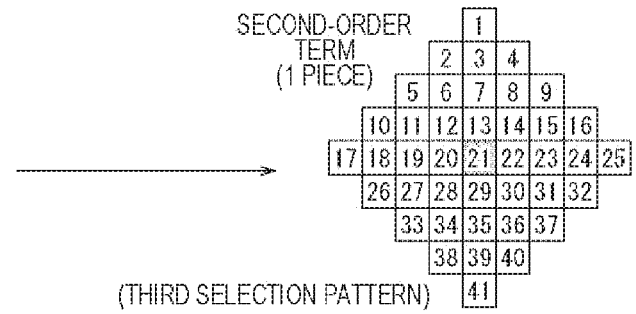

○ : PREDICTION TAP
• : PREDICTION TAP SQUARED
— : COMBINATION OF PREDICTION TAPS (PRODUCT)

SECOND-ORDER TERMS (15 PIECES)

PIXEL OF INTEREST

SECOND-ORDER TERMS (9 PIECES)

SECOND-ORDER TERMS (5 PIECES)

SECOND-ORDER TERMS (5 PIECES)

FIG. 6

| SECOND-ORDER TERM SELECTION PATTERN | NUMBER OF FIRST-ORDER COEFFICIENTS (FIRST-ORDER TERMS) | | NUMBER OF SECOND-ORDER COEFFICIENTS (SECOND-ORDER TERMS) | | NUMBER OF TAP COEFFICIENTS OF ONE CLASS (TOTAL NUMBER) |
|---|---|---|---|---|---|
| REFERENCE CASE | 41 | (diamond tap pattern) | | | 41 |
| CASE WHERE ALL COMBINATIONS PREDICTION EQUATION IS USED | 41 | (diamond tap pattern) | 861 | (diamond tap pattern) | 902 |
| SELECTION PATTERN 1 | 25 | (diamond tap pattern) | 15 | (diagram) | 40 |
| SELECTION PATTERN 2 | 25 | (diamond tap pattern) | 9 | (diagram) | 34 |
| SELECTION PATTERN 3 | 25 | (diamond tap pattern) | 5 | (diagram) | 30 |
| SELECTION PATTERN 4 | 25 | (diamond tap pattern) | 5 | (diagram) | 30 |

○ : PREDICTION TAP
⊙ : PREDICTION TAP SQUARED
— : COMBINATION OF PREDICTION TAPS (PRODUCT)

ENCODING DEVICE, ENCODING METHOD, DECODING DEVICE, AND DECODING METHOD

CROSS REFERENCE TO RELATED APPLICATIONS

This application is a U.S. National Phase of International Patent Application No. PCT/JP2018/042428 filed on Nov. 16, 2018, which claims priority benefit of Japanese Patent Application No. JP 2017-232061 filed in the Japan Patent Office on Dec. 1, 2017. Each of the above-referenced applications is hereby incorporated herein by reference in its entirety.

TECHNICAL FIELD

The present technology relates to an encoding device, an encoding method, a decoding device, and a decoding method, and in particular relates to, for example, an encoding device, an encoding method, a decoding device, and a decoding method that make it possible to accurately restore an image.

BACKGROUND ART

Work is underway to start standardization of Future Video Coding (FVC) as a successor standard of High Efficiency Video Coding (HEVC), and a bilateral filter and an adaptive loop filter have been studied as an In Loop Filter (ILF) used for encoding and decoding of an image, in addition to a deblocking filter and an adaptive offset filter (for example, see Non-Patent Document 1).

Furthermore, a Geometry Adaptive Loop Filter (GALF) has been devised as a filter that improves the existing adaptive loop filter (for example, see Non-Patent Document 2).

CITATION LIST

Non-Patent Document

Non-Patent Document 1: Algorithm description of Joint Exploration Test Model 7 (JEM7), 2017-08-19
Non-Patent Document 2: Marta Karczewicz, Li Zhang, Wei-Jung Chien, Xiang Li, "Geometry transformation-based adaptive in-loop filter", IEEE Picture Coding Symposium (PCS), 2016.

SUMMARY OF THE INVENTION

Problems to be Solved by the Invention

In the adaptive loop filter devised at present, restoration accuracy of a portion degraded due to encoding in an image is not sufficient, and devising is requested of an in-loop filter having higher restoration accuracy.

The present technology has been made in view of such a situation, and it is intended to make it possible to accurately restore an image.

Solutions to Problems

A decoding device of the present technology is a decoding device including: a decoding unit that decodes coded data included in an encoded bit stream by using a filter image, to generate a decoded image; and a filter unit that generates the filter image by performing, on the decoded image generated by the decoding unit, filter processing of applying a prediction equation including a second-order or higher higher-order term and performing a product-sum calculation of predetermined tap coefficients and pixels of the decoded image.

A decoding method of the present technology is a decoding method including: decoding coded data included in an encoded bit stream by using a filter image, to generate a decoded image; and generating the filter image by performing, on the decoded image, filter processing of applying a prediction equation including a second-order or higher higher-order term and performing a product-sum calculation of predetermined tap coefficients and pixels of the decoded image.

In the decoding device and the decoding method of the present technology, the coded data included in the encoded bit stream is decoded by using the filter image, and the decoded image is generated. Furthermore, the decoded image is subjected to the filter processing of applying the prediction equation including the second-order or higher higher-order term and performing the product-sum calculation of the predetermined tap coefficients and the pixels of the decoded image, and the filter image is generated.

An encoding device of the present technology is an encoding device including: a filter unit that generates a filter image by performing, on a decoded image locally decoded, filter processing of applying a prediction equation including a second-order or higher higher-order term and performing a product-sum calculation of predetermined tap coefficients and pixels of the decoded image; and an encoding unit that encodes an original image by using the filter image generated by the filter unit.

An encoding method of the present technology is an encoding method including: generating a filter image by performing, on a decoded image locally decoded, filter processing of applying a prediction equation including a second-order or higher higher-order term and performing a product-sum calculation of predetermined tap coefficients and pixels of the decoded image; and encoding an original image by using the filter image.

In the encoding device and the encoding method of the present technology, the decoded image locally decoded is subjected to the filter processing of applying the prediction equation including the second-order or higher higher-order term and performing the product-sum calculation of the predetermined tap coefficients and the pixels of the decoded image, and the filter image is generated. Then, the original image is encoded by using the filter image.

Note that, the encoding device and the decoding device each may be an independent device or an internal block included in one device.

Furthermore, the encoding device and the decoding device can be implemented by causing a computer to execute a program. The program can be provided by being transmitted via a transmission medium or by being recorded on a recording medium.

Effects of the Invention

According to the present technology, an image can be accurately restored.

Note that, the effect described here is not necessarily limited, and can be any effect described in the present disclosure.

BRIEF DESCRIPTION OF DRAWINGS

FIG. 2 is a diagram illustrating a relationship between the number of prediction taps and the number of tap coefficients in an all combinations prediction equation.

FIGS. 4A, 4B, 4C, and 4D are diagrams illustrating examples of a second-order term selection pattern for selecting a second-order term of a reduced prediction equation from second-order terms of the all combinations prediction equation.

FIG. 6 is a diagram illustrating still other examples of the second-order term selection pattern for selecting the second-order term of the reduced prediction equation from the second-order terms of the all combinations prediction equation.

MODE FOR CARRYING OUT THE INVENTION

Figure 1:
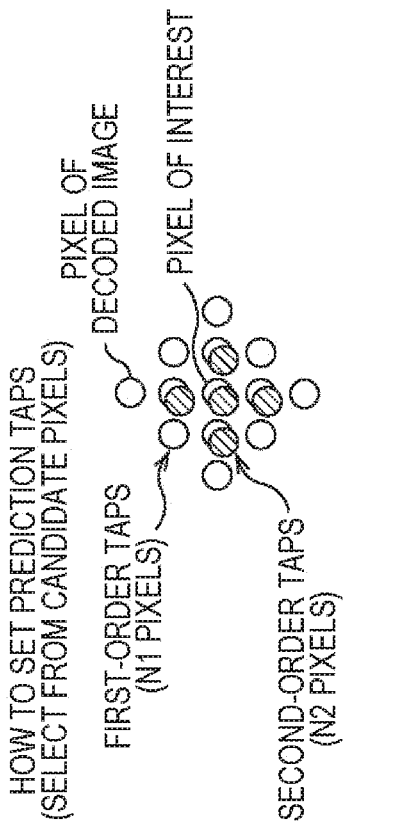
FIGS. 1A and 1B are diagrams illustrating an example of filter processing as prediction processing that predicts an original image for a decoded image from the decoded image subjected to encoding and decoding, by using a higher-order prediction equation.

<Document and the Like that Support Technical Contents and Technical Terms>

The scope disclosed in the present application includes not only the contents described in the present specification and the drawings, but also the contents described in the following documents known at the time of filing.

Document 1: AVC standard ("Advanced video coding for generic audiovisual services", ITU-T H.264 (April 2017))

Document 2: HEVC standard ("High efficiency video coding", ITU-T H.265 (December 2016))

Document 3: FVC Algorithm reference (Algorithm description of Joint Exploration Test Model 7 (JEM7), 2017 Aug. 19)

That is, the contents described in the above documents are also the basis for determining the support requirements. For example, even in a case where there is no direct description, in an embodiment, of Quad-Tree Block Structure described in Document 1, Quad Tree Plus Binary Tree (QTBT) or Block Structure described in Document 3, it is within the scope of the disclosure of the present technology and satisfies the support requirements of the claims. Furthermore, similarly, also even in a case where there is no direct description, in the embodiment, of technical terms, for example, parsing, syntax, semantics, and the like, it is within the scope of the disclosure of the present technology and satisfies the support requirements of the claims.

Furthermore, in the present specification, "block" (not a block indicating a processing unit) used for description as a partial area or a unit of processing of an image (picture) indicates an arbitrary partial area in a picture, unless otherwise specified, and the size, shape, characteristics, and the like are not limited. For example, the "block" includes arbitrary partial areas (units of processing) such as the transform block (TB), transform unit (TU), prediction block (PB) prediction unit (PU), smallest coding unit (SCU), coding unit (CU), largest coding unit (LCU), coding tree block (CTB), coding tree unit (CTU), transformation block, sub-block, macroblock, tile, or slice described in Documents 1 to 3 mentioned above.

Furthermore, in specification of the size of such a block, the block size may not only be directly specified, but also be specified indirectly. For example, the block size may be specified by using identification information for identifying the size. Furthermore, for example, the block size may be specified by a ratio to or a difference from the size of a reference block (for example, the LCU, the SCU, and the like). For example, in a case where information for specifying the block size is transmitted as a syntax element or the like, the information for indirectly specifying the size as described above may be used as the information. By doing so, the amount of information can be reduced, and the coding efficiency can be improved in some cases. Furthermore, the specification of the block size also includes specification of a block size range (for example, specification of an allowable block size range, or the like).

Definition

In this application, the following terms are defined as follows.

A prediction equation is a polynomial that predicts a second image from a first image. Each term of the prediction equation that is a polynomial includes products of one tap coefficient and one or more prediction taps, and thus the prediction equation is Equation for performing a product-sum calculation of tap coefficients and prediction taps. Representing the i-th pixel (expected tap) (pixel value thereof) used for prediction among pixels of the first image as $x_i$, the i-th tap coefficient as $w_i$, and a pixel (predicted value of a pixel value thereof) of the second image as y', and adopting a polynomial including only a first-order term as the prediction equation, the prediction equation is represented by Equation $y'=\Sigma w_i x_i$. In Equation $y'=\Sigma w_i x_i$, $\Sigma$ represents a summation for i. The tap coefficient $w_i$ included in the prediction equation is obtained by learning to statistically minimize an error y'−y of the value y' obtained by the prediction equation with respect to a true value y. As a learning method for obtaining the tap coefficients, there is a least squares method. In the learning to obtain the tap coefficients, a normal equation is obtained by performing addition of each term included in the normal equation, by using a student image that is a student of the learning and corresponds to the first image to which the prediction equation is applied, and a teacher image that is a teacher of the learning and corresponds to the second image desired to be obtained as a result of applying the prediction equation to the first image, and the tap coefficients are obtained by solving the normal equation.

Prediction processing is processing of applying a prediction equation to the first image to predict the second image, and in the present technology, in the prediction processing, the predicted value of the second image is obtained by performing a product-sum calculation of the prediction equation by using the pixels (pixel values thereof) of the first image. It can be said that performing the product-sum calculation by using the first image is filter processing of applying a filter to the first image, and it can be said that the prediction processing of performing the product-sum calculation of the prediction equation by using the first image is a kind of the filter processing.

A filter image means an image obtained as a result of the filter processing. The second image (predicted value thereof) obtained from the first image by the filter processing as the prediction processing is a filter image.

The tap coefficient is a coefficient included in each term of a polynomial that is a prediction equation, and corresponds to a filter coefficient by which a signal to be filtered is multiplied at a tap of a digital filter.

The prediction tap is a pixel (pixel value thereof) used for calculation of a prediction equation, and is multiplied by a tap coefficient in the prediction equation.

A higher-order term is a term including a product of two or more prediction taps (pixels as the prediction taps).

A higher-order prediction equation is a prediction equation including a higher-order term, in other words, a prediction equation including a first-order term and a second-order or higher higher-order term, or a prediction equation including only a second-order or higher higher-order term.

A D-th-order term is a term including a product of D prediction taps among terms included in a polynomial as a prediction equation. For example, the first-order term is a term including one prediction tap, and the second-order term is a term including a product of two tap coefficients.

A D-th-order coefficient means a tap coefficient included in the D-th-order term.

A D-th-order tap means a prediction tap (pixel as the prediction tap) included in the D-th-order term. There is a case where a certain pixel is a D-th-order tap, and is a D'-th-order tap different from the D-th-order tap. Furthermore, a tap structure of the D-th-order tap and a tap structure of the D'-th-order tap different from the D-th-order tap do not have to be the same as each other. Here, the tap structure means an arrangement of pixels as prediction taps.

An all combinations prediction equation is a higher-order prediction equation that uses all candidate pixels predetermined as candidates for pixels to be prediction taps for a pixel of interest, as prediction taps, and includes a term of a product of D pixels (pixel values thereof) of each of all combinations for selecting D pixels from the (candidate) pixels as the prediction taps while allowing overlap, as a D-th-order term (D>=2).

A reduced prediction equation is a higher-order prediction equation including some terms selected from the all combinations prediction equation.

Volumeization means approximating tap coefficients included in a prediction equation with a polynomial, in other words, obtaining coefficients (seed coefficients) included in the polynomial. In the volumeization, when a polynomial approximating a tap coefficient w is referred to as a coefficient prediction equation, the coefficient prediction equation includes a term using a seed coefficient $\beta_m$ and a parameter z, and is represented by, for example, Equation $w=\Sigma \beta_m z^{m-1}$. In Equation $w=\Sigma \beta^m z^{m-1}$, $\Sigma$ represents a summation for m, and the seed coefficient $\beta_m$ represents the m-th coefficient of the coefficient prediction equation. Note that, when the m-th seed coefficient of a coefficient prediction equation for obtaining the i-th tap coefficient $w_i$ is represented as $\beta_{m,i}$, the coefficient prediction equation for obtaining the i-th tap coefficient $w_i$ is represented by Equation $w_i=\Sigma \beta_{m,i} z^{m-1}$.

The seed coefficient means a coefficient of a coefficient prediction equation used for volumeization. The seed coefficient can be obtained by learning similar to the learning to obtain the tap coefficient.

Coded data is data obtained by encoding an image, and is data obtained by, for example, quantizing an image (residual thereof) by performing orthogonal transform.

An encoded bit stream is a bit stream including coded data, and includes encoding information regarding encoding as necessary. The encoding information includes at least information necessary for decoding the coded data, in other words, for example, QP that is a quantization parameter in a case where quantization is performed in encoding, a motion vector in a case where predictive encoding (motion compensation) is performed, or the like.

<Overview of the Present Technology>

FIGS. 1A and 1B are diagrams illustrating an example of filter processing as prediction processing that predicts an original image for a decoded image from the decoded image subjected to encoding and decoding (including local decoding), by using a higher-order prediction equation.

In an adaptive loop filter, filter processing is performed using a prediction equation including only a first-order term; however, in such filter processing, there is a case where a small amplitude portion of a pixel value expressing details of the original image degraded by encoding cannot be sufficiently restored.

In an ILF of the present technology, by performing filter processing using a higher-order prediction equation including a higher-order term, a luminance (waveform) fluctuation slightly remaining as a portion corresponding to the detail of the original image is effectively amplified, in the decoded image, and the original image is therefore accurately restored including the details of the original image.

As the higher-order prediction equation, any polynomial can be adopted if it is a polynomial including products, as terms, of one tap coefficient and one or more pixels (pixel values thereof) as prediction taps, and including a higher-order term. In other words, as the higher-order prediction equation, it is possible to adopt, for example, a polynomial including only a first-order term and a second-order term, a polynomial including a first-order term and higher-order terms of a plurality of different orders of the second-order or higher, a polynomial including higher-order terms of one or a plurality of orders of the second-order or higher, and the like.

However, in the following, to simplify the description, a case will be described in which the polynomial including only the first-order term and the second-order term is adopted as the higher-order prediction equation.

Such a higher-order polynomial can be represented by Equation (1).

[Expression 1]

$$y' = \sum_{i=1}^{N1} w_i x_i + \sum_{j=1}^{N2} \left( \sum_{k=j}^{N2} w_{j,k} x_k \right) x_j \quad (1)$$

Here, in Equation (1), y' represents a predicted value of a corresponding pixel (pixel value thereof) that is a pixel of the original image corresponding to a pixel of interest among pixels of the decoded image. N1 represents the number of pixels $x_i$ as first-order taps among the prediction taps, and the number of first-order coefficients $w_i$ among the tap coefficients. The i-th first-order coefficient among the tap coefficients is represented by $w_i$. The pixel (pixel value thereof) as the i-th first-order tap among the prediction taps is represented by $x_i$.

Furthermore, in Equation (1), N2 represents the number of pixels $x_j$ ($x_k$) as second-order taps among the prediction taps, and the number of second-order coefficients $w_{j,k}$ among the tap coefficients. The j×k-th second-order coefficient among the tap coefficients is represented by $w_{j,k}$. Pixels as the j-th and k-th second-order taps among the prediction taps are represented by $x_j$ and $x_k$, respectively (k>=j).

Note that, here, for the description of Equation (1), the first-order tap is represented by $x_i$, and the second-order taps are represented by $x_j$ and $x_k$, but hereinafter, the first-order tap and the second-order tap are not particularly distinguished from each other by a suffix attached to x. In other words, for example, regardless of the first-order tap or the second-order tap, the first-order tap $x_i$, the second-order tap $x_j$, the prediction tap $x_j$, or the like is described by using $x_i$. The same applies to the first-order coefficient $w_i$ and the second-order coefficient $w_{j,k}$ that are the tap coefficients.

As illustrated in FIG. 1A, in Equation (1), wixi represents the first-order term, and wj,kxkxj represents the second-order term. Thus, the higher-order prediction equation of Equation (1) is a polynomial including only the first-order term and the second-order term.

Now, a higher-order prediction equation that uses all candidate pixels predetermined as candidates for pixels to be prediction taps, as prediction taps, and includes a term of a product of D pixels (pixel values thereof) of each of all combinations for selecting D pixels from the candidate pixels while allowing overlap, as a D-th-order term, is referred to as an all combinations prediction equation.

The higher-order prediction equation of Equation (1) is the all combinations prediction equation in a case where the number of candidate pixels of the first-order tap is N1 and the number of candidate pixels of the second-order tap is N2.

In a case where the number of pixels as the first-order taps is N1, the number of first-order terms N1' in the all combinations prediction equation is equal to the number of first-order taps N1. In a case where the number of pixels as the second-order taps is N2, the number of second-order terms N2' in the all combinations prediction equation is represented by Equation (2).

[Expression 2]

$$N2' = (N2+1) \times \text{floor}\left(\frac{N2}{2}\right) + \text{ceil}\left(\frac{N2}{2}\right) \quad (2)$$

In Equation (2), floor represents rounding down, and ceil represents rounding up.

Note that, the number of second-order terms N2' in the all combinations prediction equation can be represented by Equation N2'=$_{N2}C_2$+N2, in addition to Equation (2). The number of combinations to select two from N2 without duplication is represented by $_{N2}C_2$.

In filter processing of applying a higher-order prediction equation to the decoded image, in other words, in obtaining the predicted value y' of the pixel value of the corresponding pixel of the original image corresponding to the pixel of interest of the decoded image, for example, by performing the product-sum calculation of the higher-order prediction equation of Equation (1), a prediction tap is selected from the pixels of the decoded image.

In FIG. 1B, examples are illustrated of the prediction taps, in other words, for example, the first-order taps and the second-order taps.

In FIG. 1B, the first-order taps are 13 pixels in a diamond shape with the pixel of interest as the center, and the second-order taps are five pixels in a diamond shape with the pixel of interest as the center. Thus, in FIG. 1B, the tap structure of the first-order taps and the tap structure of the second-order taps are different from each other. Moreover, among the 13 pixels that are the first-order taps, five pixels in a diamond shape with the pixel of interest as the center are also the second-order taps.

Here, in a case where the number of first-order taps N1 and the number of second-order taps N2 are equal to each other (N1=N2), in the all combinations prediction equation, a relationship between the number of first-order terms N1' and the number of second-order terms N2', in other words, a relationship between the number N1' of the first-order coefficients $w_i$ and the number N2' of the second-order coefficients $w_{j,k}$ is represented by an expression N1'<=N2'.

By performing filter processing of applying a prediction equation including a higher-order term, such as a higher-order prediction equation of Equation (1), to the decoded image, it is possible to accurately restore the details of the original image, which has been difficult with the prediction equation including only the first-order term.

Note that, the higher-order prediction equation can be applied to the currently devised adaptive loop filter and the like in addition to the ILF of the present technology.

Furthermore, the candidate pixels of the first-order taps and the candidate pixels of the second-order taps, or the tap structure of the first-order tap and the tap structure of the second-order tap may be the same as each other, or may be different from each other.

Moreover, learning to obtain the tap coefficients of the higher-order prediction equation (the first-order coefficient $w_i$ and the second-order coefficient $w_{j,k}$, and the like of Equation (1)) can be performed by obtaining a normal equation by performing addition of each term included in the normal equation based on the least squares method and solving the normal equation, similarly to the learning to obtain the tap coefficients of the prediction equation including only the first-order term.

Furthermore, the tap coefficients of the higher-order prediction equation can be volumeized and approximated by a polynomial. In volumeization of the tap coefficients of the higher-order prediction equation, for the order of the polynomial approximating the tap coefficients, the same value or different values can be adopted can be adopted between the first-order coefficient and the second-order coefficient among the tap coefficients.

Moreover, the tap coefficients included in the higher-order prediction equation can be obtained by real-time learning in an encoding device that encodes an image, and can be transmitted to a decoding device that decodes an image.

Furthermore, the tap coefficients included in the higher-order prediction equation can be obtained in advance by offline learning and preset in the encoding device and the decoding device.

Moreover, the tap coefficients included in the higher-order prediction equation can be obtained for each of a plurality of classes in learning. In this case, the filter processing can be performed by using a higher-order prediction equation including tap coefficients of a class of the pixel of interest obtained as a result of performing class classification of the pixel of interest. Note that, a case where the number of classes obtained by the class classification is one class is equivalent to not performing the class classification.

FIG. 2 is a diagram illustrating a relationship between the number of prediction taps and the number of tap coefficients in the all combinations prediction equation.

In other words, FIG. 2 illustrates a relationship between the number of first-order taps N1 and the number of first-order coefficients N1', and a relationship between the number of second-order taps N2 and the number of second-order coefficients N2', in the all combinations prediction equation.

In the all combinations prediction equation, the number of first-order coefficients N1' matches the number of first-order taps N1, and the number of second-order coefficients N2' increases exponentially with respect to the number of second-order taps N2.

Thus, in a case where the all combinations prediction equation is adopted as a higher-order prediction equation, the number of tap coefficients is enormous. As a result, in a case where the tap coefficients are transmitted from the encoding device to the decoding device, the coding efficiency is reduced, and in a case where the tap coefficients are preset in the encoding device and the decoding device, the storage capacity required for storing the tap coefficients increases.

Thus, in the present technology, the filter processing can be performed by using the reduced prediction equation that is a higher-order prediction equation including some terms selected from the all combinations prediction equation. In this case, it is possible to reduce the number of tap coefficients required for the filter processing, and suppress a decrease in coding efficiency, and an increase in storage capacity required for storing the tap coefficients.

Here, in the following, to simplify the description, regarding the decrease in the coding efficiency and the increase in the storage capacity required for storing the tap coefficients in the case where the all combinations prediction equation is adopted, only of the decrease in the coding efficiency will be mentioned.

Figure 3B:
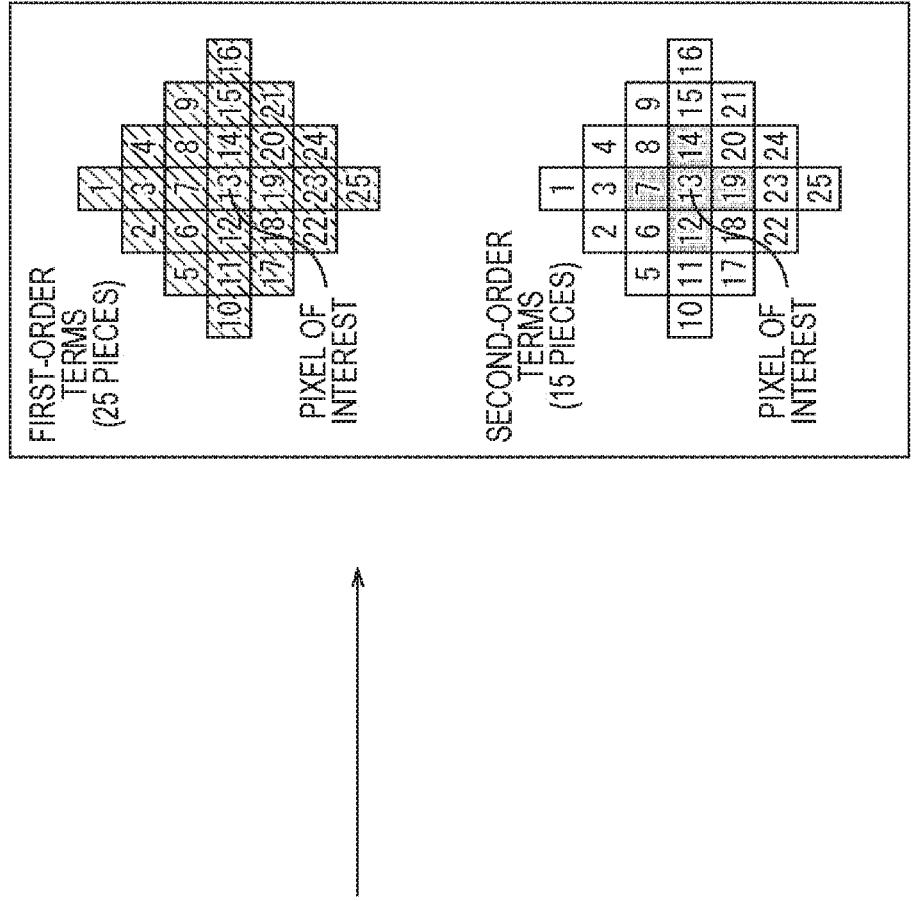
FIGS. 3A and 3B are diagrams illustrating an example of selection of some terms from the all combinations prediction equation.
Figure 3A:
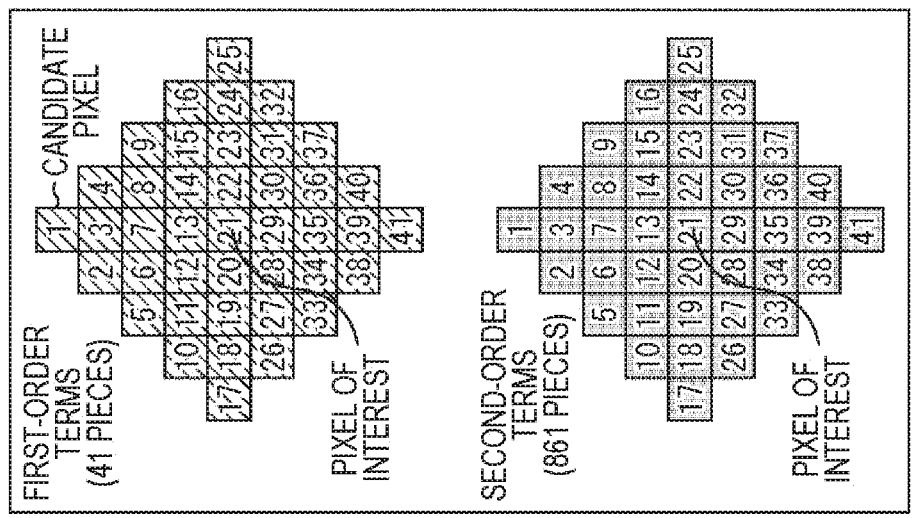

FIGS. 3A and 3B are diagrams illustrating an example of selection of some terms from the all combinations prediction equation.

Now, for example, it is assumed that 41 pixels in a diamond shape with a pixel of interest as the center are candidate pixels that can be selected as prediction taps (first-order taps and second-order taps).

For example, in a case where all 41 candidate pixels are adopted as prediction taps and a prediction equation is adopted of only the first-order terms of the 41 prediction taps, only 41 tap coefficients are required for one class. However, with the prediction equation using only the first-order term, there is a case where the details cannot be accurately restored of the original image degraded by encoding.

Here, the case where all 41 candidate pixels are adopted as prediction taps and a prediction equation is adopted of only the first-order terms of the 41 prediction taps is referred to as a reference case as a reference for comparison. Furthermore, in the following, to simplify the description, the description of classes will be omitted as appropriate. In other words, in the following, the description of the tap coefficient and the like is a description of the tap coefficient and the like for each class, unless otherwise specified.

For example, as illustrated in FIG. 3A, in a case where all 41 candidate pixels are adopted as prediction taps and a higher-order prediction equation is adopted including second-order term of the 41 prediction taps, in other words, for example, the all combinations prediction equation including only the first-order term and the second-order term of Equation (1), due to the effect of the second-order terms that are higher-order terms, the details can be accurately restored of the original image degraded by encoding as compared to the reference case.

Now, in a case where the tap coefficient is represented as A and the i-th pixel as the prediction tap is represented as $x_i$, the first-order term of the higher-order prediction equation is represented as $Ax_i$, and the second-order term of the higher-order prediction equation is represented by $Ax_i x_j$ ($i<=j$).

For example, in a case where predetermined candidate pixels are 41 pixels, the number of first-order terms of the all combinations prediction equation is 41 that is equal to the 41 candidate pixels, and the number of second-order terms of the all combinations prediction equation is $41 \times 40/2 + 41 = 861$ that is equal to the number of possible combinations (including combinations of the same pixels) of the 41 candidate pixels. In a case where the number of candidate pixels is 41, the 41 first-order terms of the all combinations prediction equation are represented by $Ax_1, Ax_2, \ldots, Ax_{41}$, and the 861 second-order terms of the all combinations prediction equation are represented by $Ax_1x_1, Ax_1x_2, \ldots, Ax_1x_{41}, Ax_2x_2, Ax_2x_3, \ldots, Ax_2x_{41}, \ldots, Ax_4x_{41}$.

In a case where all 41 candidate pixels are adopted as prediction taps and the all combinations prediction equation including the first-order term and the second-order term of the 41 prediction taps is adopted for filter processing, the tap coefficients of one class are 902 tap coefficients including 41 tap coefficients that are first-order term tap coefficients and 861 tap coefficients that are second-order term tap coefficients, and the number of tap coefficients, and thus the amount of data, is greatly increased as compared to the reference case, and the coding efficiency is degraded.

Thus, in the present technology, only a term having a large effect of image quality improvement is selected from terms included in the all combinations prediction equation, and is adopted in the higher-order prediction equation used for the filter processing, whereby a high-precision image is restored in which details of the original image is reflected, while the amount of data of the tap coefficient is suppressed.

Here, a higher-order prediction equation including some terms selected from the all combinations prediction equation is also referred to as a reduced prediction equation.

Among the terms (tap coefficients thereof) of the all combinations prediction equation, the term (tap coefficient thereof) of a pixel close to the pixel of interest tends to have a large effect of image quality improvement.

Thus, in the present technology, the term of the pixel (prediction tap) close to the pixel of interest among the terms of the all combinations prediction equation is adopted as the term of the reduced prediction equation.

In other words, in the present technology, for example, among the 41 first-order terms of the all combinations prediction equation using the 41 prediction taps, the first-order term of the pixel (prediction tap) close to the pixel of interest is selected, and is adopted as the first-order term of the reduced prediction equation. For example, selecting a candidate pixel close to the pixel of interest rather than all of the 41 candidate pixels as the first-order prediction tap corresponds to selecting the first-order term of the pixel close to the pixel of interest.

In a case where the first-order terms of the pixel close to the pixel of interest are selected as the first-order terms of the reduced prediction equation, the number of first-order term tap coefficients (first-order coefficients) is smaller than 41 of the reference case.

For example, as illustrated in FIG. 3B, among the first-order terms of 41 candidate pixels in a diamond shape, the first-order terms of 25 candidate pixels in a diamond shape with the pixel of interest as the center are selected as the first-order terms of the reduced prediction equation, whereby the number of first-order coefficients of the reduced prediction equation is less than that of the reference case by 16 (=41−25).

Similarly, in the present technology, for example, among the 861 second-order terms of the all combinations prediction equation using the 41 prediction taps, a second-order term of the pixel close to the pixel of interest is selected, and is adopted as a second-order term of the reduced prediction equation. For example, selecting a candidate pixel close to the pixel of interest rather than all of the 41 candidate pixels as the second-order prediction tap corresponds to selecting the second-order term of the pixel close to the pixel of interest.

In a case where the second-order term of the pixel close to the pixel of interest is selected as the second-order term of the reduced prediction equation, the number of second-order term tap coefficients (second-order coefficients) is smaller than 861 of the reference case.

For example, as illustrated in FIG. 3B, among the second-order terms of the 41 candidate pixels in a diamond shape, second-order terms of 5 candidate pixels in a cross shape with the pixel of interest as the center are selected as the second-order terms of the reduced prediction equation, whereby the number of second-order coefficients in the reduced prediction equation is 15 (=5×4/2+5) that is combinations of arbitrary two pixels of the five pixels (including combinations of the same two pixels), and is greatly decreased as compared to the reference case.

As described above, among the terms of the all combinations prediction equation using the 41 candidate pixels as the prediction taps, the term of the pixel close to the pixel of interest is selected and adopted as the term of the reduced prediction equation, whereby the number of first-order term tap coefficients is 25, and the number of second-order term tap coefficients is 15. Thus, the number of tap coefficients in one class is 40 obtained by adding the tap coefficients of the first-order term and the second-order term, and the amount of data of the tap coefficients can be reduced to almost the same amount as that of the reference case, and the coding efficiency can be improved. Moreover, due to the effect of the second-order coefficient (second-order term tap coefficients) of the reduced prediction equation, it is possible to accurately restore the details of the original image, which has been difficult with the first-order coefficient (first-order term tap coefficients).

Note that, as described above, the fact that the tap coefficients of one class are a total of 40 tap coefficients including 25 first-order term tap coefficients and 15 second-order term tap coefficients can be said that use (transmission capacity) of the second-order term tap coefficients is ensured by reducing the first-order term tap coefficients within a range of the 41 tap coefficients of the reference case.

The selection criteria for selecting a term having a large effect of image quality improvement to be adopted as the term of the reduced prediction equation from the terms included in the all combinations prediction equation, include a criterion based on the Rate-Distortion (RD) cost, a criterion based on the Peak signal-to-noise ratio (PSNR), a criterion based on the magnitude of the tap coefficient, a criterion based on the bit depth required to express the tap coefficient, and the like.

In the criterion based on the RD cost or the criterion based on the PSNR, for example, in filter processing using the all combinations prediction equation, in a case where there is an improvement in the RD cost or PSNR of greater than or equal to a threshold value than that in filter processing using the reduced prediction equation in which a certain term is deleted from the all combinations prediction equation, the term deleted from the all combinations prediction equation is selected as the term of the reduced prediction equation.

In the criterion based on the magnitude of the tap coefficient, for example, a term whose magnitude (absolute value) of the tap coefficient is greater than or equal to a predetermined threshold value is selected as the term of the reduced prediction equation.

In the criterion based on the bit depth required to express the tap coefficient, for example, a term whose bit depth required to express the tap coefficient, in other words, the number of significant digits (effective digit) when the tap coefficient is expressed by a binary number is greater than or equal to a threshold value is selected as the term of the reduced prediction equation.

Note that, in a case where R1 pieces of the first-order terms and R2 pieces of the second-order terms are selected as terms of the reduced prediction equation from the all combinations prediction equation, for example, in the criterion based on the bit depth required to express the tap coefficient, first-order terms whose bit depth required to express the tap coefficient is within top R1 places are selected from the first-order terms of the all combinations prediction equation, and the second-order terms whose bit depth required to express the tap coefficient is within top R2 places are selected from the second-order terms of the all combinations prediction equation. The same applies to the criterion based on the RD cost, the criterion based on the PSNR, and the criterion based on the magnitude of the tap coefficient.

Furthermore, in the selection of a term to be adopted in the reduced prediction equation from the terms included in the all combinations prediction equation, it is possible to determine, as a selection pattern of the term to be adopted in the reduced prediction equation, a selection pattern that balances the amount of decrease in PSNR and the amount of reduction in the amount of data of the tap coefficient with respect to the filter processing using the all combinations prediction equation, among all the selection patterns for selecting the term from the all combinations prediction equation, and the like, and select the term to be adopted in the reduced prediction equation in accordance with the selection pattern.

As described above, according to the filter processing using the reduced prediction equation including some terms selected from the all combinations prediction equation, the details of the original image degraded by the encoding can be accurately restored while the decrease in the coding efficiency is suppressed.

FIGS. 4A, 4B, 4C, and 4D are diagrams illustrating examples of the second-order term selection pattern for selecting the second-order term of the reduced prediction equation from the second-order terms of the all combinations prediction equation.

Note that, in the following, unless otherwise specified, as a first-order term selection pattern for selecting the first-order terms of the reduced prediction equation from the first-order terms of the all combinations prediction equation, for example, as illustrated in FIG. 4A, a pattern is fixedly adopted for selecting, as the first-order terms of the reduced prediction equation, the first-order terms of the pixels close to the pixel of interest among the first-order terms of the pixels as 41 prediction taps in a diamond shape, in other words, 25 pixels in a diamond shape with the pixel of interest as the center. In this case, the number of first-order term tap coefficients (first-order coefficients) is 25.

As a second-order term selection pattern, for example, as illustrated in FIG. 4B, a first selection pattern can be adopted for selecting, as the second-order terms of the reduced prediction equation, the second-order terms of five pixels in a diamond shape with the pixel of interest as the center among the second-order terms of the pixels as the 41 prediction taps in a diamond shape. The total number of second-order terms of the five pixels is 15 (=5×4/2+5).

Moreover, as the second-order term selection pattern, for example, as illustrated in FIG. 4C, a second selection pattern can be adopted for selecting, as the second-order terms of the reduced prediction equation, the second order terms of 13 pixels in a diamond shape with the pixel of interest as the center among the second-order terms of the pixels as the 41 prediction taps in a diamond shape. The total number of second-order terms of the 13 pixels is 91 (=13×12/2+13).

Furthermore, as the second-order term selection pattern, for example, as illustrated in FIG. 4D, a third selection pattern can be adopted for selecting, as the second-order terms of the reduced prediction equation, the second-order term of one pixel of the pixel of interest among the second-order terms of the pixels as the 41 prediction taps in a diamond shape. The total number of second-order terms of one pixel is one, that is, only the square term of the one pixel (pixel value thereof).

In the selection of the second-order terms of the reduced prediction equation, the selection patterns as described above can be fixedly adopted.

Furthermore, in the selection of the second-order term of the reduced prediction equation, it is possible to determine, as a selection pattern (hereinafter, also referred to as an adoption pattern) for a second-order term to be adopted in the reduced prediction equation, a selection pattern that balances the amount of decrease in PSNR and the amount of reduction in the amount of data of the tap coefficient with respect to the filter processing using the all combinations prediction equation, or a selection pattern that optimizes the coding efficiency (index thereof) such as the RD cost, among all the selection patterns for selecting the second-order term from the all combinations prediction equation, and select the second-order term to be adopted in the reduced prediction equation in accordance with the selection pattern.

Moreover, in the selection of the second-order term of the reduced prediction equation, as illustrated in FIGS. 4A, 4B, 4C, and 4D, it is possible to prepare a plurality of selection patterns such as the first to third selection patterns in advance as the selection pattern for selecting the second-order term from the all combinations prediction equation, and from among the plurality of selection patterns prepared in advance, determine, as the adoption pattern, the selection pattern that balances the amount of decrease in PSNR and the amount of reduction in the amount of data of the tap coefficient with respect to the filter processing using the all combinations prediction equation, or the selection pattern that optimizes the coding efficiency, and select the second-order term to be adopted in the reduced prediction equation in accordance with the adoption pattern (selection pattern determined as the adoption pattern).

Note that, regarding the selection of the first-order term and the second-order term to be adopted in the reduced prediction equation, the selection pattern for performing selection is fixed for each of the first-order term and the second-order term, and in the encoding device and the decoding device, filter processing can be performed using the reduced prediction equation including the first-order term and the second-order term selected in accordance with the fixed selection pattern.

Moreover, regarding the selection of the first-order term and the second-order term to be adopted in the reduced prediction equation, it is possible to prepare the plurality of selection patterns in advance as selection patterns for selecting the first-order term and the second-order term, and associate each selection pattern with encoding information such as QP of an image whose coding efficiency tends to be improved when the selection pattern is selected. Then, in the encoding device and the decoding device, it is possible to determine a selection pattern associated with encoding information as an adoption pattern depending on the encoding information such as QP of the decoded image (original image therefor), and select the first-order term and the second-order term to be adopted in the reduced prediction equation in accordance with the adoption pattern.

Furthermore, regarding the selection of the first-order term and the second-order term to be adopted in the reduced prediction equation, it is possible to prepare the plurality of selection patterns in advance as selection patterns for selecting the first-order term and the second-order term. Then, in the encoding device, it is possible to determine, for example, as an adoption pattern, a selection pattern that optimizes the coding efficiency among the plurality of selection patterns, and select the first-order term and the second-order term to be adopted in the reduced prediction equation in accordance with the adoption pattern. Moreover, in this case, in the encoding device, selection information representing the adoption pattern (the selection pattern determined as the adoption pattern) can be transmitted to the decoding device, and in the decoding device, the first-order term and the second-order term to be adopted in the reduced prediction equation can be selected in accordance with the adoption pattern represented by the selection information from the encoding device.

As described above, a method of preparing a plurality of selection patterns and determining an adoption pattern (selection pattern to be the adoption pattern) from among the plurality of selection patterns depending on encoding information and coding efficiency, can also be applied to a case where the selection pattern of the first-order term of the reduced prediction equation is fixed and a plurality of selection patterns is prepared only for the second-order term.

FIGS. 5A, 5B, 5C, and 5D are diagrams illustrating other examples of the second-order term selection pattern for selecting the second-order term of the reduced prediction equation from the second-order terms of the all combinations prediction equation.

Here, in FIGS. 5A, 5B, 5C, and 5D, circles represent pixels as prediction taps. Furthermore, black dots in the circles represent the square of the pixel (second-order term thereof) as the prediction tap represented by the circle, and a line connecting two different circles represents the product of the pixels (second-order term thereof) as prediction taps respectively represented by the two circles.

Figure 5A:
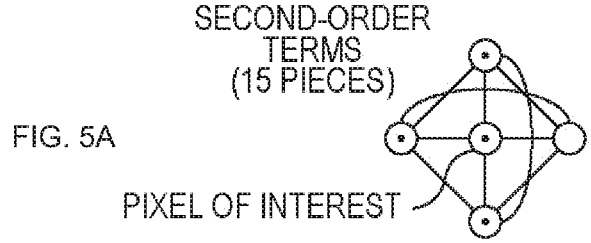
FIGS. 5A, 5B, 5C, and 5D are diagrams illustrating other examples of the second-order term selection pattern for selecting the second-order term of the reduced prediction equation from the second-order terms of the all combinations prediction equation.

For example, in a case where five pixels in a diamond shape (cross shape) including a pixel of interest and four pixels adjacent to the top, bottom, left, and right thereof are adopted as second-order taps, as the second-order term selection pattern, as illustrated in FIG. 5A, a pattern can be adopted for selecting a total of 15 second-order terms including 5 second-order terms that are the squares of the respective five pixels in a diamond shape and 10 second-order terms that are 10 combinations (products thereof) of arbitrary two pixels among the five pixels in a diamond shape.

In this case, the number of tap coefficients (of one class) is a total of 40 including 25 first-order coefficients and 15 second-order term tap coefficients (second-order coefficients).

In a case where five pixels in a diamond shape (cross shape) including the pixel of interest and four pixels adjacent to the top, bottom, left, and right thereof are adopted as the second-order taps, the following selection pattern can be adopted as the second-order term selection pattern, for example, other than the above pattern.

Figure 5B:
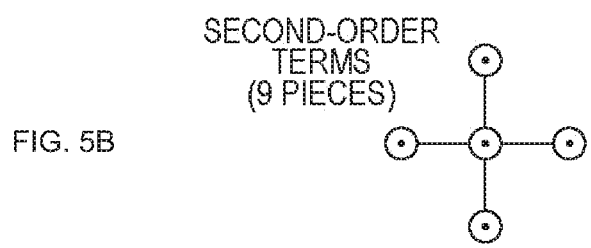

In other words, for example, as the second-order term selection pattern, as illustrated in FIG. 5B, a pattern can be adopted for selecting a total of nine second-order terms including five second-order terms that are the squares of the respective five pixels in a diamond shape as the second-order taps, and four second-order terms that are products of the pixel of interest and the respective other four pixels.

In this case, the number of tap coefficients is a total of 34 including 25 first-order coefficients and 9 second-order term tap coefficients.

Figure 5C:
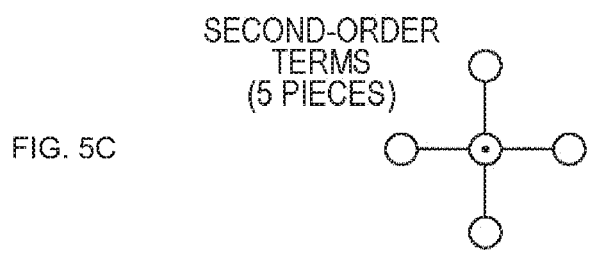

Furthermore, for example, as the second-order term selection pattern, as illustrated in FIG. 5C, a pattern can be adopted for selecting a total of five second-order terms including one second-order term that is the square of the pixel of interest among five pixels in a diamond shape as the second-order taps, and four second-order terms that are products of the pixel of interest and the respective other four pixels.

In this case, the number of tap coefficients is a total of 30 including 25 first-order coefficients and 5 second-order term tap coefficients.

Figure 5D:
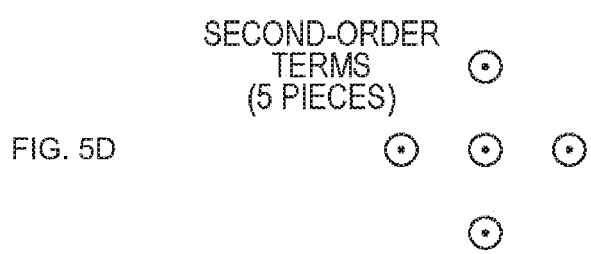

Moreover, for example, as the second-order term selection pattern, as illustrated in FIG. 5D, a pattern can be adopted for selecting five second-order terms that are the squares of the respective five pixels in a diamond shape as the second-order taps.

In this case, the number of tap coefficients is a total of 30 including 25 first-order coefficients and 5 second-order term tap coefficients.

FIG. 6 is a diagram illustrating still other examples of the second-order term selection pattern for selecting the second-order term of the reduced prediction equation from the second-order terms of the all combinations prediction equation.

Note that, FIG. 6 illustrates four selection patterns 1, 2, 3, and 4 as the second-order term selection patterns.

Moreover, FIG. 6 illustrates the tap coefficients of the reference case, and the tap coefficients of the all combinations prediction equation in a case where all 41 candidate pixels of the reference case are used as the first-order taps and the second-order taps.

According to filter processing of the reference case, the number of tap coefficients (of one class) is only required to be 41 that is the number of first-order coefficients, but there is a case where the details (small amplitude portion) of the original image cannot be sufficiently restored in a filter image obtained by the filter processing using the prediction equation including the 41 first-order coefficients.

According to filter processing using the all combinations prediction equation, the details of the original image can be sufficiently restored in a filter image obtained by the filter processing. However, in this case, the number of tap coefficients, including the first-order coefficients and the second-order coefficients, is 902, and the amount of data of the tap coefficients is large.

In the selection patterns 1 to 4, among the 41 candidate pixels of the reference case, the first-order terms of 25 (candidate) pixels in a diamond shape with the pixel of interest as the center are selected as the first-order terms of the reduced prediction equation. For this reason, in the selection patterns 1 to 4, the number of first-order term tap coefficients (first-order coefficients) is 25.

Then, in the selection pattern 1, five pixels in a diamond shape, including the pixel of interest and four pixels adjacent to the top, bottom, left, and right thereof are adopted as the second-order taps, and a total of 15 second-order terms, including 5 second-order terms that are the squares of the respective five pixels as the second-order tap and 10 second-order terms that are 10 combinations (products thereof) of arbitrary two pixels among the five pixels in a diamond shape, are selected as the second-order terms of the reduced prediction equation.

According to filter processing using the reduced prediction equation of the selection pattern 1, the number of tap coefficients is a total of 40 including 25 first-order term first-order coefficients and 15 second-order term second-order coefficients, and is less than that of the reference case.

Moreover, according to the filter processing using the reduced prediction equation of the selection pattern 1, in a filter image obtained by the filter processing, the details of the original image can be sufficiently restored due to the effect of the second-order terms.

In other words, according to the filter processing using the reduced prediction equation of the selection pattern 1, the use (transmission capacity for transmitting the second-order term tap coefficients) of the second-order terms (tap coefficients thereof) is ensured by making the first-order terms (tap coefficients thereof) less than those of the reference case. Moreover, by selecting the second-order term of the pixel close to the pixel of interest as the second-order term of the reduced prediction equation, detail restoration performance of almost equivalent (close) to that of the filter processing using the all combinations prediction equation can be maintained, with a smaller number of second-order terms, in other words, second-order coefficients with a smaller amount of data.

In the selection pattern 2, nine pixels in a square shape including the pixel of interest and adjacent eight pixels around the pixel of interest (vertically, horizontally, and diagonally) are adopted as second-order taps. Then, a total of nine second-order terms including one second-order term of the square of the pixel of interest among the nine pixels as the second-order taps and eight second-order terms of the products of the pixel of interest and the respective other eight pixels, or nine second-order terms of the squares of the respective nine pixels as the second-order taps, are selected as the second-order terms of the reduced prediction equation.

According to filter processing using the reduced prediction equation of the selection pattern 2, the number of tap coefficients is a total of 34 including 25 first-order term first-order coefficients and 9 second-order term second-order coefficients, and is less than that of the reference case, and further, that of the selection pattern 1.

Moreover, according to the filter processing using the reduced prediction equation of the selection pattern 2, in a filter image obtained by the filter processing, the details of the original image can be sufficiently restored due to the effect of the second-order terms.

In other words, according to the filter processing using the reduced prediction equation of the selection pattern 2, the use of the second-order terms (tap coefficients thereof) is ensured by making the first-order terms (tap coefficients thereof) less than those of the reference case. Moreover, by selecting the second-order term of the pixel close to the pixel of interest as the second-order term of the reduced prediction equation, detail restoration performance of almost equivalent to that of the filter processing using the all combinations prediction equation can be maintained, with a smaller number of second-order terms, in other words, second-order coefficients with a smaller amount of data.

The selection pattern 2 is particularly effective in a case where the original image to be restored is a pattern spreading vertically, horizontally, and diagonally (having a vertical, horizontal, and diagonal directionality).

In the selection pattern 3, five pixels in a cross shape including the pixel of interest and four pixels adjacent vertically and horizontally to the pixel of interest are adopted as second-order taps. Then, a total of five second-order terms including one second-order term of the square of the pixel of interest among the five pixels as the second-order taps and four second-order terms of the products of the pixel of interest and the respective other four pixels, or five second-order terms of the squares of the respective five pixels as the second-order taps, are selected as the second-order terms of the reduced prediction equation.

According to filter processing using the reduced prediction equation of the selection pattern 3, the number of tap coefficients is a total of 30 including 25 first-order term first-order coefficients and 5 second-order term second-order coefficients, and is less than that of the reference case, and further, those of the selection patterns 1 and 2.

Moreover, according to the filter processing using the reduced prediction equation of the selection pattern 3, in a filter image obtained by the filter processing, the details of the original image can be sufficiently restored due to the effect of the second-order terms.

In other words, according to the filter processing using the reduced prediction equation of the selection pattern 3, the use of the second-order terms (tap coefficients thereof) is ensured by making the first-order terms (tap coefficients thereof) less than those of the reference case. Moreover, by selecting the second-order term of the pixel close to the pixel of interest as the second-order term of the reduced prediction equation, detail restoration performance of almost equivalent to that of the filter processing using the all combinations prediction equation can be maintained, with a smaller number of second-order terms, in other words, second-order coefficients with a smaller amount of data.

The selection pattern 3 is particularly effective in a case where the original image to be restored is a pattern having vertical and horizontal directionality.

In the selection pattern 4, five pixels in an X-shape including the pixel of interest and four pixels adjacent diagonally to the pixel of interest are adopted as second-order taps. Then, a total of five second-order terms including one second-order term of the square of the pixel of interest among the five pixels as the second-order taps and four second-order terms of the products of the pixel of interest and the respective other four pixels, or five second-order terms of the squares of the respective five pixels as the second-order taps, are selected as the second-order terms of the reduced prediction equation.

According to filter processing using the reduced prediction equation of the selection pattern 4, the number of tap coefficients is a total of 30 including 25 first-order term first-order coefficients and 5 second-order term second-order coefficients, and is less than that of the reference case, and further, those of the selection patterns 1 and 2.

Moreover, according to the filter processing using the reduced prediction equation of the selection pattern 4, in a filter image obtained by the filter processing, the details of the original image can be sufficiently restored due to the effect of the second-order terms.

In other words, according to the filter processing using the reduced prediction equation of the selection pattern 4, the use of the second-order terms (tap coefficients thereof) is ensured by reducing the first-order terms (tap coefficients thereof) from those of the reference case. Moreover, by selecting the second-order term of the pixel close to the pixel of interest as the second-order term of the reduced prediction equation, detail restoration performance of almost equivalent to that of the filter processing using the all combinations prediction equation can be maintained, with a smaller number of second-order terms, in other words, second-order coefficients with a smaller amount of data.

The selection pattern 4 is particularly effective in a case where the original image to be restored is a pattern having a diagonal directionality.

In the encoding device, it is possible to prepare in advance a plurality of selection patterns, for example, selection patterns 1 to 4, for selecting a second-order term of a pixel in the vicinity of a pixel of interest, which is likely to contribute to image quality, and determine a selection pattern by which the coding efficiency is optimized, as a selection pattern (adoption pattern) for a second term to be adopted in the reduced prediction equation, and transmit selection information representing the selection pattern determined as the adoption pattern.

Determination of the adoption pattern from the plurality of selection patterns can be performed on a frame basis, a sequence basis, or for each arbitrary unit.

Furthermore, regarding the determination of the adoption pattern, one selection pattern can be determined as the adoption pattern in common to all classes, or one selection pattern can be determined as the adoption pattern for each class.

In a case where one selection pattern is determined as the adoption pattern for each class, a selection pattern by which the coding efficiency is optimized can be determined as the adoption pattern for each class.

Figure 7:
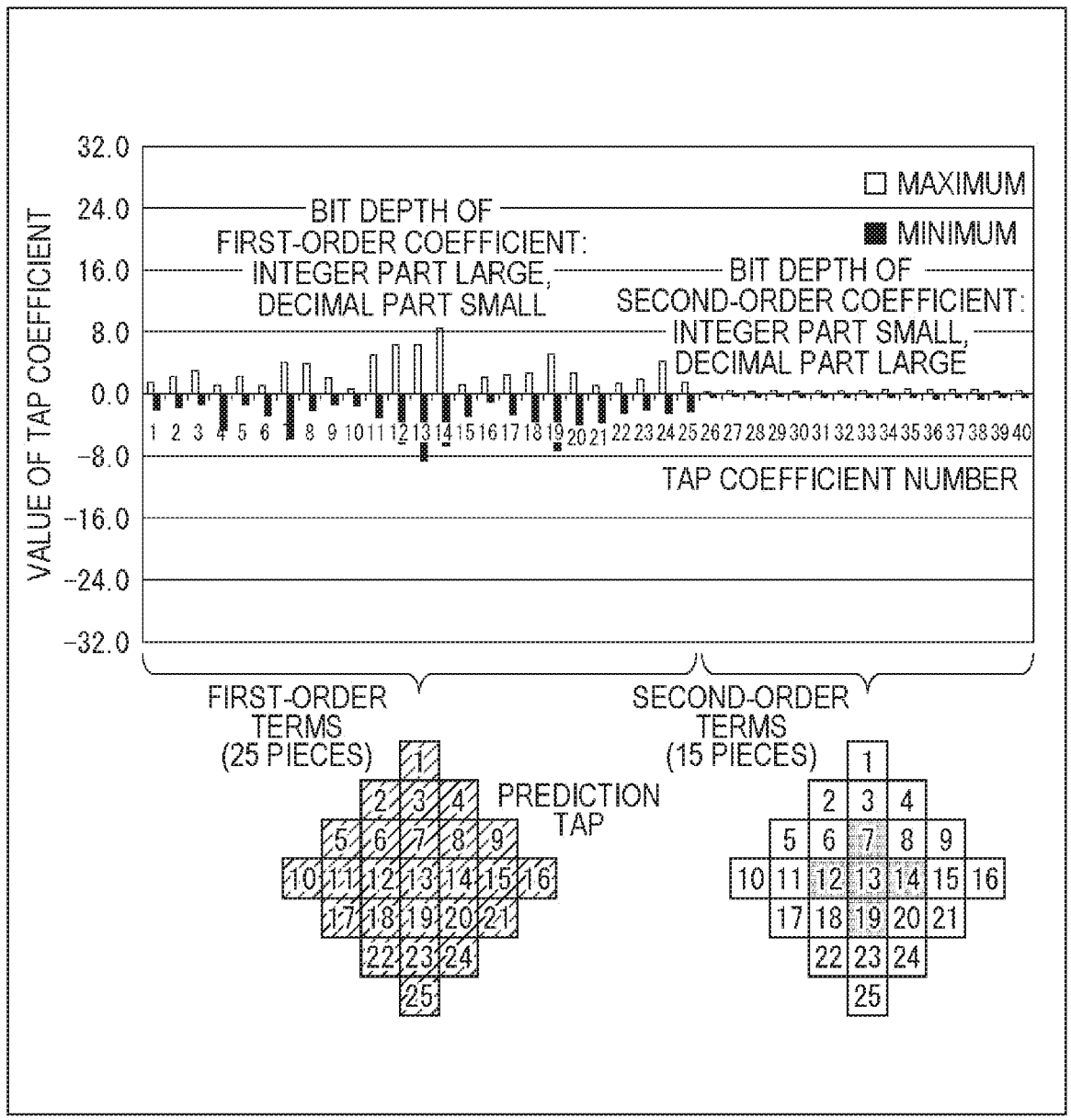
FIG. 7 is a diagram illustrating an expression format of the tap coefficient included in the higher-order prediction equation.

FIG. 7 is a diagram illustrating an expression format of the tap coefficient included in the higher-order prediction equation.

In other words, FIG. 7 illustrates the maximum value and the minimum value of a value of a tap coefficient obtained by performing learning to obtain tap coefficients (first-order coefficient and second-order coefficient) included in a higher-order prediction equation (reduced prediction equation) of the selection pattern 1 by using images of a plurality of different properties (patterns) as learning images for learning of the tap coefficients.

In FIG. 7, the horizontal axis represents the order of the tap coefficient, and the vertical axis represents the value of the tap coefficient.

In FIG. 7, serial numbers from 1 are assigned as the orders to the 25 first-order coefficients and the 15 second-order coefficients included in the reduced prediction equation of the selection pattern 1.

Here, the tap coefficient is expressed by bits with a predetermined bit depth such as 8 bits. As the expression format for expressing the tap coefficient, formats can be adopted such as a fixed-point format and a floating-point format; however, here, to simplify the description, the fixed-point expression format will be considered. Regarding the fixed-point expression format, an expression format can be adopted in which the integer part and the decimal part have various bit depths depending on the position of the decimal point in the bit string having a predetermined bit depth.

The expression format of the tap coefficient can be determined, for example, for each order of the terms included in the higher-order prediction equation (reduced prediction equation).

According to the tendency of the maximum value and the minimum value of the tap coefficient (value thereof) of FIG. 7, the first-order term tap coefficient (first-order coefficient) tends to have a value that greatly fluctuates. Thus, regarding the first-order coefficient, an expression format in which the bit depth is increased for the integer part can be determined as the expression format of the first-order coefficient. The bit depth to be increased for the integer part can be determined so that the accuracy can be ensured of the first-order coefficient, depending on the absolute value of the first-order coefficient.

Furthermore, according to the tendency of the maximum value and the minimum value of the tap coefficient (value thereof) of FIG. 7, the second-order term tap coefficient tends to have a value whose absolute value is small. Thus, regarding the second-order coefficient, an expression format in which the bit depth is increased for the decimal part can be determined as the expression format of the second-order coefficient. The bit depth to be increased for the decimal part can be determined so that the accuracy can be ensured of the second-order coefficient, depending on the absolute value of the second-order coefficient.

Note that, the second-order coefficient tends to have a decimal value with a large number of digits less than 1, so in a case where a bit string having a variable bit depth can be adopted as an expression format of the tap coefficient, the expression format of the second-order term can be determined as a bit string having more bits than the first-order term.

Regarding each of the first-order term tap coefficient (first-order coefficient) and the second-order term tap coefficient (second-order coefficient), the position of the decimal point of the fixed-length bit string representing the tap coefficient can be determined in advance to a fixed position depending on the tendency of the maximum value and the minimum value of the tap coefficient.

In this case, the encoding device transmits the tap coefficient as a bit string expressing the tap coefficient in an expression format in which the position of the decimal point is determined in advance to a fixed position. Then, the decoding device treats the bit strings representing the tap coefficients of terms of respective orders (the first-order term and the second-order term) from the encoding device as bit strings in an expression format in which the position of the decimal point is determined in advance to a fixed position, and performs filter processing, in other words, calculation of the higher-order prediction equation (reduced prediction equation).

Furthermore, regarding each of the first-order coefficient and the second-order coefficient, it is possible to determine the expression format depending on the magnitude of the absolute value of each of the first-order coefficient and the second-order coefficient, in the encoding device, for example, for each frame, sequence, and the like, in other words, determine the position of the decimal point of the fixed-length bit string representing the tap coefficient, depending on the tendency of the maximum value and the minimum value of the tap coefficient.

In this case, the encoding device transmits the first-order coefficient and the second-order coefficient in the expression format of the position of the decimal point determined, and transmits format information representing the expression format, for each of the first-order coefficient and the second-order coefficient. Then, the decoding device specifies the expression format of the bit strings representing the tap coefficients of terms of respective orders (the first-order term and the second-order term) from the encoding device, from the format information from the encoding device, and treats the bit strings representing the tap coefficients as bit strings of the expression format specified from the format information, and performs the filter processing, in other words, the calculation of the higher-order prediction equation (reduced prediction equation).

As described above, by determining the expression format of the tap coefficient for each order of the term included in the higher-order prediction equation (reduced prediction equation), the accuracy can be ensured of the tap coefficient of the term of each order.

Figure 8:
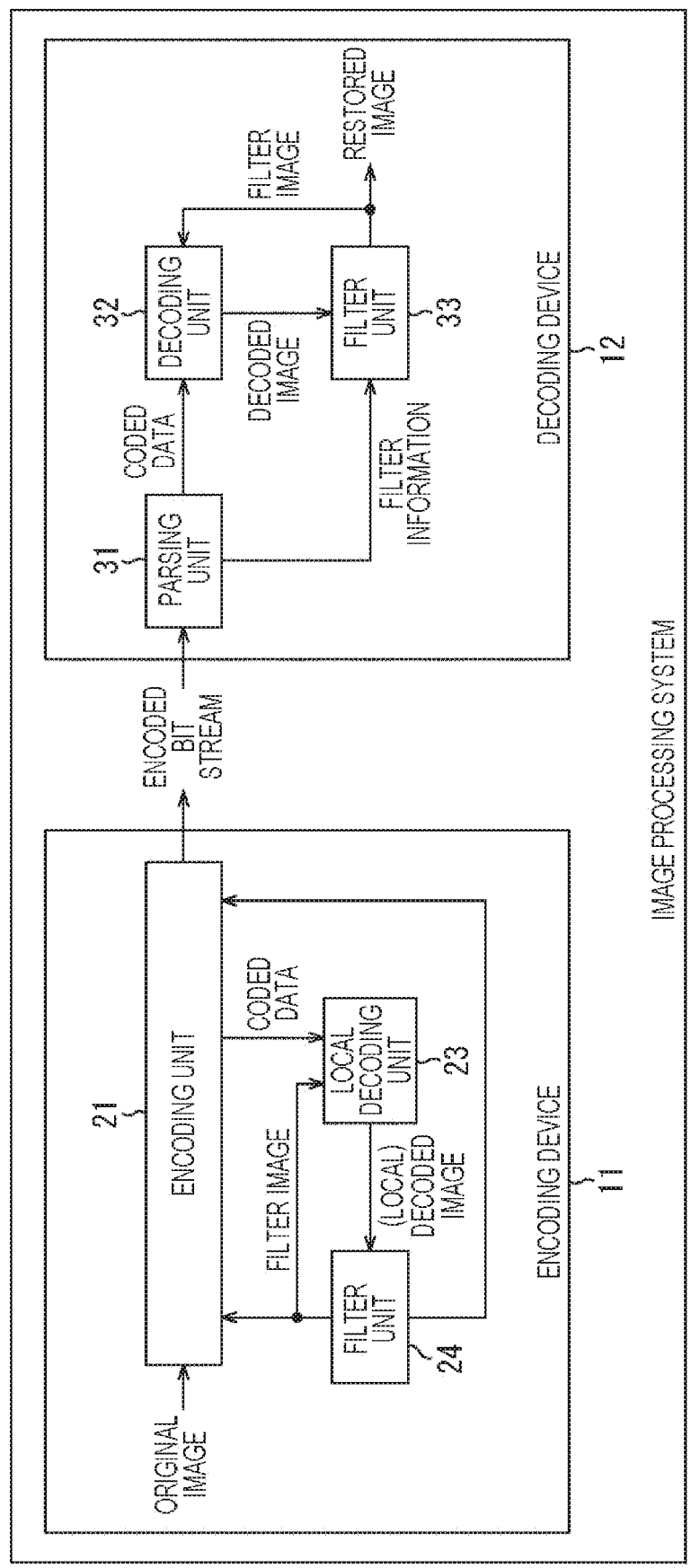
FIG. 8 is a block diagram illustrating an outline of an embodiment of an image processing system to which the present technology is applied.

FIG. 8 is a block diagram illustrating an outline of an embodiment of an image processing system to which the present technology is applied.

In FIG. 8, the image processing system includes an encoding device 11 and a decoding device 12.

The encoding device 11 includes an encoding unit 21, a local decoding unit 23, and a filter unit 24.

The encoding unit 21 is supplied with an original image (data) that is an image to be encoded, and is supplied with a filter image from the filter unit 24.

The encoding unit 21 performs (predictive) encoding of the original image by using the filter image from the filter unit 24, and supplies coded data obtained by the encoding to the local decoding unit 23.

In other words, the encoding unit 21 subtracts a predicted image of the original image obtained by performing motion compensation of the filter image from the filter unit 24 from the original image, and encodes a residual obtained as a result of the subtraction.

The encoding unit 21 generates and transmits (sends) an encoded bit stream including the coded data and filter information supplied from the filter unit 24. Here, the filter information includes tap coefficients included in a higher-order prediction equation (reduced prediction equation), as necessary, and moreover, selection information and format information.

Thus, the encoded bit stream generated by the encoding unit 21 is a bit stream including, as necessary, the tap coefficients, the selection information, and the format information in addition to the coded data.

The local decoding unit 23 is supplied with the coded data from the encoding unit 21, and is also supplied with the filter image from the filter unit 24.

The local decoding unit 23 performs local decoding of the coded data from the encoding unit 21 by using the filter image from the filter unit 24, and supplies a (local) decoded image obtained as a result of the local decoding to the filter unit 24.

In other words, the local decoding unit 23 decodes the coded data from the encoding unit 21 into a residual, and adds to the residual the predicted image of the original image obtained by performing the motion compensation of the filter image from the filter unit 24, to generate a decoded image obtained by decoding the original image.

The filter unit 24 performs filter processing of applying the higher-order prediction equation (reduced prediction equation) to the decoded image from the local decoding unit 23, to generate a filter image, and supplies the filter image to the encoding unit 21 and the local decoding unit 23.

Furthermore, in performing the filter processing, the filter unit 24 performs learning to obtain the tap coefficients included in the higher-order prediction equation (reduced prediction equation), and determines an adoption pattern and an expression format of the tap coefficients, as necessary. Then, the filter unit 24 supplies the encoding unit 21 with the tap coefficients, the selection information representing the adoption pattern, and the format information representing the expression format of the tap coefficients, as filter information related to the filter processing.

The decoding device 12 includes a parsing unit 31, a decoding unit 32, and a filter unit 33.

The parsing unit 31 receives the encoded bit stream transmitted by the encoding device 11 and performs parsing, to extract (obtain) filter information included in the encoded bit stream, and supplies the filter information to the filter unit 33. Moreover, the parsing unit 31 supplies the coded data included in the encoded bit stream to the decoding unit 32.

The decoding unit 32 is supplied with the coded data from the parsing unit 31, and is also supplied with a filter image from the filter unit 33.

The decoding unit 32 performs decoding of the coded data from the parsing unit 31 by using the filter image from the filter unit 33, and supplies a decoded image obtained as a result of the decoding to the filter unit 33.

In other words, similarly to the local decoding unit 23, the decoding unit 32 decodes the coded data from the parsing unit 31 into a residual, and adds to the residual a predicted image of the original image obtained by performing motion compensation of the filter image from the filter unit 33, to generate a decoded image obtained by decoding the original image.

Similarly to the filter unit 24, the filter unit 33 performs filter processing of applying a higher-order prediction equation (reduced prediction equation) to the decoded image from the decoding unit 32, to generate a filter image, and supplies the filter image to the decoding unit 32.

The filter unit 33 uses the filter information from the parsing unit 31 as necessary in performing the filter processing. Furthermore, the filter unit 33 supplies the filter image obtained (generated) by the filter processing to the decoding unit 32, and also outputs the filter image as a restored image obtained by restoring the original image.

Figure 9:
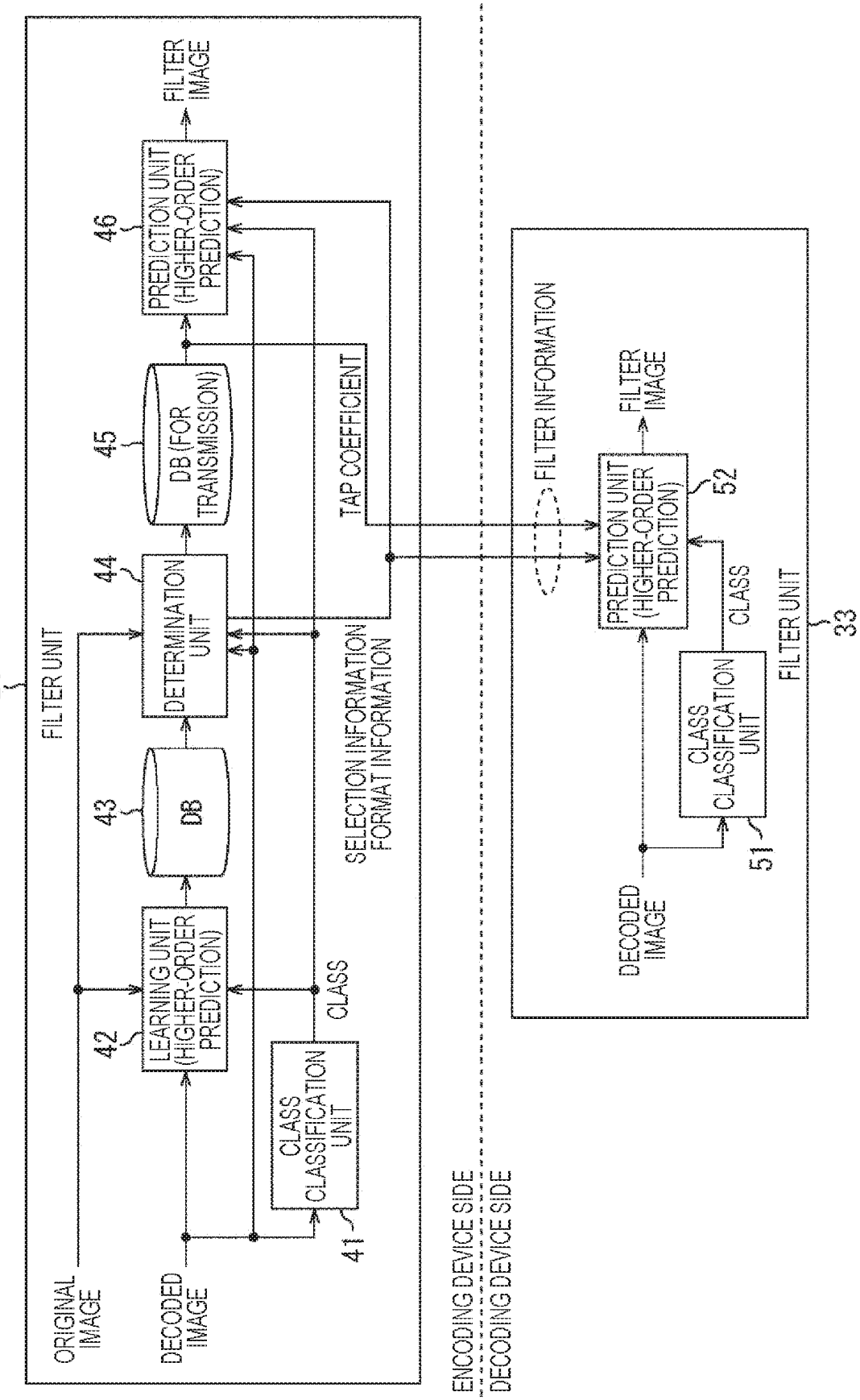
FIG. 9 is a block diagram illustrating an outline of a configuration example of filter units 24 and 33.

FIG. 9 is a block diagram illustrating an outline of a configuration example of the filter units 24 and 33 of FIG. 8.

In FIG. 9, the filter unit 24 includes a class classification unit 41, a learning unit 42, a database (DB) 43, a determination unit 44, a DB 45, and a prediction unit 46.

The filter unit 24 is supplied with the decoded image from the local decoding unit 23 (FIG. 8), and is also supplied with the original image.

The decoded image is supplied to the class classification unit 41, the learning unit 42, the determination unit 44, and the prediction unit 46, and the original image is supplied to the learning unit 42 and the determination unit 44.

The class classification unit 41 sequentially selects pixels of the decoded image supplied thereto as pixels of interest. Moreover, the class classification unit 41 performs class classification of the pixel of interest, and supplies a class of the pixel of interest obtained as a result of the class classification to the learning unit 42, the determination unit 44, and the prediction unit 46.

The learning unit 42 uses the original image and the decoded image supplied thereto as learning images for learning to obtain tap coefficients, and performs, for each class, learning to obtain, for each of a plurality of selection patterns, for example, the selection patterns 1 to 4 of FIG. 6, a first-order coefficient and a second-order coefficient that are tap coefficients included in a reduced prediction equation of the selection pattern. The learning unit 42 performs learning for each frame (picture) of the original image and the decoded image, for example, and supplies the DB 43 with tap coefficients for each class obtained for each of the plurality of selection patterns by the learning.

The DB 43 temporarily stores the tap coefficients for each class in each of the plurality of selection patterns supplied from the learning unit 42.

For each selection pattern, the determination unit 44 determines an expression format that optimizes the coding efficiency (hereinafter, also referred to as an optimum expression format) for each of the first-order coefficient and the second-order coefficient that are the tap coefficients for each class stored in the DB 43.

Moreover, for each selection pattern, the determination unit 44 determines (selects), as an adoption pattern, a selection pattern that optimizes the coding efficiency in a case where filter processing is performed of applying a reduced prediction equation including tap coefficients in the optimum expression format to the decoded image, and supplies the DB 45 with the tap coefficients for each class for the adoption pattern (the selection pattern determined as the adoption pattern).

Furthermore, the determination unit 44 outputs format information representing the optimum expression format of each of the first-order coefficient and the second-order coefficient that are tap coefficients for the adoption pattern, and selection information representing the adoption pattern.

The format information and selection information output by the determination unit 44 are supplied to the prediction unit 46, and are included as the filter information in the encoded bit stream in the encoding unit 21 (FIG. 8), and transmitted to the decoding device 12.

Here, as necessary, for each selection pattern, the determination unit 44 performs filter processing (filter processing similar to that performed by the prediction unit 46) of applying a reduced prediction equation including tap coefficients for each class stored in the DB 43 to the decoded image, and obtains the coding efficiency, for example, the RD cost or the like by using the original image together with a filter image obtained as a result of the filter processing.

The DB 45 temporarily stores the tap coefficients for each class for the adoption pattern supplied from the determination unit 44. The tap coefficients for each class for the adoption pattern stored in the DB 45 is included in the encoded bit stream as the filter information in the encoding unit 21 (FIG. 8), and is transmitted to the decoding device 12.

The prediction unit 46 applies, to the decoded image, a reduced prediction equation including the tap coefficients of the class of the pixel of interest from the class classification unit 41 among the tap coefficients for each class for the adoption pattern stored in the DB 45, to perform filter processing as prediction processing (using a reduced prediction equation that is a higher-order prediction equation, in other words, higher-order prediction processing), and supplies a filter image obtained as a result of the filter processing to the encoding unit 21 and the local decoding unit 23 (FIG. 8).

In other words, the prediction unit 46 specifies an expression format (optimum expression format) of the tap coefficient (each of the first-order coefficient and the second-order coefficient) from the format information from the determination unit 44. Moreover, the prediction unit 46 specifies an adoption pattern for the reduced polynomial from the selection information from the determination unit 44, and from the adoption pattern, specifies a term included in the reduced polynomial, and thus a pixel of the decoded image as a prediction tap used in calculation of the reduced polynomial.

Then, the prediction unit 46 performs filter processing of applying, to the decoded image, the reduced prediction equation of the adoption pattern including the tap coefficients of the class of the pixel of interest in the optimum expression format, in other words, a product-sum calculation of the pixels (pixel values thereof) of the decoded image as the prediction taps and the tap coefficients, as calculation of the reduced prediction equation, to obtain a filter image.

In the (product-sum) calculation of the reduced prediction equation in the filter processing, a calculation is performed according to the optimum expression format of the tap coefficients and the expression format of the pixel values of the decoded image. In other words, for example, in a case where the pixel value and the tap coefficient of the decoded image are represented in 10 bits, the pixel value of the decoded image is of the integer type, and the tap coefficient is a fixed-point number having a 9-bit decimal part, in the calculation of the product of the pixel value of the decoded image and the tap coefficient in the filter processing, a product is obtained of a bit string representing the pixel value of the decoded image and a bit string representing the tap coefficient, and then a bit string representing the product is shifted right by 9 bits, to be divided by 512.

The filter unit 33 includes a class classification unit 51 and a prediction unit 52.

The filter unit 33 is supplied with the filter information from the parsing unit 31 (FIG. 8), and is supplied with the decoded image from the decoding unit 32 (FIG. 8).

Similarly to the class classification unit 41, the class classification unit 51 sequentially selects pixels of the decoded image supplied thereto as pixels of interest. Moreover, the class classification unit 51 performs class classification of the pixel of interest, and supplies a class of the pixel of interest obtained as a result of the class classification to the prediction unit 52.

The prediction unit 52 applies, to the decoded image, a reduced prediction equation including the tap coefficients of the class of the pixel of interest from the class classification unit 51 among the tap coefficients for each class for the adoption pattern included in the filter information, to perform filter processing as prediction processing, and supplies a filter image obtained as a result of the filter processing to the decoding unit 32 (FIG. 8).

In other words, the prediction unit 52 specifies the expression format (optimum expression format) of the tap coefficients (each of the first-order coefficient and the second-order coefficient) from the format information included in the filter information. Moreover, the prediction unit 52 specifies an adoption pattern for the reduced polynomial from the selection information included in the filter information, and from the adoption pattern, specifies a term included in the reduced polynomial, and thus a pixel of the decoded image as a prediction tap used in calculation of the reduced polynomial.

Then, the prediction unit 52 performs filter processing of applying, to the decoded image, the reduced prediction equation of the adoption pattern including the tap coefficients of the class of the pixel of interest in the optimum expression format, in other words, a product-sum calculation of the pixels (pixel values thereof) of the decoded image as the prediction taps and the tap coefficients, as calculation of the reduced prediction equation, to obtain a filter image.

In the (product-sum) calculation of the reduced prediction equation in the filter processing of the prediction unit 52, similarly to the prediction unit 46, a calculation is performed according to the optimum expression format of the tap coefficients and the expression format of the pixel values of the decoded image.

Figure 10:
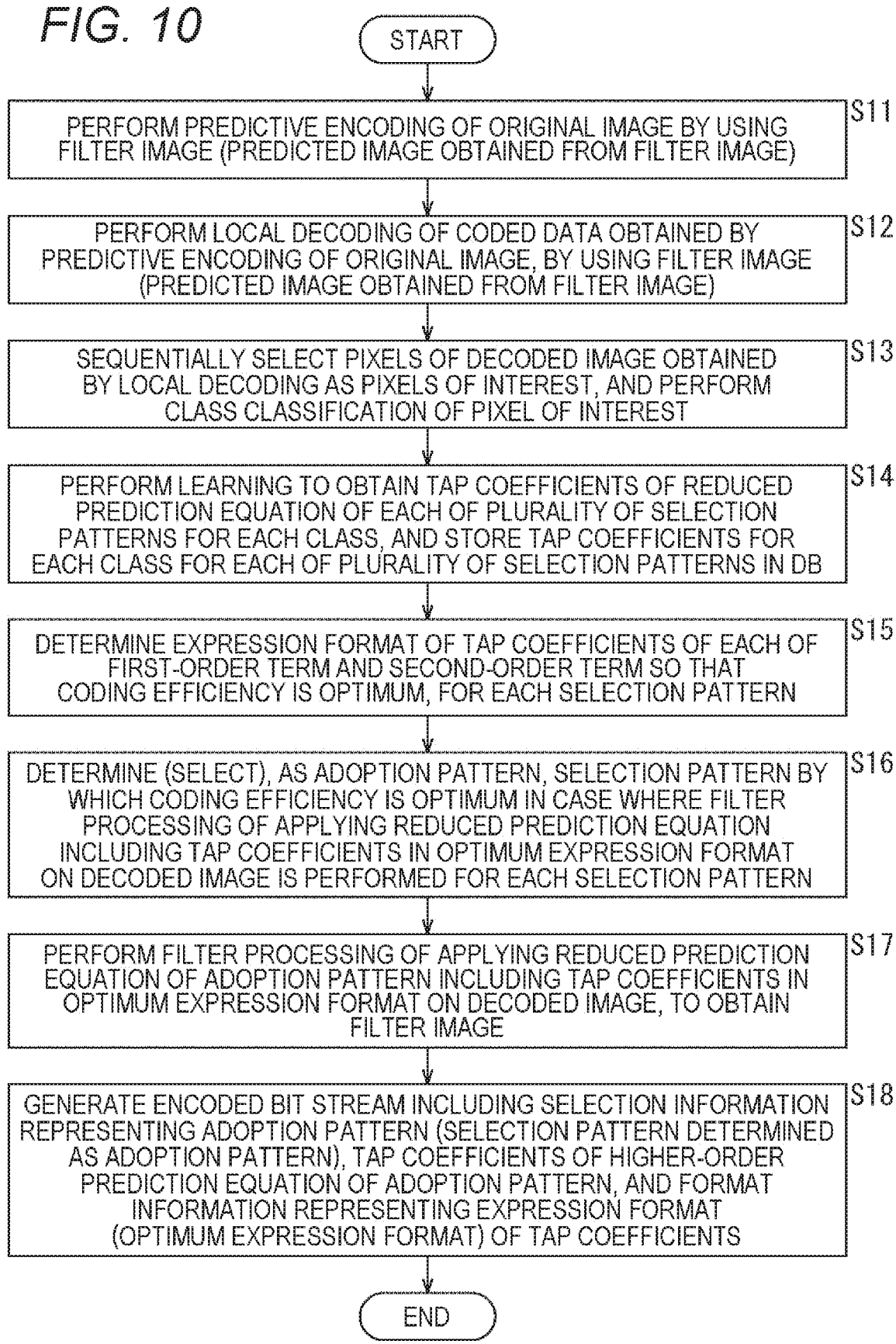
FIG. 10 is a flowchart illustrating an outline of encoding processing by an encoding device 11.

FIG. 10 is a flowchart illustrating an outline of encoding processing by the encoding device 11 of FIG. 8.

The processing according to the flowchart of FIG. 10 is performed, for example, on a frame basis.

In step S11, the encoding unit 21 (FIG. 8) performs (predictive) encoding of an original image by using a filter image from the filter unit 24, and supplies coded data obtained by the encoding to the local decoding unit 23, and the processing proceeds to step S12.

In step S12, the local decoding unit 23 performs local decoding of the coded data from the encoding unit 21 by using the filter image from the filter unit 24, and supplies a (local) decoded image obtained as a result of the local decoding to the filter unit 24, and the processing proceeds to step S13.

In step S13, in the filter unit 24, the class classification unit 41 (FIG. 9) sequentially selects pixels of the decoded image from the local decoding unit 23 as pixels of interest. Moreover, the class classification unit 41 performs class classification of the pixel of interest, and supplies a class of the pixel of interest obtained as a result of the class classification to the learning unit 42, the determination unit 44, and the prediction unit 46, and the processing proceeds to step S14.

In step S14, the learning unit 42 uses one frame of the decoded image from the local decoding unit 23 and one frame of the original image with respect to the frame of the decoded image as a learning image for learning to obtain tap coefficients, and performs, for each class, learning to obtain, for each of a plurality of selection patterns, a first-order coefficient and a second-order coefficient that are tap coefficients included in a reduced prediction equation of the selection pattern. The learning unit 42 causes the DB 43 to store tap coefficients for each class obtained for each of the plurality of selection patterns by the learning, and the processing proceeds from step S14 to step S15.

In step S15, for each selection pattern, the determination unit 44 determines an optimum expression format that is an expression format that optimizes the coding efficiency for each of the first-order coefficient and the second-order coefficient that are the tap coefficients for each class stored in the DB 43, and the processing proceeds to step S16.

In step S16, for each selection pattern, the determination unit 44 determines (selects), as an adoption pattern, a selection pattern that optimizes the coding efficiency in a case where filter processing is performed of applying a reduced prediction equation including tap coefficients in the optimum expression format to the decoded image, and causes the DB 45 to store the tap coefficients for each class for the adoption pattern (the selection pattern determined as the adoption pattern). The tap coefficients for each class for the adoption pattern stored in the DB 45 is supplied as the filter information to the encoding unit 21.

Moreover, the determination unit 44 supplies, as the filter information, format information representing the optimum expression format of each of the first-order coefficient and the second-order coefficient that are tap coefficients for the adoption pattern, and selection information representing the adoption pattern, to the encoding unit 21 and also to the prediction unit 46, and the processing proceeds from step S16 to step S17.

In step S17, the prediction unit 46 applies, to the decoded image from the local decoding unit 23, a reduced prediction equation including the tap coefficients of the class of the pixel of interest from the class classification unit 41 among the tap coefficients for each class for the adoption pattern stored in the DB 45, to perform filter processing as prediction processing.

In other words, the prediction unit 46 specifies an expression format (optimum expression format) of the tap coefficient (each of the first-order coefficient and the second-order coefficient) from the format information from the determination unit 44. Moreover, the prediction unit 46 specifies an adoption pattern for the reduced polynomial from the selection information from the determination unit 44.

Then, the prediction unit 46 performs filter processing of applying, to the decoded image, the reduced prediction equation of the adoption pattern including the tap coefficients of the class of the pixel of interest in the optimum expression format, to obtain a filter image.

The prediction unit 46 supplies the filter image obtained as a result of the filter processing to the encoding unit 21 and the local decoding unit 23, and the processing proceeds from step S17 to step S18.

Here, the filter image supplied from the prediction unit 46 to the encoding unit 21 and the local decoding unit 23 in step S17 is used, for example, in the processing of steps S11 and S12 performed on the next frame of the decoded image.

In step S18, the encoding unit 21 generates and transmits an encoded bit stream including the coded data and the filter information from the filter unit 24, in other words, the selection information, the format information, and the tap coefficients for each class.

Note that, in the determination of the adoption pattern in step S16, one selection pattern can be determined as the adoption pattern in common to all classes, or one selection pattern can be determined as the adoption pattern for each class.

In a case where one selection pattern is determined as the adoption pattern for each class, a selection pattern by which the coding efficiency is optimized is determined as the adoption pattern for each class, for example. The number of pieces of the selection information and format information is therefore multiplied by the number of classes (total number) in a case where one selection pattern is determined as the adoption pattern in common to all classes.

Furthermore, in the case where one selection pattern is determined as the adoption pattern for each class, the prediction unit 46 specifies an expression format (optimum expression format) of the tap coefficients for each class, and specifies an adoption pattern for the reduced polynomial, in the filter processing performed in step S17, and from the adoption pattern, specifies a term included in the reduced polynomial, and thus a pixel of the decoded image as a prediction tap used in calculation of the reduced polynomial.

Figure 11:
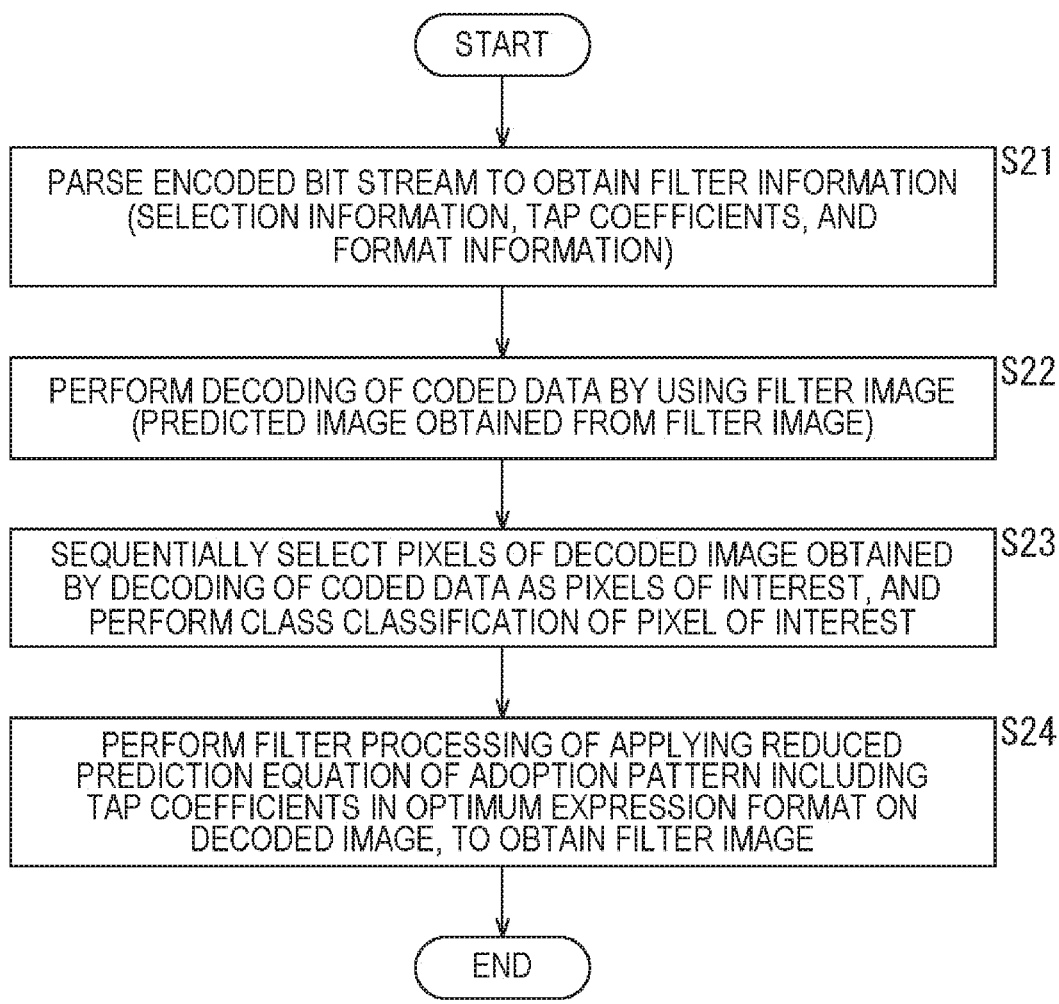
FIG. 11 is a flowchart illustrating an outline of decoding processing by a decoding device 12.

FIG. 11 is a flowchart illustrating an outline of decoding processing by the decoding device 12 of FIG. 8.

The processing according to the flowchart of FIG. 11 is performed, for example, on a frame basis similarly to the encoding processing of FIG. 10.

In step S21, the parsing unit 31 (FIG. 8) receives the encoded bit stream transmitted from the encoding device 11 and performs parsing, to extract (obtain) filter information included in the encoded bit stream, and supplies the filter information to the filter unit 33. Moreover, the parsing unit 31 supplies the coded data included in the encoded bit stream to the decoding unit 32, and the processing proceeds from step S21 to step S22.

In step S22, the decoding unit 32 performs decoding of the coded data from the parsing unit 31 by using the filter image from the filter unit 33, and supplies a decoded image obtained as a result of the decoding to the filter unit 33, and the processing proceeds to step S23.

In step S23, in the filter unit 33, the class classification unit 51 (FIG. 9) sequentially selects pixels of the decoded image from the decoding unit 32 as pixels of interest. Moreover, the class classification unit 51 performs class classification of the pixel of interest, and supplies a class of the pixel of interest obtained as a result of the class classification to the prediction unit 52, and the processing proceeds to step S24.

In step S24, the prediction unit 52 applies, to the decoded image from the decoding unit 32, a reduced prediction equation including the tap coefficients of the class of the pixel of interest from the class classification unit 51 among the tap coefficients for each class for the adoption pattern included in the filter information from the parsing unit 31, to perform filter processing as prediction processing to obtain (generate) a filter image.

In other words, the prediction unit 52 specifies the expression format (optimum expression format) of the tap coefficients (each of the first-order coefficient and the second-order coefficient) from the format information included in the filter information. Moreover, the prediction unit 52 specifies an adoption pattern for the reduced polynomial from the selection information included in the filter information.

Then, the prediction unit 52 performs filter processing of applying, to the decoded image, the reduced prediction equation of the adoption pattern including the tap coefficients of the class of the pixel of interest in the optimum expression format, to obtain a filter image.

The filter image obtained as a result of the filter processing in the prediction unit 52 is supplied to the decoding unit 32 (FIG. 8), and is output as a restored image obtained by restoring the original image.

The filter image supplied from the prediction unit 52 to the decoding unit 32 in step S24 is used, for example, in the processing of step S22 performed on the next frame of the decoded image.

Next, the details will be described of the embodiment of the present technology; however, before that, a description will be given of class classification prediction processing to be performed on an image.

The class classification prediction processing to be performed on an image is processing of performing class classification by using a first image that is a target image of the class classification prediction processing, and performing filter processing as prediction processing using a prediction equation performing a product-sum calculation of tap coefficients of a class obtained as a result of the class classification and pixels (pixel values thereof) of the first image, and a predicted value of a second image is obtained (generated) by such filter processing. In the present embodiment, the first image is a decoded image (including a locally decoded image), and the second image is an original image.

<Class Classification Prediction Processing>

Figure 12:
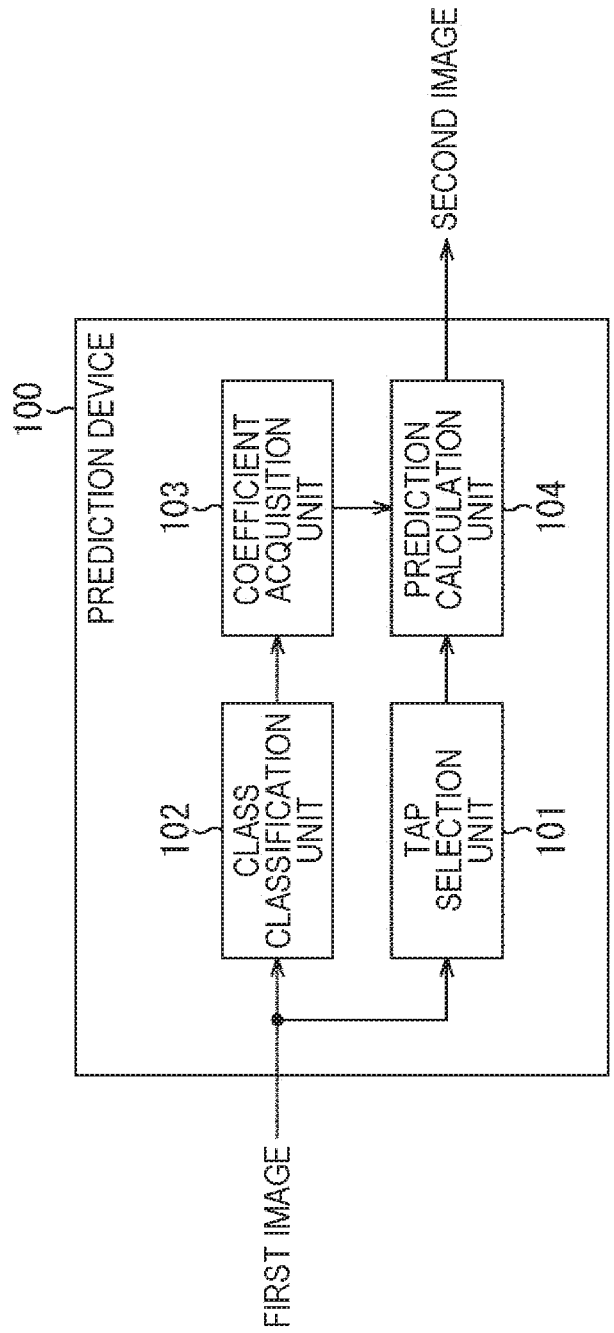
FIG. 12 is a block diagram illustrating a first configuration example of a prediction device that performs class classification prediction processing.

FIG. 12 is a block diagram illustrating a first configuration example of a prediction device that performs class classification prediction processing.

In the class classification prediction processing, by a product-sum calculation as calculation of a prediction equation using tap coefficients of a class obtained by performing class classification of a targeted pixel of interest in the first image into one of a plurality of classes, and a pixel value of a pixel of the first image selected as a prediction tap for the pixel of interest, a predicted value is obtained of a pixel value of a corresponding pixel of the second image corresponding to the pixel of interest.

Note that, in the following description of the class classification prediction processing, to simplify the description, a prediction equation including only the first-order term will be adopted as the prediction equation.

FIG. 12 illustrates a configuration example of a prediction device that performs the class classification prediction processing.

In FIG. 12, a prediction device 100 includes a tap selection unit 101, a class classification unit 102, a coefficient acquisition unit 103, and a prediction calculation unit 104.

The prediction device 100 is supplied with the first image. The first image supplied to the prediction device 100 is supplied to the tap selection unit 101 and the class classification unit 102.

The tap selection unit 101 sequentially selects pixels included in the first image as pixels of interest. Moreover, the tap selection unit 101 selects, as prediction taps, some of the pixels (pixel values thereof) included in the first image used to predict the corresponding pixel (pixel value thereof) of the second image corresponding to the pixel of interest.

Specifically, the tap selection unit 101 selects, as the prediction taps, a plurality of pixels of the first image being in positions spatially or temporally close to a spatio-temporal position of the pixel of interest, and supplies the pixels to the prediction calculation unit 104.

The class classification unit 102 performs class classification that classifies the pixel of interest into one of several classes in accordance with a certain rule, and supplies a class of the pixel of interest obtained as a result of the class classification to the coefficient acquisition unit 103.

In other words, the class classification unit 102 selects, as class taps, some of the pixels (pixel values thereof) included in the first image used to perform the class classification for the pixel of interest, for example. For example, the class classification unit 102 selects the class taps in a similar manner in which the tap selection unit 101 selects the prediction taps.

Note that, the prediction tap and the class tap may have the same tap structure or may have different tap structures.

The class classification unit 102 performs class classification of the pixel of interest by using the class taps, for example, and supplies a class of the pixel of interest obtained as a result of the class classification to the coefficient acquisition unit 103.

For example, the class classification unit 102 obtains an image feature value of the pixel of interest by using the class taps. Moreover, the class classification unit 102 performs class classification of the pixel of interest depending on the image feature value of the pixel of interest, and supplies a class obtained as a result of the class classification to the coefficient acquisition unit 103.

Here, as a method of performing the class classification, for example, Adaptive Dynamic Range Coding (ADRC) or the like can be adopted.

In the method using ADRC, a pixel (pixel value thereof) as a class tap is subjected to ADRC processing, and a class of the pixel of interest is determined in accordance with an ADRC code (ADRC value) obtained as a result of the ADRC processing. The ADRC code represents a waveform pattern as an image feature value of a small area including the pixel of interest.

Note that, in L-bit ADRC, for example, a maximum value MAX and a minimum value MIN of a pixel value of a pixel as a class tap are detected, and DR=MAX−MIN is set as a local dynamic range of a set, and on the basis of the dynamic range DR, a pixel value of each pixel as a class tap is re-quantized in L bits. In other words, the minimum value MIN is subtracted from the pixel value of each pixel as the class tap, and the subtracted value is divided (re-quantized) by $DR/2^L$. Then, a bit string in which pixel values of L-bit pixels as class taps are arranged in a predetermined order, obtained as described above, is output as the ADRC code. Thus, in a case where the class tap is subjected to 1-bit ADRC processing, for example, the pixel value of each pixel as the class tap is divided by an average value of the maximum value MAX and the minimum value MIN (truncate below decimal point), and the pixel value of each pixel is therefore set to 1 bit (binarized). Then, a bit string in which the 1-bit pixel values are arranged in a predetermined order is output as the ADRC code. The value represented by such an ADRC code represents the class.

Furthermore, as the image feature value used for class classification, in addition to the ADRC code, it is possible to adopt, for example, Dynamic Range (DR) that is a difference between the maximum value and the minimum value of pixel values such as luminance values of pixels as class taps, DiffMax that is the maximum value of a difference absolute value between pixel values of pixels adjacent to each other in the horizontal, vertical, and diagonal directions in class taps, DiffMax/DR obtained by using DR and DiffMax, and the like.

In addition, the class classification can be performed by using encoding information such as the quantization parameter QP of the pixel of interest, and others. In other words, the class classification can be performed by, for example, threshold processing on the encoding information, and the like.

The coefficient acquisition unit 103 stores tap coefficients for each class obtained by learning, and moreover, acquires tap coefficients of the class of the pixel of interest supplied from the class classification unit 102, among the stored tap coefficients. Moreover, the coefficient acquisition unit 103 supplies the tap coefficients of the class of the pixel of interest to the prediction calculation unit 104.

The prediction calculation unit 104 performs filter processing as prediction processing that is a product-sum calculation of a prediction equation for obtaining a predicted value of a true value of a pixel value of a pixel (corresponding pixel) of the second image corresponding to the pixel of interest, by using the prediction tap from the tap selection unit 101 and the tap coefficient supplied from the coefficient acquisition unit 103. The prediction calculation unit 104 therefore obtains and outputs the pixel value (predicted value thereof) of the corresponding pixel, in other words, the pixel value (predicted value thereof) of the pixel included in the second image.

Figure 13:
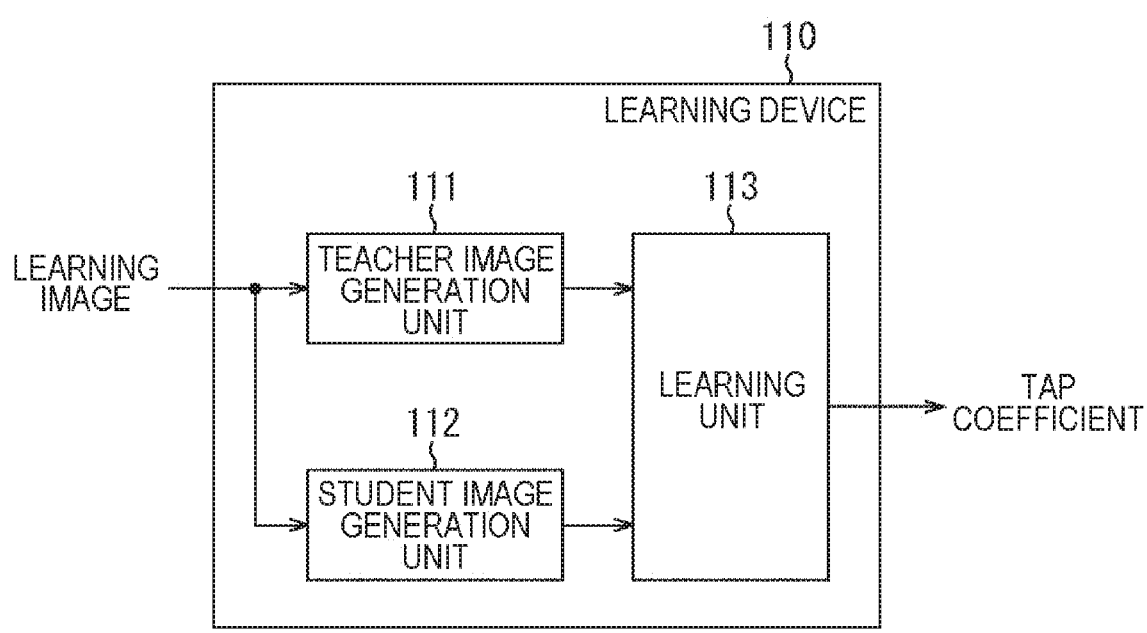
FIG. 13 is a block diagram illustrating a configuration example of a learning device that performs learning of the tap coefficients stored in a coefficient acquisition unit 103.

FIG. 13 is a block diagram illustrating a configuration example of a learning device that performs learning of the tap coefficients stored in the coefficient acquisition unit 103.

Here, when it is assumed that a decoded image is adopted as the first image and an original image for the decoded image is adopted as the second image, and a prediction tap and a tap coefficient selected from the first image are used, and a pixel value is predicted of a pixel of the original image as the second image (hereinafter, also referred to as a second pixel) by filter processing as prediction processing that is a product-sum calculation of a prediction equation including only the first-order term, a pixel value y of the second pixel as the corresponding pixel of the second image corresponding to a pixel of interest is obtained according to the following prediction equation.

[Expression 3]

$$y = \sum_{n=1}^{N} w_n x_n \qquad (3)$$

In Equation (3), $x_n$ represents a pixel value of the n-th pixel of the first image (hereinafter, also referred to as a first pixel, as appropriate) as a prediction tap of the pixel of interest, and $w_n$ represents the n-th first-order term tap coefficient (n-th tap coefficient). The prediction equation of Equation (3) includes N terms (first-order terms).

Here, in the present technology, the pixel value y of the second pixel is obtained not by the prediction equation including only the first-order term of Equation (3) but by a higher-order prediction equation including a second-order or higher higher-order term.

Now, when a true value of a pixel value of the second pixel of the k-th sample is represented as $y_k$, and a predicted value of the true value $y_k$ obtained by Equation (3) is represented as $y_k'$, a prediction error $e_k$ of the predicted value is represented by the following Equation.

[Expression 4]

$$e_k = y_k - y_k' \qquad (4)$$

Now, since the predicted value $y_k'$ of Equation (4) is obtained in accordance with Equation (3), the following expression is obtained by replacing $y_k'$ of Equation (4) in accordance with Equation (3).

[Expression 5]

$$e_k = y_k - \left( \sum_{n=1}^{N} w_n x_{n,k} \right) \qquad (5)$$

However, in Equation (5), $x_{n,k}$ represents the n-th first pixel as a prediction tap for the second pixel of the k-th sample as a corresponding pixel.

The tap coefficient $w_n$ that makes the prediction error $e_k$ of Equation (5) (or Equation (4)) zero is optimal for predicting the second pixel, but it is generally difficult to obtain such a tap coefficient $w_n$ for all the second pixels.

Thus, assuming that, for example, the least squares method is adopted as a criterion representing that the tap coefficient $w_n$ is optimal, the optimal tap coefficient $w_n$ can be obtained by minimizing a sum total E (statistical error) of square errors represented by the following Equation.

[Expression 6]

$$E = \sum_{k=1}^{K} e_k^2 \qquad (6)$$

However, in Equation (6), K represents the number of samples (the number of samples for learning) of a set of a second pixel $y_k$ as a corresponding pixel and first pixels $x_{1,k}$, $x_{2,k}$, ..., $x_{N,k}$ as prediction taps for the second pixel $y_k$.

The minimum value (minimal value) of the sum total E of the square errors in Equation (6) is given by $w_n$ by which partial derivative of the sum total E with respect to the tap coefficient $w_n$ is made to be zero, as indicated in Equation (7).

[Expression 7]

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \ (n = 1, 2, \ldots, N) \qquad (7)$$

Thus, when Equation (5) described above is partially differentiated with the tap coefficient $w_n$, the following Equation is obtained.

[Expression 8]

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \quad (8)$$

$$(k = 1, 2, \ldots, K)$$

From Equations (7) and (8), the following Equation is obtained.

[Expression 9]

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (9)$$

By substituting Equation (5) for $e_k$ in Equation (9), Equation (9) can be represented by a normal equation indicated in Equation (10).

[Expression 10]

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix} \quad (10)$$

The normal equation of Equation (10) can be solved for the tap coefficient $w_n$ by using, for example, a row reduction method (Gauss-Jordan elimination method), or the like.

By setting up and solving the normal equation of Equation (10) for each class, an optimal tap coefficient (here, a tap coefficient that minimizes the sum total E of square errors) $w_n$ can be obtained for each class.

FIG. 13 illustrates a configuration example of a learning device that performs learning to obtain the tap coefficient $w_n$ by setting up and solving the normal equation of Equation (10).

In FIG. 13, a learning device 110 includes a teacher image generation unit 111, a student image generation unit 112, and a learning unit 113.

The teacher image generation unit 111 and the student image generation unit 112 are supplied with a learning image (image as a sample for learning) used for learning the tap coefficient $w_n$.

The teacher image generation unit 111 generates, from the learning image, an image corresponding to the second image, as a teacher image as teacher data to be a teacher (true value) of learning of the tap coefficients, in other words, a teacher image to be a mapping destination of a mapping as calculation of the prediction equation by Equation (3), and supplies the image to the learning unit 113. Here, the teacher image generation unit 111 supplies, for example, the learning image as a teacher image as it is to the learning unit 113.

The student image generation unit 112 generates, from the learning image, an image corresponding to the first image, as a student image as student data to be a student of learning of the tap coefficients, in other words, a student image to be a mapping source of the mapping as calculation of the prediction equation by Equation (3), and supplies the image to the learning unit 113. Here, for example, the student image generation unit 112 generates a decoded image by encoding and locally decoding the learning image similarly to the encoding device 11, and supplies the decoded image as the student image to the learning unit 113.

The learning unit 113 sequentially sets a pixel included in the student image from the student image generation unit 112 as a pixel of interest, and selects pixels having the same tap structure as those selected by the tap selection unit 101 of FIG. 12, for the pixel of interest, as the prediction taps from the student image. Moreover, the learning unit 113 uses a corresponding pixel included in the teacher image corresponding to the pixel of interest and the prediction taps of the pixel of interest to set up and solve the normal equation of Equation (10) for each class, thereby obtaining the tap coefficients for each class.

Figure 14:
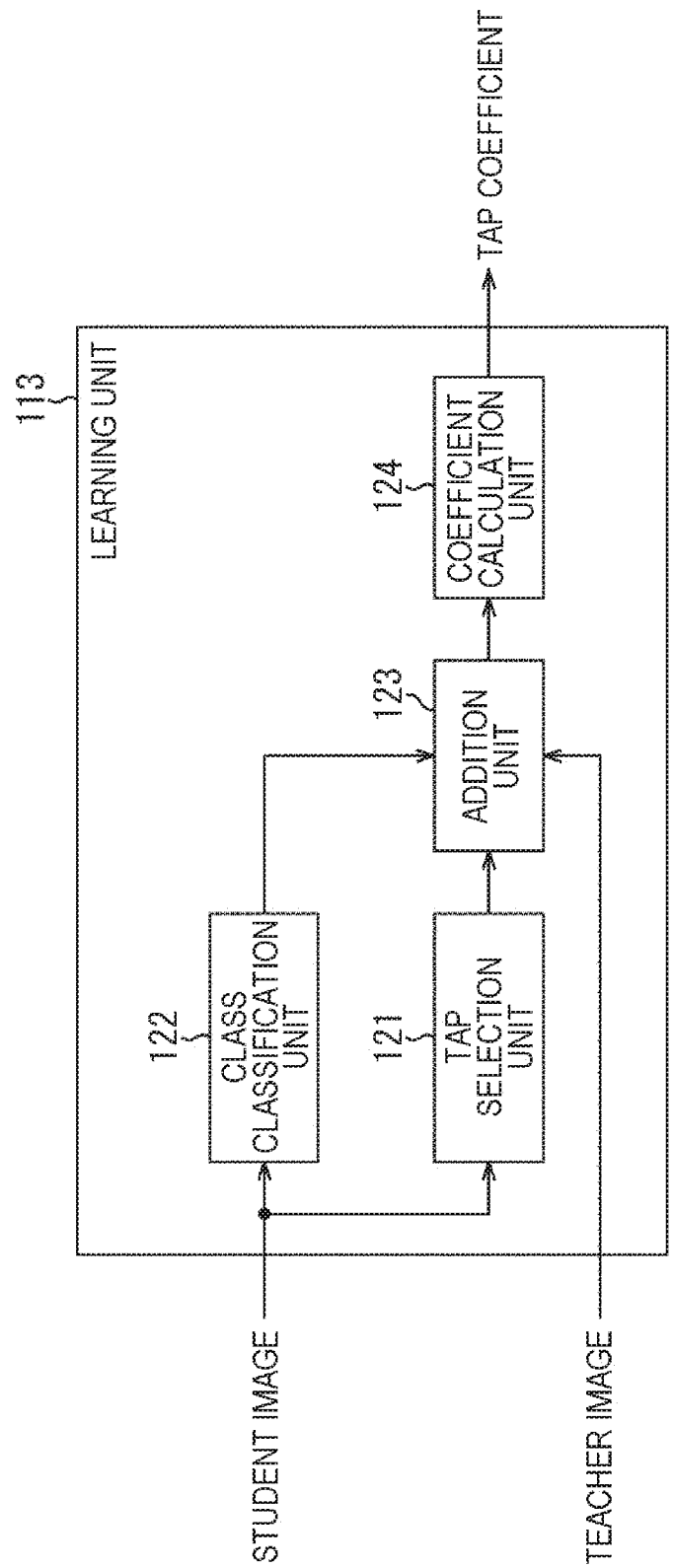
FIG. 14 is a block diagram illustrating a configuration example of a learning unit 113.

FIG. 14 is a block diagram illustrating a configuration example of the learning unit 113 of FIG. 13.

In FIG. 14, the learning unit 113 includes a tap selection unit 121, a class classification unit 122, an addition unit 123, and a coefficient calculation unit 124.

The student image is supplied to the tap selection unit 121 and the class classification unit 122, and the teacher image is supplied to the addition unit 123.

The tap selection unit 121 sequentially selects a pixel included in the student image as a pixel of interest, and supplies information representing the pixel of interest to a necessary block.

Moreover, the tap selection unit 121 selects, from the pixels included in the student image, the same pixels as those selected by the tap selection unit 101 of FIG. 12 as prediction taps, for the pixel of interest, therefore obtains prediction taps having the same tap structure as those obtained in the tap selection unit 101, and supplies the prediction taps to the addition unit 123.

The class classification unit 122 performs the same class classification as the class classification unit 102 of FIG. 12 for the pixel of interest by using the student image, and outputs a class of the pixel of interest obtained as a result of the class classification to the addition unit 123.

The addition unit 123 obtains a corresponding pixel (pixel value thereof) corresponding to the pixel of interest from pixels included in the teacher image, and performs addition for the corresponding pixel, and the pixels (pixel values thereof) of the student image as the prediction taps for the pixel of interest supplied from the tap selection unit 121, for each class of the pixel of interest supplied from the class classification unit 122.

In other words, the addition unit 123 is supplied with the corresponding pixel $y_k$ of the teacher image, the prediction tap $x_{n,k}$ of the pixel of interest as the student image, and the class of the pixel of interest.

The addition unit 123, for each class of the pixel of interest, uses the pixel $x_{n,k}$ of the student image as the prediction tap, to perform calculation corresponding to multiplication ($x_{n,k}x_{n',k}$) of the pixels of the student image, and the summation ($\Sigma$), in the matrix on the left side of Equation (10).

Moreover, the addition unit 123, for each class of the pixel of interest, again uses the prediction tap $x_{n,k}$ and the pixel $y_k$ of the teacher image, to perform calculation corresponding to multiplication ($x_{n,k}y_k$) of the prediction tap $x_{n,k}$ and the pixel $y_k$ of the teacher image, and the summation ($\Sigma$), in the vector on the right side of Equation (10).

In other words, the addition unit 123 stores, in its built-in memory (not illustrated), a component ($\Sigma x_{n,k}x_{n',k}$) of the matrix on the left side and a component ($\Sigma x_{n,k}y_k$) of the vector on the right side in Equation (10) obtained for the corresponding pixel of the teacher image corresponding to the pixel of interest last time, and, to the component ($\Sigma x_{n,k}x_{n',k}$) of the matrix or the component ($\Sigma x_{n,k}y_k$) of the vector, adds a corresponding component $x_{n,k+1}x_{n',k+1}$ or $x_{n,k+1}y_{k+1}$ calculated for a corresponding pixel $y_{k+1}$ corresponding to a new pixel of interest by using the corresponding pixel $y_{k+1}$ and a prediction tap $x_{n,k+1}$ (performs addition represented by the summation of Equation (10)).

Then, the addition unit 123 sets up the normal equation indicated in Equation (10) for each class by performing, for example, the addition described above with all the pixels of the student image as the pixels of interest, and supplies the normal equation to the coefficient calculation unit 124.

The coefficient calculation unit 124 solves the normal equation for each class supplied from the addition unit 123, to obtain and output the optimal tap coefficient $w_n$ for each class.

The coefficient acquisition unit 103 in the prediction device 100 of FIG. 12 can store the tap coefficient $w_n$ for each class obtained as described above.

Figure 15:
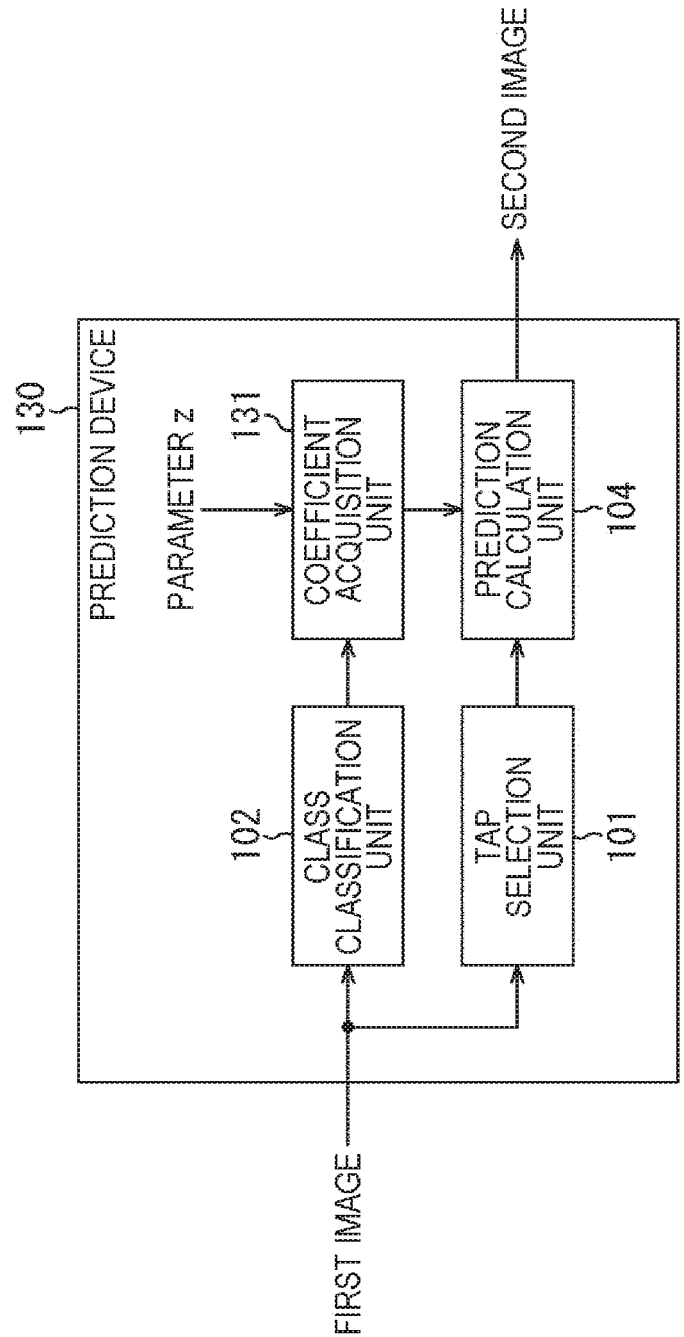
FIG. 15 is a block diagram illustrating a second configuration example of the prediction device that performs the class classification prediction processing.

FIG. 15 is a block diagram illustrating a second configuration example of the prediction device that performs the class classification prediction processing.

Note that, in the figure, portions corresponding to the case of FIG. 12 are denoted by the same reference numerals, and description thereof will be omitted below as appropriate.

In FIG. 15, a prediction device 130 includes the tap selection unit 101, the class classification unit 102, the prediction calculation unit 104, and a coefficient acquisition unit 131.

Thus, the prediction device 130 of FIG. 15 is common to the case of FIG. 12 in that the tap selection unit 101, the class classification unit 102, and the prediction calculation unit 104 are included.

However, FIG. 15 is different from the case of FIG. 12 in that the coefficient acquisition unit 131 is provided instead of the coefficient acquisition unit 103.

The coefficient acquisition unit 131 stores seed coefficients described later. Moreover, the parameter z is externally supplied to the coefficient acquisition unit 131.

The coefficient acquisition unit 131 generates, from the seed coefficients, a tap coefficient for each class corresponding to the parameter z, stores the tap coefficient, acquires, from the tap coefficient for each class, a tap coefficient of a class from the class classification unit 102, and supplies the acquired tap coefficient to the prediction calculation unit 104.

Figure 16:
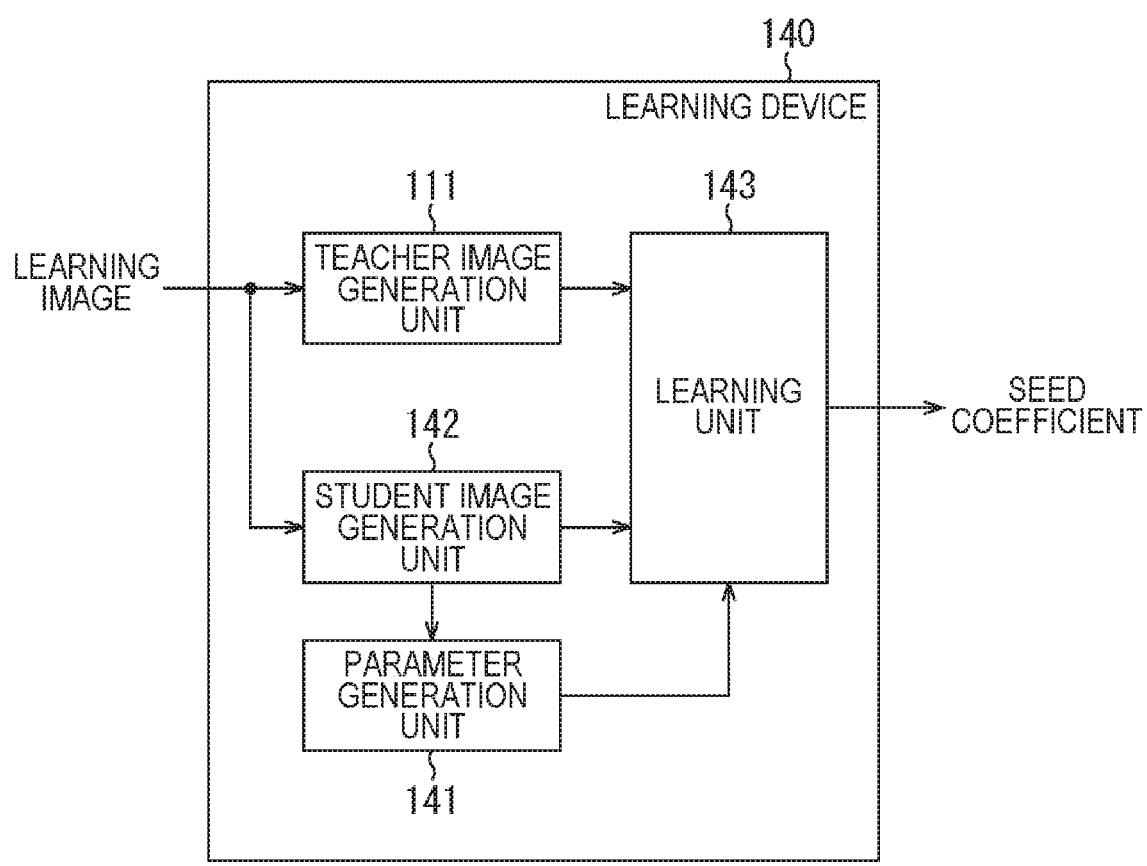
FIG. 16 is a block diagram illustrating a configuration example of a learning device that performs learning to obtain seed coefficients stored in a coefficient acquisition unit 131.

FIG. 16 is a block diagram illustrating a configuration example of a learning device that performs learning to obtain the seed coefficients stored in the coefficient acquisition unit 131.

In the learning device of FIG. 16, the seed coefficients are obtained, for example, for each class, the seed coefficients being coefficients included in a polynomial in the case of volumeization, in other words, in a case where the tap coefficient included in the prediction equation is approximated by the polynomial.

Now, it is assumed that the tap coefficient $w_n$ is approximated by the following polynomial using the seed coefficients and the parameter z.

[Expression 11]

$$w_n = \sum_{m=1}^{M} \beta_{m,n} z^{m-1} \quad (11)$$

However, in Equation (11), $\beta_{m,n}$ represents the m-th seed coefficient used to obtain the n-th tap coefficient $w_n$. Note that, in Equation (11), the tap coefficient $w_n$ is obtained by using M seed coefficients $\beta_{1,n}, \beta_{2,n}, \ldots, \beta_{M,n}$.

Here, Equation for calculating the tap coefficient $w_n$ from the seed coefficient $\beta_{m,n}$ and the parameter z is not limited to Equation (11).

Now, a value $z^{m-1}$ determined by the parameter z in Equation (11) is defined by the following Equation by introducing a new variable $t_m$.

[Expression 12]

$$t_m = z^{m-1} (m=1,2,\ldots,M) \quad (12)$$

By substituting Equation (12) into Equation (11), the following Equation is obtained.

[Expression 13]

$$w_n = \sum_{m=1}^{M} \beta_{m,n} t_m \quad (13)$$

According to Equation (13), the tap coefficient $w_n$ is obtained by a linear first-order equation of the seed coefficient $\beta_{m,n}$ and the variable $t_m$.

By the way, now, when the true value of the pixel value of the second pixel of the k-th sample is represented as $y_k$, and the predicted value of the true value $y_k$ obtained by Equation (3) is represented as $y_k'$, the prediction error $e_k$ is represented by the following Equation.

[Expression 14]

$$e_k = y_k - y_k' \quad (14)$$

Now, since the predicted value $y_k'$ of Equation (14) is obtained in accordance with Equation (3), the following Equation is obtained by replacing $y_k'$ of Equation (14) in accordance with Equation (3).

[Expression 15]

$$e_k = y_k - \left(\sum_{n=1}^{N} w_n x_{n,k}\right) \quad (15)$$

However, in Equation (15), $x_{n,k}$ represents the n-th first pixel as the prediction tap for the second pixel of the k-th sample as the corresponding pixel.

By substituting Equation (13) into $w_n$ in Equation (15), the following Equation is obtained.

[Expression 16]

$$e_k = y_k - \left( \sum_{n=1}^{N} \left( \sum_{m=1}^{M} \beta_{m,n} t_m \right) x_{n,k} \right) \quad (16)$$

The seed coefficient $\beta_{m,n}$ that makes the prediction error $e_k$ of Equation (16) zero is optimal for predicting the second pixel, but it is generally difficult to obtain such a seed coefficient $\beta_{m,n}$ for all the second pixels.

Thus, assuming that, for example, the least squares method is adopted as a criterion representing that the seed coefficient $\beta_{m,n}$ is optimal, the optimal seed coefficient $\beta_{m,n}$ can be obtained by minimizing a sum total E of square errors represented by the following Equation.

[Expression 17]

$$E = \sum_{k=1}^{K} e_k^2 \quad (17)$$

However, in Equation (17), K represents the number of samples (the number of samples for learning) of a set of a second pixel $y_k$ as a corresponding pixel and first pixels $x_{1,k}$, $x_{2,k}$, ..., $x_{N,k}$ as prediction taps for the second pixel $y_k$.

The minimum value (minimal value) of the sum total E of the square errors in Equation (17) is given by $\beta_{m,n}$ by which partial derivative of the sum total E with respect to the seed coefficient $\beta_{m,n}$ is made to be zero, as indicated in Equation (18).

[Expression 18]

$$\frac{\partial E}{\partial \beta_{m,n}} = \sum_{k=1}^{K} 2 \cdot \frac{\partial e_k}{\partial \beta_{m,n}} \cdot e_k = 0 \quad (18)$$

By substituting Equation (15) into Equation (18), the following Equation is obtained.

[Expression 19]

$$\sum_{k=1}^{K} t_m x_{n,k} e_k = \sum_{k=1}^{K} t_m x_{n,k} \left( y_k - \left( \sum_{n=1}^{N} \left( \sum_{m=1}^{M} \beta_{m,n} t_m \right) x_{n,k} \right) \right) = 0 \quad (19)$$

Now, $X_{i,p,j,q}$ and $Y_{i,p}$ are defined as indicated in Equations (20) and (21).

[Expression 20]

$$X_{i,p,j,q} = \sum_{k=1}^{K} x_{i,k} t_p x_{j,k} t_q \quad (20)$$

$(i = 1, 2, \ldots, N: j = 1, 2, \ldots, N: p = 1, 2, \ldots, M: q = 1, 2, \ldots, M)$ -continued

[Expression 21]

$$Y_{i,p} = \sum_{k=1}^{K} x_{i,k} t_p y_k \quad (21)$$

In this case, Equation (19) can be represented by a normal equation indicated in Equation (22) using $X_{i,p,j,q}$ and $Y_{i,p}$.

[Expression 22]

$$\begin{bmatrix} X_{1,1,1,1} & X_{1,1,1,2} & \cdots & X_{1,1,1,M} & X_{1,1,2,1} & \cdots & X_{1,1,N,M} \\ X_{1,2,1,1} & X_{1,2,1,2} & \cdots & X_{1,2,1,M} & X_{1,2,2,1} & \cdots & X_{1,2,N,M} \\ \vdots & \vdots & \ddots & \vdots & \vdots & & \vdots \\ X_{1,M,1,1} & X_{1,M,1,2} & \cdots & X_{1,M,1,M} & X_{1,M,2,1} & \cdots & X_{1,M,N,M} \\ X_{2,1,1,1} & X_{2,1,1,2} & \cdots & X_{2,M,1,M} & X_{2,M,2,1} & \cdots & X_{2,M,N,M} \\ \vdots & \vdots & & \vdots & \vdots & \ddots & \vdots \\ X_{N,M,1,1} & X_{N,M,1,2} & \cdots & X_{N,M,1,M} & X_{N,M,2,1} & \cdots & X_{N,M,N,M} \end{bmatrix} \begin{bmatrix} \beta_{1,1} \\ \beta_{2,1} \\ \vdots \\ \beta_{M,1} \\ \beta_{1,2} \\ \vdots \\ \beta_{M,N} \end{bmatrix} = \begin{bmatrix} Y_{1,1} \\ Y_{1,2} \\ \vdots \\ Y_{1,M} \\ Y_{2,1} \\ \vdots \\ Y_{N,M} \end{bmatrix} \quad (22)$$

The normal equation of Equation (22) can be solved for the seed coefficient $\beta_{m,n}$ by using, for example, a row reduction method (Gauss-Jordan elimination method), or the like.

In the prediction device 130 of FIG. 15, the seed coefficient $\beta_{m,n}$ for each class is stored in the coefficient acquisition unit 131, the seed coefficient $\beta_{m,n}$ being obtained by using second pixels $y_1, y_2, \ldots, y_K$ of the second image (original image) as the teacher image, and first pixels $x_{1,k}, x_{2,k}, \ldots, x_{N,k}$ of the first image (decoded image) as the student image, and performing learning to set up and solve the normal equation of Equation (22) for each class. Then, in the coefficient acquisition unit 131, the tap coefficient $w_n$ for each class is generated in accordance with Equation (11) from the seed coefficient $\beta_{m,n}$ and the parameter z externally supplied, and in the prediction calculation unit 104, Equation (3) is calculated by using the tap coefficient $w_n$, and the first pixel $x_n$ as the prediction tap for the pixel of interest, whereby the pixel value (predicted value thereof) is obtained of the second pixel (corresponding pixel corresponding to the pixel of interest).

FIG. 16 is a diagram illustrating a configuration example of a learning device that performs learning to obtain the seed coefficient $\beta_{m,n}$ for each class by setting up and solving the normal equation of Equation (22) for each class.

Note that, in the figure, portions corresponding to the case of FIG. 13 are denoted by the same reference numerals, and description thereof will be omitted below as appropriate.

In FIG. 16, a learning device 140 includes the teacher image generation unit 111, a parameter generation unit 141, a student image generation unit 142, and a learning unit 143.

Thus, the learning device 140 of FIG. 16 is common to the learning device 110 of FIG. 13 in that the teacher image generation unit 111 is included.

However, the learning device 140 of FIG. 16 is different from the learning device 110 of FIG. 13 in that the parameter generation unit 141 is newly included. Moreover, the learning device 140 of FIG. 16 is different from the learning device 110 of FIG. 13 in that the student image generation unit 142 and the learning unit 143 are provided respectively instead of the student image generation unit 112 and the learning unit 113.

The parameter generation unit 141 generates the parameter z depending on processing of generating a student image from the learning image in the student image generation unit 142, or the student image, and supplies the parameter z to the learning unit 143.

For example, in a case where, in the student image generation unit 142, the decoded image is generated by encoding and locally decoding a learning image similarly to the encoding device 11, the parameter generation unit 141 generates, as the parameter z, for example, a value corresponding to the amount of motion of the full-screen motion of the student image as the image feature value of the student image generated in the student image generation unit 142, for example. Furthermore, the parameter generation unit 141 generates, as the parameter z, for example, the quantization parameter QP (value corresponding thereto) used for encoding of the teacher image (learning image) performed in the generation of the student image in the student image generation unit 142. Moreover, the parameter generation unit 141 generates, as the parameter z, a value corresponding to the S/N of the student image generated in the student image generation unit 142.

In the parameter generation unit 141, the parameter z is generated for the student image (pixel thereof) generated in the student image generation unit 142.

Note that, in the parameter generation unit 141, for example, the value corresponding to the amount of motion of the full-screen motion of the student image, and the quantization parameter QP used for encoding of the teacher image performed in the generation of the student image, can be generated as two parameters z and z'. In addition, in the parameter generation unit 141, a plurality of parameters other than two, in other words, three or more parameters can be generated.

For example, in a case where two parameters z and z' are generated in the parameter generation unit 141, in the coefficient acquisition unit 103 of FIG. 15, two parameters z and z' are externally given, and the tap coefficient is generated by using the two parameters z and z' and the seed coefficients.

As described above, as the seed coefficients, it is possible to obtain seed coefficients capable of generating the tap coefficient by using two parameters z and z', and further three or more parameters, in addition to one parameter z, in other words, it is possible to approximate the tap coefficient by a polynomial using a plurality of parameters. However, in the present specification, to simplify the description, the description will be given with an example of seed coefficients that generate a tap coefficient by using one parameter z.

The student image generation unit 142 is supplied with a learning image similar to that supplied to the teacher image generation unit 111.

The student image generation unit 142 generates a student image from the learning image, and supplies the generated student image to the learning unit 143, similarly to the student image generation unit 112 of FIG. 13. In other words, for example, the student image generation unit 142 generates a decoded image by encoding and locally decoding the learning image similarly to the encoding device 11, and supplies the decoded image as the student image to the learning unit 113. Note that, the processing of the student image generation unit 142, and the like are referred to from the parameter generation unit 141.

The learning unit 143 obtains and outputs seed coefficients for each class by using the teacher image from the teacher image generation unit 111, the parameter z from the parameter generation unit 141, and the student image from the student image generation unit 142.

Figure 17:
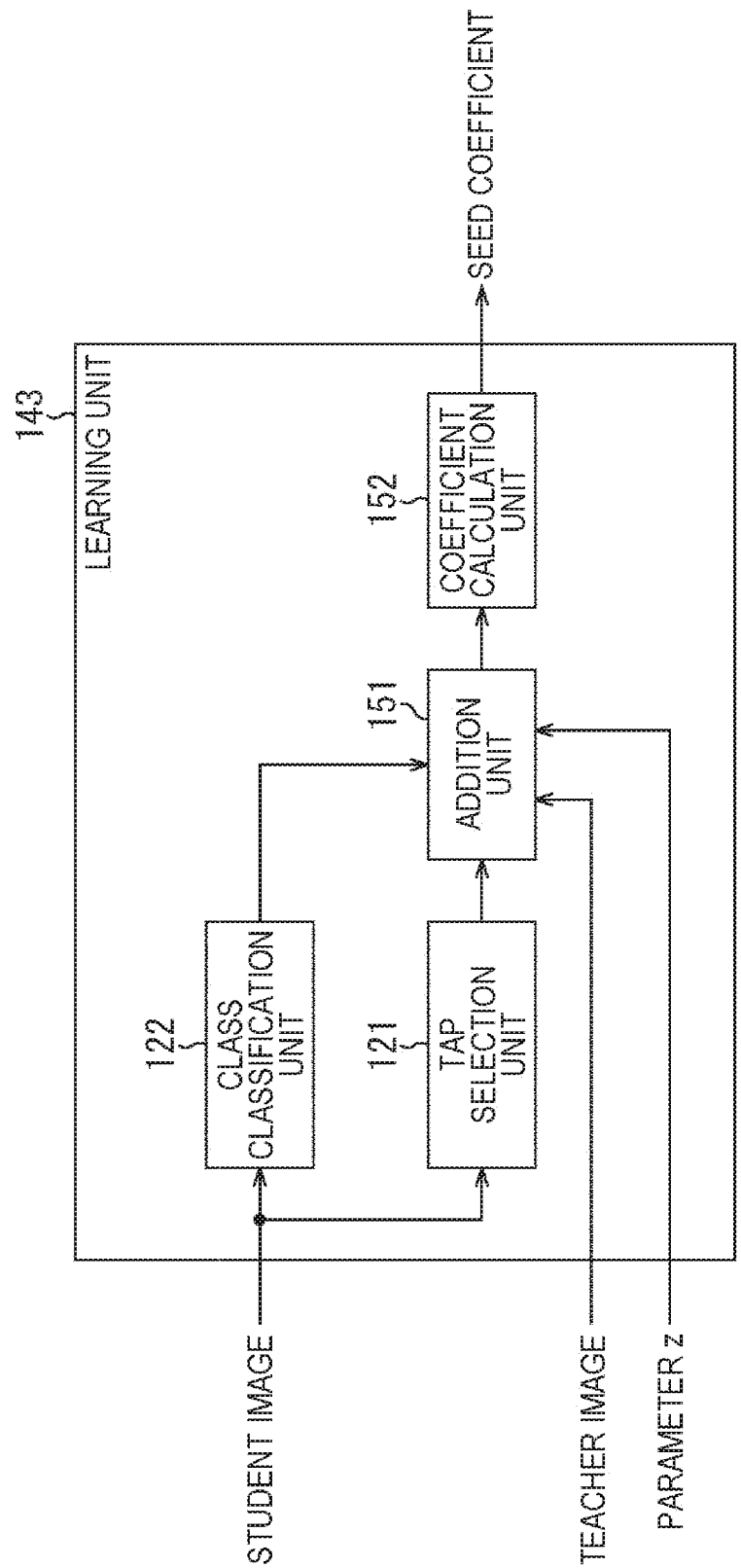
FIG. 17 is a block diagram illustrating a configuration example of a learning unit 143.

FIG. 17 is a block diagram illustrating a configuration example of the learning unit 143 of FIG. 16.

Note that, in the figure, portions corresponding to the learning unit 113 of FIG. 14 are denoted by the same reference numerals, and description thereof will be omitted below as appropriate.

In FIG. 17, the learning unit 143 includes the tap selection unit 121, the class classification unit 122, an addition unit 151, and a coefficient calculation unit 152.

Thus, the learning unit 143 of FIG. 17 is common to the learning unit 113 of FIG. 14 in that the tap selection unit 121 and the class classification unit 122 are included.

However, the learning unit 143 is different from the learning unit 113 of FIG. 14 in that the addition unit 151 and the coefficient calculation unit 152 are included respectively instead of the addition unit 123 and the coefficient calculation unit 124.

In FIG. 17, the tap selection unit 121 selects a prediction tap from the student image corresponding to the parameter z generated in the parameter generation unit 141 of FIG. 16, and supplies the prediction tap to the addition unit 151.

The addition unit 151 acquires a corresponding pixel corresponding to the pixel of interest from the teacher image from the teacher image generation unit 111 of FIG. 16, and performs addition for the corresponding pixel, a pixel of the student image (student pixel) as a prediction tap for the pixel of interest supplied from the tap selection unit 121, and the parameter z for the student image (pixel of interest thereof), for each class supplied from the class classification unit 122.

In other words, the addition unit 151 is supplied with the pixel (teacher pixel) $y_k$ of the teacher image corresponding to the pixel of interest, the prediction tap $x_{i,k}$ ($x_{j,k}$) for the pixel of interest output by the tap selection unit 121, and the class of the pixel of interest output by the class classification unit 122, and also the parameter z for the pixel of interest (the student image including the pixel of interest) is supplied from the parameter generation unit 141.

The addition unit 151, for each class supplied from the class classification unit 122, uses the prediction tap (student image) $x_{i,k}$ ($x_{j,k}$) and the parameter z, to perform calculation corresponding to multiplication ($x_{i,k}t_p x_{j,k}t_q$) of the student pixel and the parameter z, and the summation ($\Sigma$), for obtaining the component $X_{i,p,j,q}$ defined in Equation (20), in the matrix on the left side of Equation (22). Note that, $t_p$ in Equation (20) is calculated from the parameter z in accordance with Equation (12) The same applies to $t_q$ in Equation (20).

Moreover, the addition unit 151, for each class supplied from the class classification unit 122, again uses the prediction tap (student pixel) $x_{i,k}$, the corresponding pixel (teacher pixel) $y_k$, and the parameter z, to perform calculation corresponding to multiplication ($x_{i,k}t_p y_k$) of the student pixel $x_{i,k}$, the teacher pixel $y_k$, and the parameter z, and the summation ($\Sigma$), for obtaining the component $Y_{i,p}$ defined by Equation (21), in the vector on the right side of Equation (22). Note that, $t_p$ in Equation (21) is calculated from the parameter z in accordance with Equation (12).

In other words, the addition unit 151 stores, in its built-in memory (not illustrated), the component $X_{i,p,j,q}$ of the matrix on the left side and the component $Y_{i,p}$ of the vector on the right side in Equation (22) obtained for the corresponding pixel corresponding to the pixel of interest last time, and, to the component $X_{i,p,j,q}$ of the matrix or the component $Y_{i,p}$ of the vector, adds the corresponding component $x_{i,k}t_p x_{j,k}t_q$ or $x_{i,k}t_p y_k$ calculated for a teacher pixel that has become a corresponding pixel corresponding to a new pixel of interest by using the teacher pixel $y_k$, the student pixel $x_{i,k}$ ($x_{j,k}$), and the parameter z (performs addition represented by the summation in the component $X_{i,p,j,q}$ of Equation (20) or the component $Y_{i,p}$ of Equation (21)).

Then, for each value of the parameter z, the addition unit 151 sets up the normal equation indicated in Equation (22) for each class by performing the addition described above with all the pixels of the student image as the pixels of interest, and supplies the normal equation to the coefficient calculation unit 152.

The coefficient calculation unit 152 solves the normal equation for each class supplied from the addition unit 151, thereby obtaining and outputting the seed coefficient $\beta_{m,n}$ for each class.

By the way, in the learning device 140 of FIG. 16, the learning image is used as the teacher image, and the decoded image obtained by encoding and (locally) decoding the teacher image is used as the student image, and the learning is performed to obtain the seed coefficient $\beta_{m,n}$ that directly minimizes the sum total of the square errors of the predicted values y of the teacher images predicted by the linear first-order equation of Equation (3) from the tap coefficient $w_n$ and the student image $x_n$; however, as the learning of the seed coefficient $\beta_{m,n}$, learning can be performed to obtain the seed coefficient $\beta_{m,n}$ that, so to speak, indirectly minimizes the sum total of the square errors of the predicted values y of the teacher images.

In other words, the learning image is used as the teacher image, and the decoded image obtained by encoding and (locally) decoding the teacher image is used as the student image, and the tap coefficient $w_n$ can be obtained that minimizes the sum total of the square errors of the predicted values y of the teacher images predicted by the linear first-order prediction equation of Equation (3) by using the tap coefficient $w_n$ and the student image $x_n$, for each value of the parameter z. Then, the tap coefficient $w_n$ obtained for each value of the parameter z is used as teacher data to be a teacher of the learning, and the parameter z is used as student data to be a student of the learning, and the seed coefficient $\beta_{m,n}$ can be obtained that minimizes the sum total of the square errors of the predicted values of the tap coefficients $w_n$ as the teacher data predicted by Equation (13) from the seed coefficient $\beta_{m,n}$ and the variable $t_m$ corresponding to the parameter z that is the student data.

The tap coefficient is obtained from the seed coefficient $\beta_{m,n}$ and the variable $t_m$ corresponding to the parameter z, as indicated in Equation (13). Then, now, when the tap coefficient obtained by Equation (13) is represented as $w_n'$, the seed coefficient $\beta_{m,n}$ that makes an error $e_n$, which is represented by the following Equation (23) and is an error between the optimal tap coefficient $w_n$ and the tap coefficient $w_n'$ obtained by the following Equation (13), zero is an optimal seed coefficient for obtaining the optimal tap coefficient $w_n$, but it is generally difficult to obtain such a seed coefficient $\beta_{m,n}$ for all the tap coefficients $w_n$.

[Expression 23]

$$e_n = w_n - w_n' \quad (23)$$

Note that, Equation (23) can be transformed into the following Equation by Equation (13).

[Expression 24]

$$e_n = w_n - \left(\sum_{m=1}^{M} \beta_{m,n} t_m\right) \quad (24)$$

Thus, assuming that, for example, the least squares method is again adopted as a criterion representing that the seed coefficient $\beta_{m,n}$ is optimal, the optimal seed coefficient $\beta_{m,n}$ can be obtained by minimizing a sum total E of square errors represented by the following Equation.

[Expression 25]

$$E = \sum_{n=1}^{N} e_n^2 \quad (25)$$

The minimum value (minimal value) of the sum total E of the square errors in Equation (25) is given by $\beta_{m,n}$ by which partial derivative of the sum total E with respect to the seed coefficient $\beta_{m,n}$ is made to be zero, as indicated in Equation (26).

[Expression 26]

$$\frac{\partial E}{\partial \beta_{m,n}} = \sum_{m=1}^{M} 2 \frac{\partial e_n}{\partial \beta_{m,n}} \cdot e_n = 0 \quad (26)$$

By substituting Equation (24) into Equation (26), the following Equation is obtained.

[Expression 27]

$$\sum_{m=1}^{M} t_m \left( w_n - \left( \sum_{m=1}^{M} \beta_{m,n} t_m \right) \right) = 0 \quad (27)$$

Now, $X_{i,j}$, and $Y_i$ are defined as indicated in Equations (28) and (29).

[Expression 28]

$$X_{i,j} = \sum_{z=0}^{Z} t_i t_j \ (i = 1, 2, \ldots, M: j = 1, 2, \ldots, M) \quad (28)$$

[Expression 29]

$$Y_i = \sum_{z=0}^{Z} t_i w_n \quad (29)$$

In this case, Equation (27) can be represented by a normal equation indicated in Equation (30) using $X_{i,j}$ and $Y_i$.

[Expression 30]

$$\begin{bmatrix} X_{1,1} & X_{1,2} & \ldots & X_{1,M} \\ X_{2,1} & X_{2,1} & \ldots & X_{2,2} \\ \vdots & \vdots & \ddots & \vdots \\ X_{M,1} & X_{M,2} & \ldots & X_{M,M} \end{bmatrix} \begin{bmatrix} \beta_{1,n} \\ \beta_{2,n} \\ \vdots \\ \beta_{M,n} \end{bmatrix} = \begin{bmatrix} Y_1 \\ Y_2 \\ \vdots \\ Y_M \end{bmatrix} \quad (30)$$

The normal equation of Equation (30) can also be solved for the seed coefficient $\beta_{m,n}$ by using, for example, a row reduction method, or the like.

In the learning unit 143 (FIG. 17), as described above, learning can also be performed to obtain the seed coefficient $\beta_{m,n}$ by setting up and solving the normal equation of Equation (30).

In this case, the addition unit 151 performs addition for the corresponding pixel of the teacher image corresponding to the pixel of interest in the teacher image from the teacher image generation unit 111, and the student image as the prediction tap for the pixel of interest supplied from the tap selection unit 121, for each class supplied from the class classification unit 122 and for each value of the parameter z output by the parameter generation unit 141.

In other words, the addition unit 151 is supplied with the teacher pixel (corresponding pixel) $y_k$ of the teacher image, the prediction tap $x_{n,k}$, the class of the pixel of interest, and the parameter z for the student image (pixel of interest thereof).

The addition unit 151, for each class of the pixel of interest, and for each value of the parameter z, uses the prediction tap (student pixel) $x_{n,k}$ to perform calculation corresponding to multiplication $(x_{n,k}x_{n',k})$ of the student pixels, and the summation ($\Sigma$), in the matrix on the left side of Equation (10).

Moreover, the addition unit 151, for each class of the pixel of interest, and for each value of the parameter z, uses the prediction tap (student pixel) $x_{n,k}$ and the teacher pixel $y_k$, to perform calculation corresponding to multiplication $(x_{n,k}y_k)$ of the student pixel $x_{n,k}$ and the teacher pixel $y_k$, and the summation ($\Sigma$), in the vector on the right side of Equation (10).

In other words, the addition unit 151 stores, in its built-in memory (not illustrated), the component ($\Sigma x_{n,k}x_{n',k}$) of the matrix on the left side and the component ($\Sigma x_{n,k}y_k$) of the vector on the right side in Equation (10) obtained for the teacher pixel (corresponding pixel) of the teacher image corresponding to the pixel of interest last time, and, to the component ($\Sigma x_{n,k}x_{n',k}$) of the matrix or the component ($\Sigma x_{n,k}y_k$) of the vector, adds a corresponding component $x_{n,k+1}x_{n',k+1}$ or $x_{n,k+1}y_{k+1}$ calculated for a teacher pixel that has become a corresponding pixel corresponding to a new pixel of interest by using the teacher pixel $y_{k+1}$ and the student pixel $x_{n,k+1}$ (performs addition represented by the summation of Equation (10)).

Then, the addition unit 151 sets up the normal equation indicated in Equation (10), for each value of the parameter z, for each class by performing the addition described above with all the pixels of the student image as the pixels of interest.

Thus, the addition unit 151 sets up the normal equation of Equation (10) for each class, similarly to the addition unit 123 of FIG. 14. However, the addition unit 151 is different from the addition unit 123 of FIG. 14 in that the normal equation of Equation (10) is further set up also for each value of the parameter z.

Moreover, the addition unit 151 obtains the optimal tap coefficient $w_n$ for each value of the parameter z for each class by solving the normal equation for each value of the parameter z for each class.

Thereafter, the addition unit 151 performs addition for the parameter z (variable $t_m$ corresponding thereto) supplied from the parameter generation unit 141 (FIG. 16) and the optimal tap coefficient $w_n$ for each class.

In other words, the addition unit 151 uses the variable $t_i$ ($t_j$) obtained by Equation (12) from the parameter z supplied from the parameter generation unit 141, to perform calculation corresponding to multiplication ($t_it_j$) of the variables $t_i(t_j)$ corresponding to the parameter z, and the summation ($\Sigma$), for obtaining the component $X_{i,j}$ defined by Equation (28), in the matrix on the left side of Equation (30), for each class.

Here, since the component $X_{i,j}$ is determined only by the parameter z and has no relation to the class, the calculation of the component $X_{i,j}$ does not need to be performed for each class, and need only to be performed once.

Moreover, the addition unit 151 uses the variable $t_i$ obtained by Equation (12) from the parameter z supplied from the parameter generation unit 141, and the optimal tap coefficient $w_n$ supplied from the addition unit 151, to perform calculation corresponding to multiplication ($t_iw_n$) of the variable $t_i$ corresponding to the parameter z and the optimal tap coefficient $w_n$, and the summation ($\Sigma$), for obtaining the component $Y_i$ defined by Equation (29), in the vector on the right side of Equation (30), for each class.

The addition unit 151 sets up the normal equation of Equation (30) for each class, by obtaining the component $X_{i,j}$ represented by Equation (28) and the component $Y_i$ represented by Equation (29) for each class, and supplies the normal equation to the coefficient calculation unit 152.

The coefficient calculation unit 152 obtains and outputs the seed coefficient $\beta_{m,n}$ for each class by solving the normal equation of Equation (30) for each class supplied from the addition unit 151.

The coefficient acquisition unit 131 of FIG. 15 can store the seed coefficient $\beta_{m,n}$ for each class obtained as described above.

Note that, in the case described above, the tap coefficient $w_n$ is approximated by a polynomial $\beta_{1,n}z^0 + \beta_{2,n}z^1 + \ldots + \beta_{M,n}z^{M-1}$ using one parameter z as indicated in Equation (11); however, in addition, the tap coefficient $w_n$ can be approximated by, for example, a polynomial $\beta_{1,n}z_x^0z_y^0 + \beta_{2,n}z_x^1z_y^0 + \beta_{3,n}z_x^2z_y^0 + \beta_{4,n}z_x^3z_y^0 + \beta_{5,n}z_x^0z_y^1 + \beta_{6,n}z_x^0z_y^2 + \beta_{7,n}z_x^0z_y^3 + \beta_{8,n}z_x^1z_y^1 + \beta_{9,n}z_x^2z_y^1 + \beta_{10,n}z_x^1z_y^2$ using two parameters $z_x$ and $z_y$. In this case, by defining the variable $t_m$ defined in Equation (12) by, for example, $t_1=z_x^0z_y^0$, $t_2=z_x^1z_y^0$, $t_3=z_x^2z_y^0$, $t_4=z_x^3z_y^0$, $t_5=z_x^0z_y^1$, $t_6=z_x^0z_y^2$, $t_7=z_x^0z_y^3$, $t_8=z_x^1z_y^1$, $t_9=z_x^2z_y^1$, and $t_{10}=z_x^1z_y^2$, instead of Equation (12), the tap coefficient $w_n$ can be finally represented by Equation (13), and thus, in the learning device 140 of FIG. 16, the tap coefficient $w_n$ can be obtained approximated by a polynomial using the two parameters $z_x$ and $z_y$.

<Configuration Example of Encoding Device 11>

Figure 18:
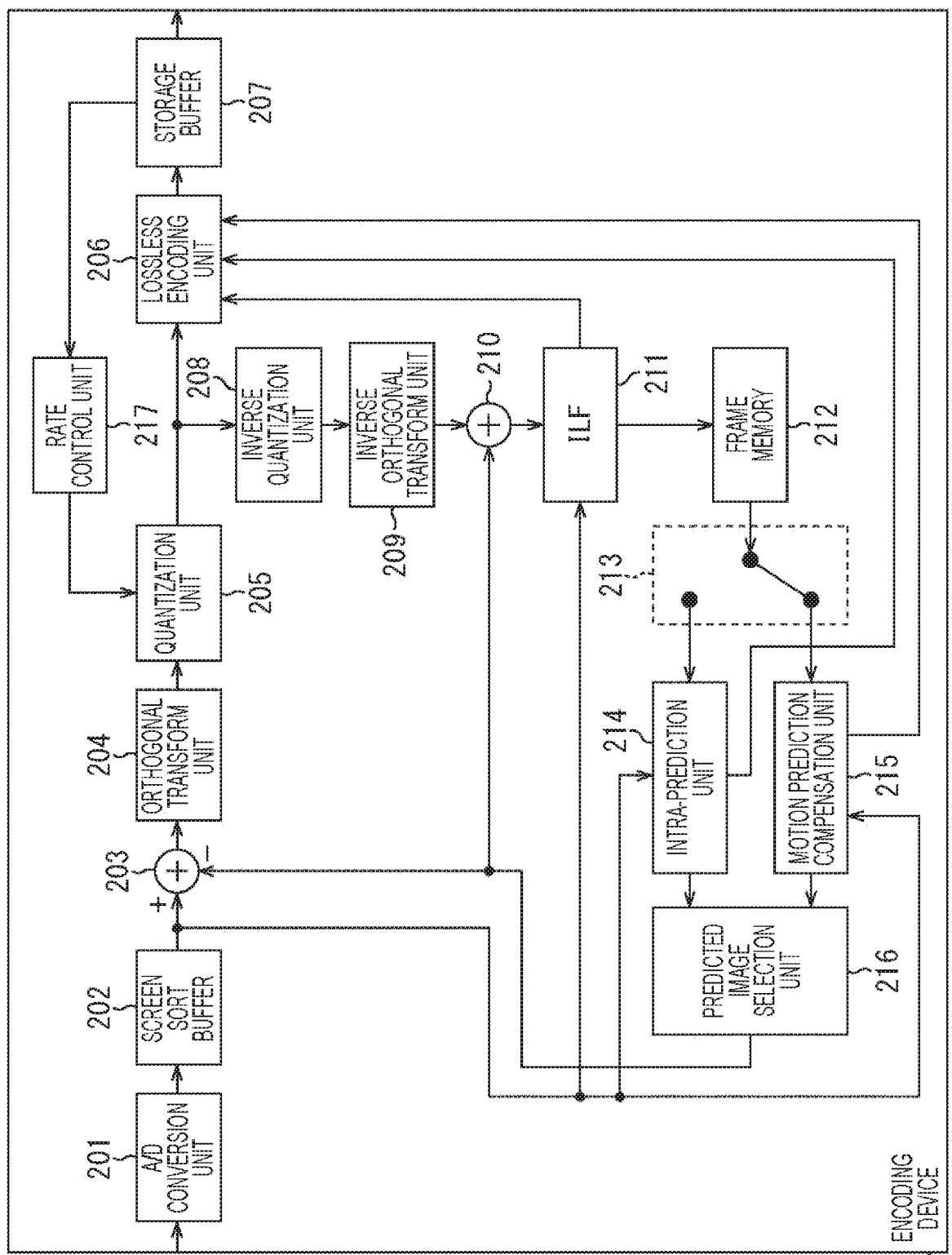
FIG. 18 is a block diagram illustrating a detailed configuration example of the encoding device 11.

FIG. 18 is a block diagram illustrating a detailed configuration example of the encoding device 11 of FIG. 8.

Note that, in the block diagram described below, lines for supplying information (data) necessary for processing of each block are omitted as appropriate to avoid complicating the drawing.

In FIG. 18, the encoding device 11 includes an A/D conversion unit 201, a sort buffer 202, a calculation unit 203, an orthogonal transform unit 204, a quantization unit 205, a lossless encoding unit 206, and a storage buffer 207. Moreover, the encoding device 11 includes an inverse quantization unit 208, an inverse orthogonal transform unit 209, a calculation unit 210, an ILF 211, a frame memory 212, a selection unit 213, an intra-prediction unit 214, a motion prediction compensation unit 215, a predicted image selection unit 216, and a rate control unit 217.

The A/D conversion unit 201 performs A/D conversion of an original image of an analog signal into an original image of a digital signal, and supplies the original image to a sort buffer 202 for storage.

The sort buffer 202 sorts frames of the original image into the encoding (decoding) order from the display order according to the Group Of Picture (GOP), and supplies the frames to the calculation unit 203, the intra-prediction unit 214, the motion prediction compensation unit 215, and the ILF 211.

The calculation unit 203 subtracts a predicted image supplied from the intra-prediction unit 214 or the motion prediction compensation unit 215 via the predicted image selection unit 216 from the original image from the sort buffer 202, and supplies a residual (prediction residual) obtained by the subtraction to the orthogonal transform unit 204.

For example, in the case of an image on which inter-encoding is performed, the calculation unit 203 subtracts the predicted image supplied from the motion prediction compensation unit 215 from the original image read from the sort buffer 202.

The orthogonal transform unit 204 performs orthogonal transform such as discrete cosine transform or Karhunen-Loeve transform on the residual supplied from the calculation unit 203. Note that, the orthogonal transform method is arbitrary. The orthogonal transform unit 204 supplies orthogonal transform coefficients obtained by orthogonal exchange to the quantization unit 205.

The quantization unit 205 quantizes the orthogonal transform coefficients supplied from the orthogonal transform unit 204. The quantization unit 205 sets the quantization parameter QP on the basis of a target value of the code amount (code amount target value) supplied from the rate control unit 217, and quantizes the orthogonal transform coefficients. Note that, the quantization method is arbitrary. The quantization unit 205 supplies coded data that is the quantized orthogonal transform coefficients to the lossless encoding unit 206.

The lossless encoding unit 206 encodes the quantized orthogonal transform coefficients as coded data from the quantization unit 205 with a predetermined lossless encoding method. Since the orthogonal transform coefficients are quantized under the control of the rate control unit 217, the code amount of an encoded bit stream obtained by the lossless encoding of the lossless encoding unit 206 is of the code amount target value set by the rate control unit 217 (or approximates to the code amount target value).

Furthermore, the lossless encoding unit 206 acquires, from each block, encoding information necessary for decoding by the decoding device 12 out of encoding information regarding predictive encoding by the encoding device 11.

Here, the encoding information includes, for example, prediction modes of intra-prediction and inter-prediction, motion information such as a motion vector, the code amount target value, the quantization parameter QP, a picture type (I, P, B), Coding Unit (CU) and Coding Tree Unit (CTU) information, or the like.

For example, the prediction mode can be acquired from the intra-prediction unit 214 or the motion prediction compensation unit 215. Furthermore, for example, the motion information can be acquired from the motion prediction compensation unit 215.

The lossless encoding unit 206 acquires the encoding information, and also acquires, from the ILF 211, filter information regarding filter processing in the ILF 211.

The lossless encoding unit 206 encodes the encoding information and the filter information with a lossless encoding method, for example, variable-length encoding or arithmetic encoding such as Context-Adaptive Variable Length Coding (CAVLC) or Context-Adaptive Binary Arithmetic Coding (CABAC), or others, generates an encoded bit stream including the encoding information and the filter information after encoding, and the coded data from the quantization unit 205, and supplies the encoded bit stream to the storage buffer 207.

The storage buffer 207 temporarily stores the encoded bit stream supplied from the lossless encoding unit 206. The encoded bit stream stored in the storage buffer 207 is read and transmitted at a predetermined timing.

The coded data that is the orthogonal transform coefficients quantized by the quantization unit 205 is supplied to the lossless encoding unit 206 and also to the inverse quantization unit 208. The inverse quantization unit 208 performs inverse quantization on the quantized orthogonal transform coefficients with a method corresponding to the quantization by the quantization unit 205, and outputs the orthogonal transform coefficients obtained by the inverse quantization to the inverse orthogonal transform unit 209.

The inverse orthogonal transform unit 209 performs inverse orthogonal transform on the orthogonal transform coefficients supplied from the inverse quantization unit 208 with a method corresponding to orthogonal transform processing performed by the orthogonal transform unit 204, and supplies a residual obtained as a result of the inverse orthogonal transform to the calculation unit 210.

The calculation unit 210 adds the predicted image supplied from the intra-prediction unit 214 or the motion prediction compensation unit 215 via the predicted image selection unit 216 to the residual supplied from the inverse orthogonal transform unit 209, and therefore obtains and outputs a decoded image (a part thereof) obtained by decoding the original image.

The decoded image output by the calculation unit 210 is supplied to the ILF 211.

The ILF 211 predicts (restores) an original image by performing, for example, filter processing based on the class classification prediction processing.

The ILF 211 is supplied with the decoded image from the calculation unit 210, and is also supplied with the original image corresponding to the decoded image from the sort buffer 202.

The ILF 211 performs learning to obtain tap coefficients for each class by using a student image corresponding to the decoded image from the calculation unit 210, and a teacher image corresponding to the original image from the sort buffer 202.

In other words, the ILF 211 performs learning to obtain the tap coefficients for each class included in a higher-order prediction equation, by using, for example, the decoded image itself from the calculation unit 210 as the student image, and also using the original image itself from the sort buffer 202 as the teacher image.

Moreover, the ILF 211 supplies, to the lossless encoding unit 206, filter information including as necessary the tap coefficients for each class obtained by the learning, selection information, and format information.

Furthermore, the ILF 211 generates a filter image that predicts the original image by performing the class classification prediction processing as filter processing of applying a prediction equation using the tap coefficients obtained by the learning to the decoded image from the calculation unit 210.

In other words, the ILF 211 performs the class classification prediction processing using the tap coefficients for each class with the decoded image from the calculation unit 210 as the first image, thereby converting the decoded image as the first image into the filter image as the second image corresponding to the original image (generating the filter image) to output the filter image.

The filter image output by the ILF 211 is supplied to the frame memory 212.

Here, in the ILF 211, as described above, the learning is performed to obtain the tap coefficients included in the higher-order prediction equation with the decoded image as the student image and also with the original image as the teacher image, and the higher-order prediction equation using the tap coefficients obtained by the learning is applied to the decoded image, whereby the filter image is generated. Thus, the filter image obtained by the ILF 211 is an image in which the details of the original image are accurately restored.

Note that, the ILF 211 can function as one or more filters among a deblocking filter, an adaptive offset filter, a bilateral filter, and an adaptive loop filter depending on the student image and the teacher image used for the learning of the tap coefficients.

Furthermore, in a case where the ILF 211 functions as two or more filters among the deblocking filter, the adaptive offset filter, the bilateral filter, and the adaptive loop filter, the arrangement order of the two or more filters is arbitrary.

Moreover, in the ILF 211, seed coefficients by which the tap coefficient is volumeized can be obtained, and the class classification prediction processing can be performed by using the tap coefficient obtained from the seed coefficients. In this case, the filter information includes the seed coefficients instead of the tap coefficient.

The frame memory 212 temporarily stores the filter image supplied from the ILF 211 as a restored image obtained by restoring the original image. The restored image stored in the frame memory 212 is supplied to the selection unit 213 at a necessary timing, as a reference image used for generating a predicted image.

The selection unit 213 selects a supply destination of the reference image supplied from the frame memory 212. For example, in a case where the intra-prediction is performed in the intra-prediction unit 214, the selection unit 213 supplies the reference image supplied from the frame memory 212 to the intra-prediction unit 214. Furthermore, for example, in a case where inter-prediction is performed in the motion prediction compensation unit 215, the selection unit 213 supplies the reference image supplied from the frame memory 212 to the motion prediction compensation unit 215.

The intra-prediction unit 214 performs intra-prediction (in-screen prediction) with, for example, the Prediction Unit (PU) as a unit of processing, by using the original image supplied from the sort buffer 202, and the reference image supplied from the frame memory 212 via the selection unit 213. The intra-prediction unit 214 selects an optimal intra-prediction mode on the basis of a predetermined cost function (for example, RD cost, or the like), and supplies a predicted image generated in the optimal intra-prediction mode to the predicted image selection unit 216. Furthermore, as described above, the intra-prediction unit 214 appropriately supplies the prediction mode indicating the intra-prediction mode selected on the basis of the cost function to the lossless encoding unit 206 and the like.

The motion prediction compensation unit 215 performs motion prediction (inter-prediction) with, for example, the PU as a unit of processing, by using the original image supplied from the sort buffer 202, and the reference image supplied from the frame memory 212 via the selection unit 213. Moreover, the motion prediction compensation unit 215 performs motion compensation depending on the motion vector detected by the motion prediction, to generate a predicted image. The motion prediction compensation unit 215 performs inter-prediction in a plurality of inter-prediction modes prepared in advance, to generate the predicted image.

The motion prediction compensation unit 215 selects an optimal inter-prediction mode on the basis of a predetermined cost function of the predicted image obtained for each of the plurality of inter-prediction modes. Moreover, the motion prediction compensation unit 215 supplies the predicted image generated in the optimal inter-prediction mode to the predicted image selection unit 216.

Furthermore, the motion prediction compensation unit 215 supplies, to the lossless encoding unit 206, a prediction mode indicating the inter-prediction mode selected on the basis of the cost function, and motion information such as a motion vector required in decoding of the coded data encoded in the inter-prediction mode, and the like.

The predicted image selection unit 216 selects a supply source (the intra-prediction unit 214 or the motion prediction compensation unit 215) of the predicted image to be supplied to the calculation units 203 and 210, and supplies a predicted image supplied from the selected supply source to the calculation units 203 and 210.

The rate control unit 217 controls the rate of quantization operation in the quantization unit 205 on the basis of the code amount of the encoded bit stream stored in the storage buffer 207 so that overflow or underflow does not occur. In other words, the rate control unit 217 sets a target code amount of the encoded bit stream not to cause overflow and underflow of the storage buffer 207, and supplies the target code amount to the quantization unit 205.

Note that, in FIG. 18, from the calculation unit 203 to the lossless encoding unit 206 correspond to the encoding unit 21 of FIG. 8, from the inverse quantization unit 208 to the calculation unit 210 correspond to the local decoding unit 23 of FIG. 8, and the ILF 211 corresponds to the filter unit 24 of FIG. 8.

<Configuration Example of ILF 211>

Figure 19:
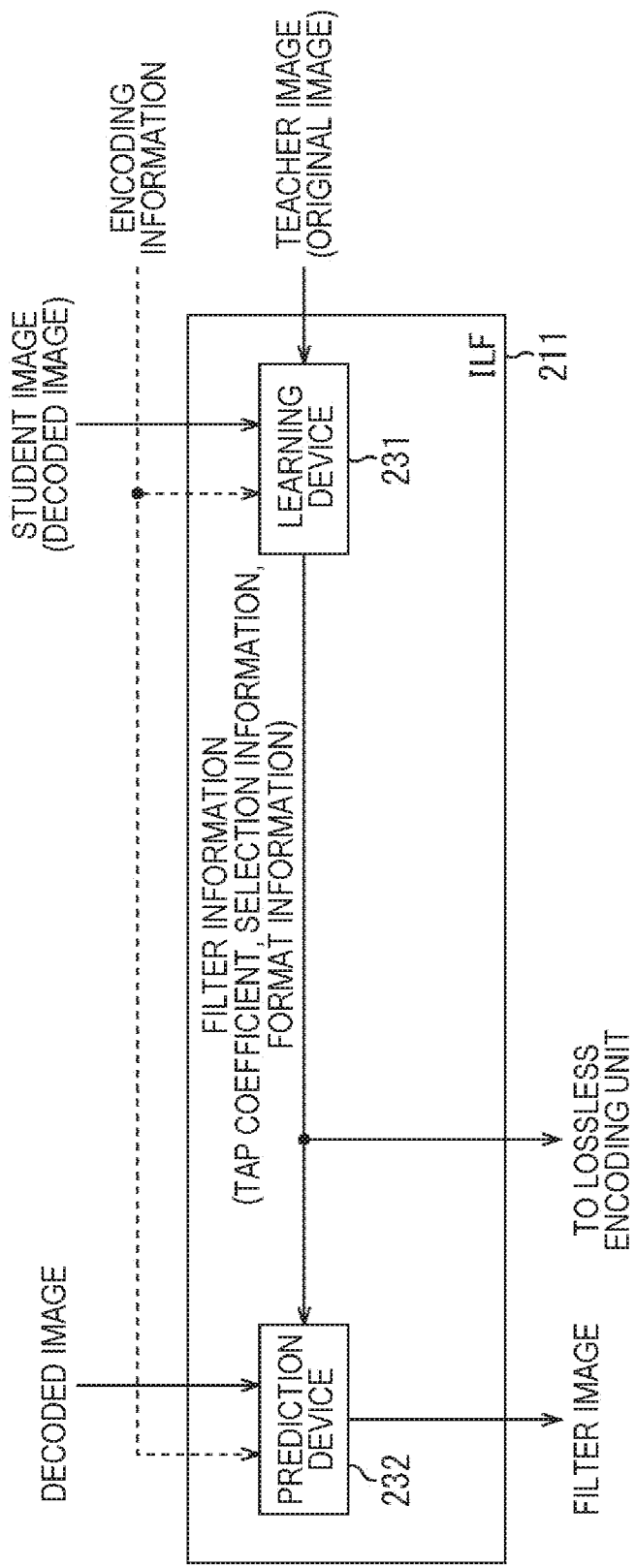
FIG. 19 is a block diagram illustrating a configuration example of an ILF 211.

FIG. 19 is a block diagram illustrating a configuration example of the ILF 211 of FIG. 18.

In FIG. 19, the ILF 211 includes a learning device 231 and a prediction device 232.

The learning device 231 is supplied with the original image from the sort buffer 202 (FIG. 18), and is supplied with the decoded image from the calculation unit 210 (FIG. 18).

The learning device 231 performs learning (hereinafter, also referred to as tap coefficient learning) to obtain tap coefficients for each class with the decoded image as the student image and the original image as the teacher image.

Moreover, the learning device 231 supplies the tap coefficients for each class obtained by the tap coefficient learning, and moreover, the selection information and the format information, as the filter information, to the prediction device 232, and also to the lossless encoding unit 206 (FIG. 18).

Note that, in the learning device 231, the tap coefficient learning can be performed by using the encoding information as necessary.

The prediction device 232 is supplied with the decoded image from the calculation unit 210 (FIG. 18), and is supplied with the filter information from the learning device 231.

The prediction device 232 updates the tap coefficients for each class by using the filter information from the learning device 231. Moreover, the prediction device 232, with the decoded image as the first image, performs filter processing (class classification prediction processing as the filter processing) of applying a higher-order prediction equation using the tap coefficients for each class to the first image, to generate a filter image that is a predicted value of the second image as the original image, and supplies the filter image to the frame memory 212 (FIG. 18).

Note that, the prediction device 232 can perform the filter processing by using the encoding information, similarly to the learning device 231.

<Configuration Example of Learning Device 231>

Figure 20:
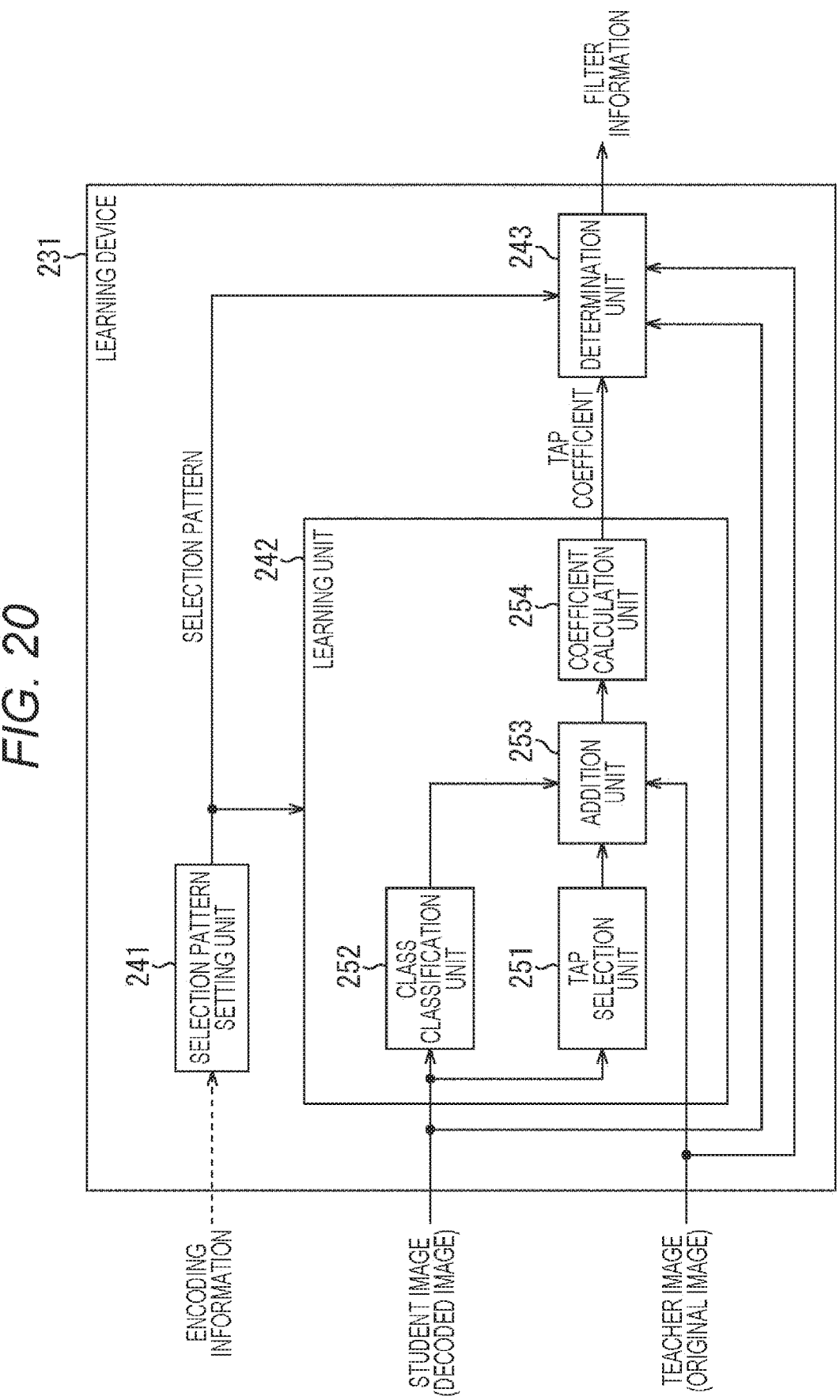
FIG. 20 is a block diagram illustrating a configuration example of a learning device 231.

FIG. 20 is a block diagram illustrating a configuration example of the learning device 231 of FIG. 19.

In FIG. 20, the learning device 231 includes a selection pattern setting unit 241, a learning unit 242, and a determination unit 243.

The selection pattern setting unit 241 stores, for example, a plurality of selection patterns (information thereof) prepared in advance, as selection patterns for selecting terms to be adopted in the reduced prediction equation from terms included in the all combinations prediction equation.

The selection pattern setting unit 241 sequentially sets the plurality of selection patterns prepared in advance as a pattern of interest to be focused, and supplies the selection pattern as the pattern of interest to the learning unit 242 and the determination unit 243.

The learning unit 242 includes a tap selection unit 251, a class classification unit 252, an addition unit 253, and a coefficient calculation unit 254.

In the learning unit 242, from the tap selection unit 251 to the coefficient calculation unit 254 are respectively configured similarly to from the tap selection unit 121 to the coefficient calculation unit 124 included in the learning unit 113 in FIG. 14. Thus, the learning unit 242 obtains the tap coefficients similarly to the learning unit 113 in FIG. 14.

However, the tap selection unit 251 selects pixels included in the terms of the reduced prediction equation of the selection pattern as the pattern of interest from the selection pattern setting unit 241 (reduced prediction equation including terms selected from the all combinations prediction equation in accordance with the selection pattern), as prediction taps from the student image.

Furthermore, the addition unit 253 performs addition for terms included in the normal equation for obtaining the tap coefficients (first-order coefficient and second-order coefficient) included in the reduced prediction equation of the selection pattern as the pattern of interest from the selection pattern setting unit 241.

Then, the coefficient calculation unit 254 solves the normal equation obtained by the addition unit 253, thereby obtaining tap coefficients for each class included in the reduced prediction equation of the selection pattern as the pattern of interest from the selection pattern setting unit 241 to supply the tap coefficients to the determination unit 243.

The determination unit 243 stores the selection pattern as the pattern of interest from the selection pattern setting unit 241, and the tap coefficients (for each class) of the reduced prediction equation of the selection pattern as the pattern of interest from the learning unit 242 (coefficient calculation unit 254 thereof) in association with each other.

Moreover, for each of the plurality of selection patterns sequentially supplied as the pattern of interest from the selection pattern setting unit 241, the determination unit 243 determines an expression format (optimum expression format) of the tap coefficients that optimize the coding efficiency in a case where filter processing using the reduced prediction equation of the selection pattern is performed.

Then, for each of the plurality of selection patterns, the determination unit 243 determines a selection pattern that optimizes the coding efficiency in a case where filter processing is performed using the reduced prediction equation being a reduced prediction equation of the selection pattern and including the tap coefficients in the optimum expression format, as the selection pattern (adoption pattern) of the terms to be adopted in the reduced prediction equation.

Note that, the coding efficiency in a case where the filter processing is performed using the reduced prediction equation of the selection pattern as the pattern of interest in the determination unit 243 is obtained by generating a filter image by applying the reduced prediction equation to the decoded image by using the decoded image as the student image and the original image as the teacher image used for the learning in the learning unit 242, and encoding the teacher image.

After determining the optimum expression format and the adoption pattern, the determination unit 243 supplies filter information including format information and selection information respectively representing the optimum expression format and the adoption pattern, and the tap coefficients included in the reduced prediction equation of the adoption pattern, to the prediction device 232 (FIG. 19), and also to the lossless encoding unit 206 (FIG. 18).

Note that, in the selection pattern setting unit 241, each of the plurality of selection patterns can be associated with the encoding information, and for example, the selection pattern associated with the encoding information (average value or the like thereof) of the frame of the pixel of interest can be set as the pattern of interest. In this case, in the determination unit 243, the selection pattern set as the pattern of interest by the selection pattern setting unit 241 is determined as the adoption pattern. Furthermore, in this case, the selection information representing the adoption pattern is not included in the filter information (does not have to be transmitted).

<Configuration Example of Prediction Device 232>

Figure 21:
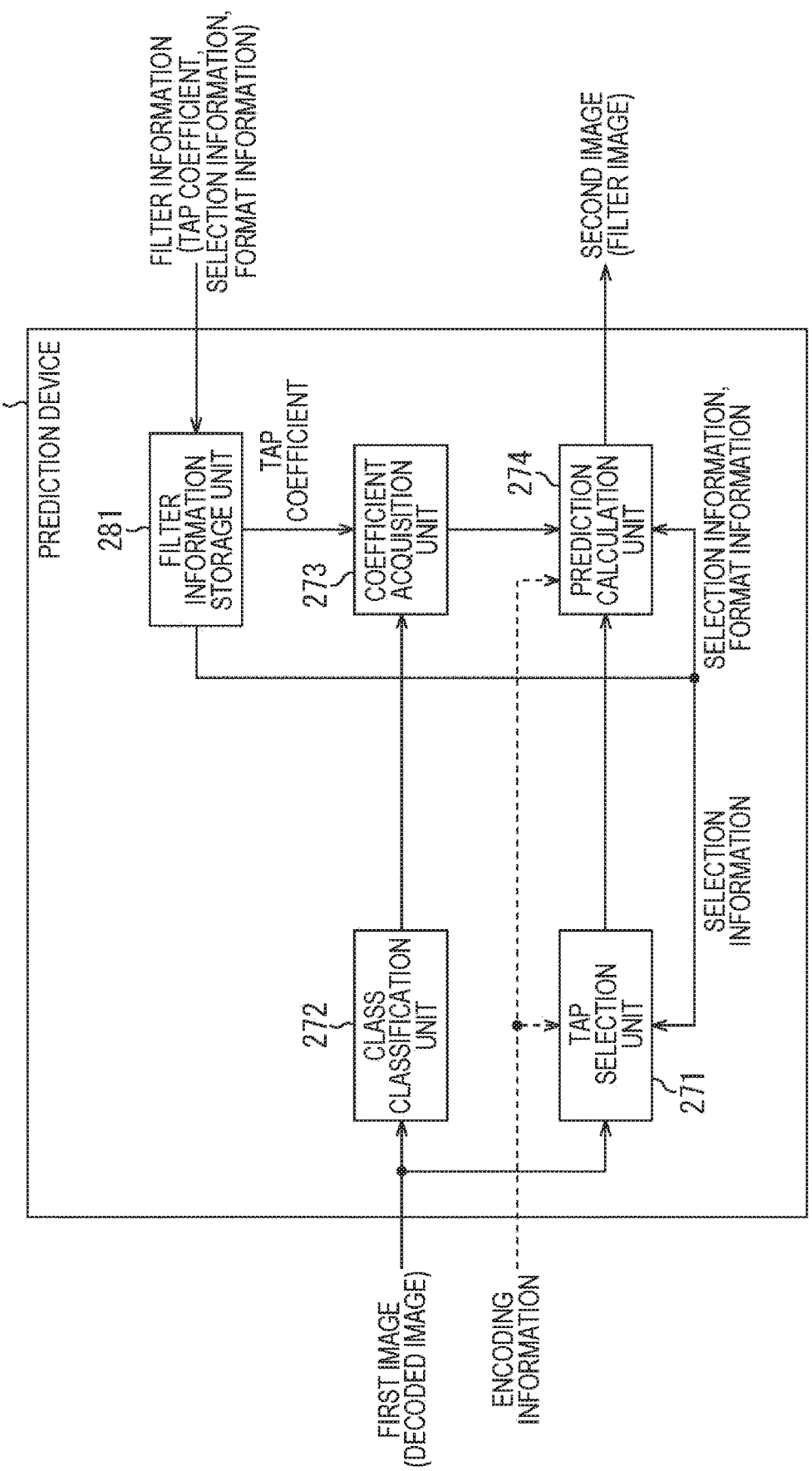
FIG. 21 is a block diagram illustrating a configuration example of a prediction device 232.

FIG. 21 is a block diagram illustrating a configuration example of the prediction device 232 of FIG. 19.

In FIG. 21, the prediction device 232 includes a tap selection unit 271, a class classification unit 272, a coefficient acquisition unit 273, a prediction calculation unit 274, and a filter information storage unit 281.

Form the tap selection unit 271 to the prediction calculation unit 274 are respectively configured similarly to from the tap selection unit 101 to the prediction calculation unit 104 of FIG. 12.

However, the tap selection unit 271, the coefficient acquisition unit 273, and the prediction calculation unit 274 perform processing in accordance with the filter information supplied from the filter information storage unit 281.

In other words, the filter information storage unit 281 stores the filter information supplied from the learning device 231 (the determination unit 243 (FIG. 20) thereof).

Selection information included in the filter information stored in the filter information storage unit 281 is supplied to the tap selection unit 271 and the prediction calculation unit 274. Furthermore, tap coefficients (first-order coefficient and second-order coefficient) for each class included in the filter information stored in the filter information storage unit 281 are supplied to the coefficient acquisition unit 273, and the format information included in the filter information is supplied to the prediction calculation unit 274.

The tap selection unit 271 selects pixels included in the terms of the reduced prediction equation of the adoption pattern (the selection pattern determined as the adoption pattern) represented by the selection information supplied from the filter information storage unit 281, as prediction taps from the decoded image as the first image.

The coefficient acquisition unit 273 stores the tap coefficients for each class supplied from the filter information storage unit 281, and from the stored tap coefficients for each class, acquires (reads) the tap coefficients of the class of the pixel of interest from the class classification unit 272, and supplies the tap coefficients to the prediction calculation unit 274.

The prediction calculation unit 274 calculates the reduced prediction equation of the adoption pattern represented by the selection information supplied from the filter information storage unit 281, by using the prediction taps for the pixel of interest from the tap selection unit 251, and the tap coefficients of the class of the pixel of interest from the coefficient acquisition unit 273, to obtain and output a pixel value (predicted value thereof) of the corresponding pixel of the original image corresponding to the pixel of interest.

Note that, the prediction calculation unit 274 performs calculation according to the optimum expression format represented by the format information supplied from the filter information storage unit 281, in the calculation of the reduced prediction equation. In other words, as described with reference to FIG. 9, for example, in a case where the pixel value and the tap coefficient of the decoded image are represented in 10 bits, and the pixel value of the decoded image is of the integer type, and the tap coefficient is a fixed-point number having a 9-bit decimal part, in the calculation of the product of the pixel value of the decoded image included in the reduced prediction equation and the tap coefficient, a product is obtained of a bit string representing the pixel value of the decoded image and a bit string representing the tap coefficient, and then a bit string representing the product is shifted right by 9 bits, to be divided by 512.

Furthermore, as set in FIG. 19, in a case where the selection pattern associated with the encoding information of the frame of the pixel of interest is determined as the adoption pattern in the determination unit 243, the adoption pattern is specified from the encoding information, in the tap selection unit 271 and the prediction calculation unit 274.

<Encoding Processing>

Figure 22:
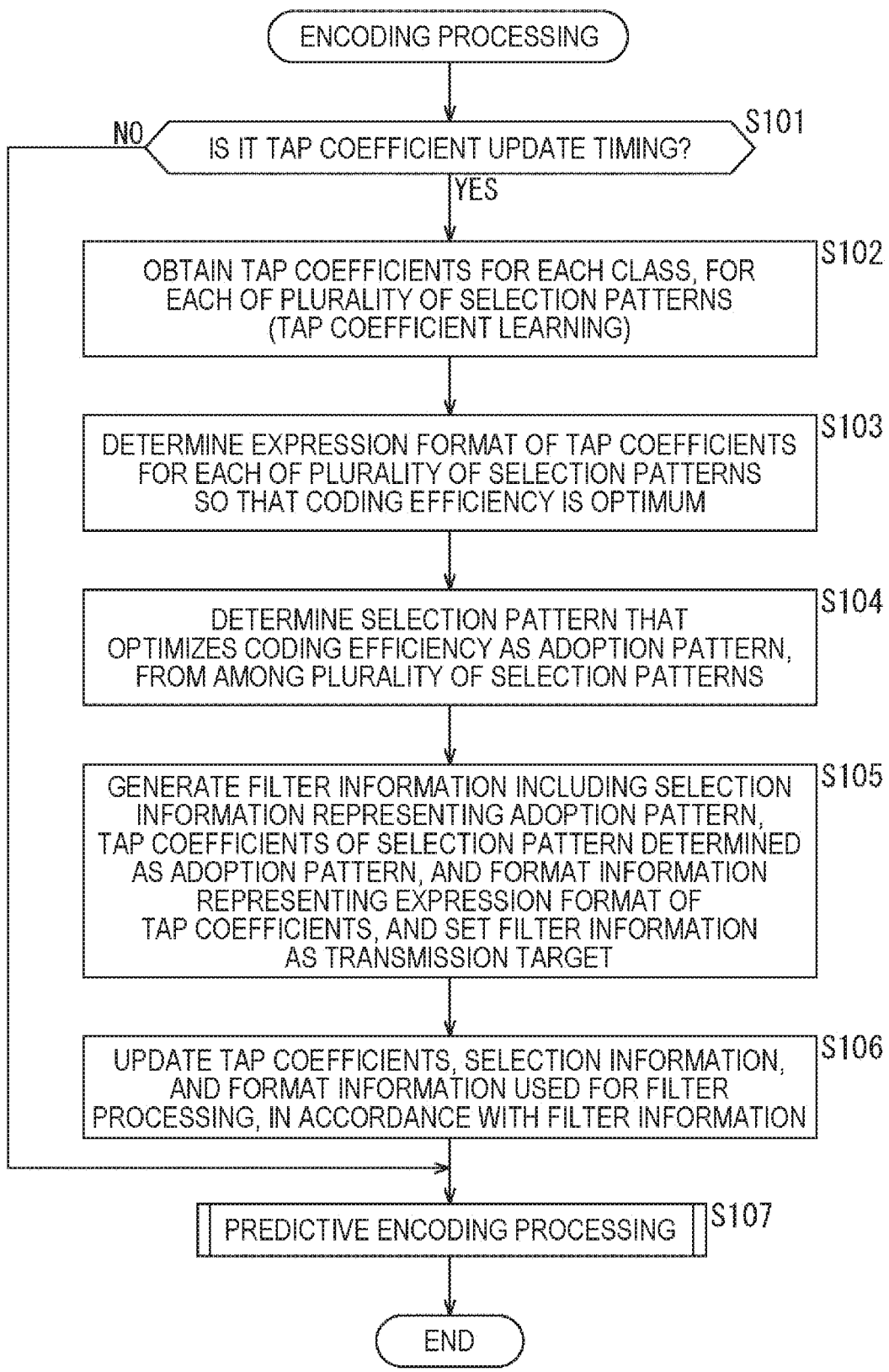
FIG. 22 is a flowchart illustrating an example of the encoding processing by the encoding device 11.

FIG. 22 is a flowchart illustrating an example of the encoding processing by the encoding device 11 of FIG. 18.

Note that, the order of the steps of the encoding processing illustrated in FIG. 22 and the like is an order for convenience of description, and the steps of the actual encoding processing are appropriately performed in parallel and in a necessary order. The same applies to the processing described later.

In the encoding device 11, the learning device 231 (FIG. 20) of the ILF 211 temporarily stores the decoded image supplied thereto as the student image, and also temporarily stores the original image corresponding to the decoded image, as the teacher image.

Then, in step S101, the learning device 231 determines whether or not the current timing is an update timing for updating the tap coefficient.

Here, the tap coefficient update timing can be determined in advance, for example, every one or more frames (pictures), every one or more sequences, every one or more slices, every one or more lines of a predetermined block such as the CTU, or the like.

Furthermore, as the tap coefficient update timing, in addition to the periodic (fixed) timing such as the timing of every one or more frames (pictures), a so-called dynamic timing can be adopted, such as a timing at which the S/N of the filter image becomes less than or equal to a threshold value (a timing at which an error of the filter image with respect to the original image becomes greater than or equal to a threshold value), or a timing at which the residual (sum of absolute values or the like thereof) becomes greater than or equal to a threshold value.

In step S101, in a case where it is determined that the current timing is not the tap coefficient update timing, the processing skips steps S102 to S106 and proceeds to step S16.

Furthermore, in step S101, in a case where it is determined that the current timing is the tap coefficient update timing, the processing proceeds to step S102, and the learning device 231 performs tap coefficient learning for each of the plurality of selection patterns prepared in advance.

In other words, for example, the learning device 231 performs the tap coefficient learning for each of the plurality of selection patterns prepared in advance with the decoded image and original image stored between the previous update timing and the current update timing, (the latest one-frame decoded image and original image, or the like) respectively as the student image and teacher image, to obtain tap coefficients for each class, and the processing proceeds to step S103.

In step S103, the learning device 231, for each of the plurality of selection patterns prepared in advance, determines an optimum expression format that is an expression format of the tap coefficients that optimize the coding efficiency in a case where the filter processing is performed using the reduced prediction equation of the selection pattern, and the processing proceeds to step S104.

In step S104, the learning device 231 determines, for each of the plurality of selection patterns, as an adoption pattern, a selection pattern that optimizes the coding efficiency in a case where filter processing is performed using the reduced prediction equation being a reduced prediction equation of the selection pattern and including tap coefficients in the optimum expression format, and the processing proceeds to step S105.

In step S105, the learning device 231 generates filter information including selection information representing the adoption pattern, tap coefficients for each class for the selection pattern determined as the adoption pattern among the tap coefficients for each class obtained for each of the selection patterns prepared in advance by the tap coefficient learning in step S102, and format information representing the optimum expression format of the tap coefficients, and supplies the filter information to the prediction device 232 (FIG. 21), and the lossless encoding unit 206 (FIG. 18).

The lossless encoding unit 206 (FIG. 18) sets the filter information from the learning device 231 as a transmission target, and the processing proceeds from step S105 to step S106. The filter information set as the transmission target is included in the encoded bit stream and transmitted, in the predictive encoding processing performed in step S107 described later.

In step S106, in accordance with the tap coefficients for each class, the selection information, and the format information included in the filter information from the learning device 231, the prediction device 232 updates the tap coefficients for each class, the selection information, and the format information stored in the filter information storage unit 281 (overwrites and stores the filter information), and the processing proceeds to step S107.

In step S107, predictive encoding processing on the original image is performed, and the encoding processing ends.

Figure 23:
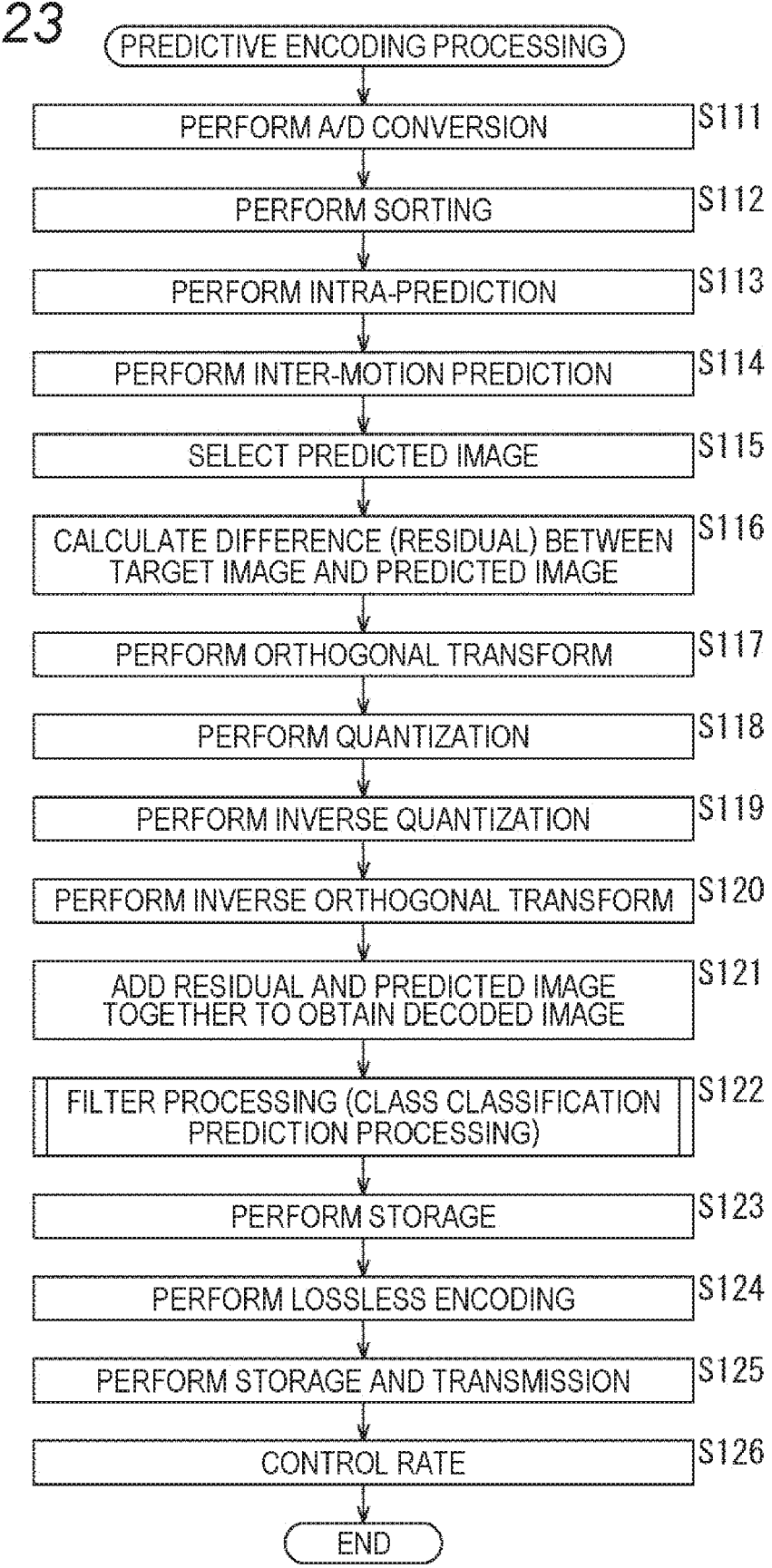
FIG. 23 is a flowchart illustrating an example of predictive encoding processing.

FIG. 23 is a flowchart illustrating an example of the predictive encoding processing in step S107 of FIG. 22.

In the predictive encoding processing, in step S111, the A/D conversion unit 201 (FIG. 18) performs A/D conversion on the original image and supplies the original image to the sort buffer 202, and the processing proceeds to step S112.

In step S112, the sort buffer 202 stores the original images from the A/D conversion unit 201, and sorts and outputs the original images in the encoding order, and the processing proceeds to step S113.

In step S113, the intra-prediction unit 214 performs intra-prediction processing in the intra-prediction mode, and the processing proceeds to step S114. In step S114, the motion prediction compensation unit 215 performs inter-motion prediction processing of performing motion prediction and motion compensation in the inter-prediction mode, and the processing proceeds to step S115.

In the intra-prediction processing by the intra-prediction unit 214 and the inter-motion prediction processing by the motion prediction compensation unit 215, cost functions of various prediction modes are calculated, and a predicted image is generated.

In step S115, the predicted image selection unit 216 determines an optimal prediction mode on the basis of each cost function obtained by the intra-prediction unit 214 and the motion prediction compensation unit 215. Then, the predicted image selection unit 216 selects and outputs a predicted image in the optimal prediction mode from the predicted image generated by the intra-prediction unit 214 and the predicted image generated by the motion prediction compensation unit 215, and the processing proceeds from step S115 to step S116.

In step S116, the calculation unit 203 calculates a residual between a target image to be encoded that is the original image output from the sort buffer 202, and the predicted image output from the predicted image selection unit 216, and supplies the residual to the orthogonal transform unit 204, and the processing proceeds to step S117.

In step S117, the orthogonal transform unit 204 performs orthogonal transform on the residual from the calculation unit 203, and supplies orthogonal transform coefficients obtained as a result of the orthogonal transform to the quantization unit 205, and the processing proceeds to step S118.

In step S118, the quantization unit 205 quantizes the orthogonal transform coefficients from the orthogonal transform unit 204, and supplies quantization coefficients obtained by the quantization to the lossless encoding unit 206 and the inverse quantization unit 208, and the processing proceeds to step S119.

In step S119, the inverse quantization unit 208 performs inverse quantization on the quantization coefficients from the quantization unit 205, and supplies orthogonal transform coefficients obtained as a result of the inverse quantization to the inverse orthogonal transform unit 209, and the processing proceeds to step S120. In step S120, the inverse orthogonal transform unit 209 performs inverse orthogonal transform on the orthogonal transform coefficient from the inverse quantization unit 208, and supplies a residual obtained as a result of the inverse orthogonal transform to the calculation unit 210, and the processing proceeds to step S121.

In step S121, the calculation unit 210 adds the residual from the inverse orthogonal transform unit 209 and the predicted image output from the predicted image selection unit 216 together, to generate a decoded image corresponding to the original image subjected to residual calculation in the calculation unit 203. The calculation unit 210 supplies the decoded image to ILF 211, and the processing proceeds from step S121 to step S122.

In step S122, the ILF 211 performs the class classification prediction processing as filter processing using a higher-order prediction equation on the decoded image from the calculation unit 210, and supplies a filter image obtained by the filter processing to the frame memory 212, and the processing proceeds from step S122 to step S123.

In step S123, the frame memory 212 stores the filter image supplied from the ILF 211 as a restored image obtained by restoring the original image, and the processing proceeds to step S124. The restored image stored in the frame memory 212 is used as a reference image from which a predicted image is generated in steps S114 and S115.

In step S124, the lossless encoding unit 206 encodes the coded data that is the quantization coefficients from the quantization unit 205, and generates an encoded bit stream including the coded data. Moreover, the lossless encoding unit 206 encodes encoding information as necessary, such as the quantization parameter QP used for quantization in the quantization unit 205, the prediction mode obtained in the intra-prediction processing in the intra-prediction unit 214, and the prediction mode and motion information obtained in the inter-motion prediction processing in the motion prediction compensation unit 215, and includes the encoding information in the encoded bit stream.

Furthermore, the lossless encoding unit 206 encodes the filter information set as the transmission target in step S105 of FIG. 22 as necessary, and includes the encoded filter information in the encoded bit stream. Then, the lossless encoding unit 206 supplies the encoded bit stream to the storage buffer 207, and the processing proceeds from step S124 to step S125.

In step S125, the storage buffer 207 stores the encoded bit stream from the lossless encoding unit 206, and the processing proceeds to step S126. The encoded bit stream stored in the storage buffer 207 is appropriately read and transmitted.

In step S126, the rate control unit 217 controls the rate of the encoding operation in the quantization unit 205 on the basis of the code amount (generated code amount) of the encoded bit stream stored in the storage buffer 207 so that overflow or underflow does not occur, and the encoding processing ends.

Figure 24:
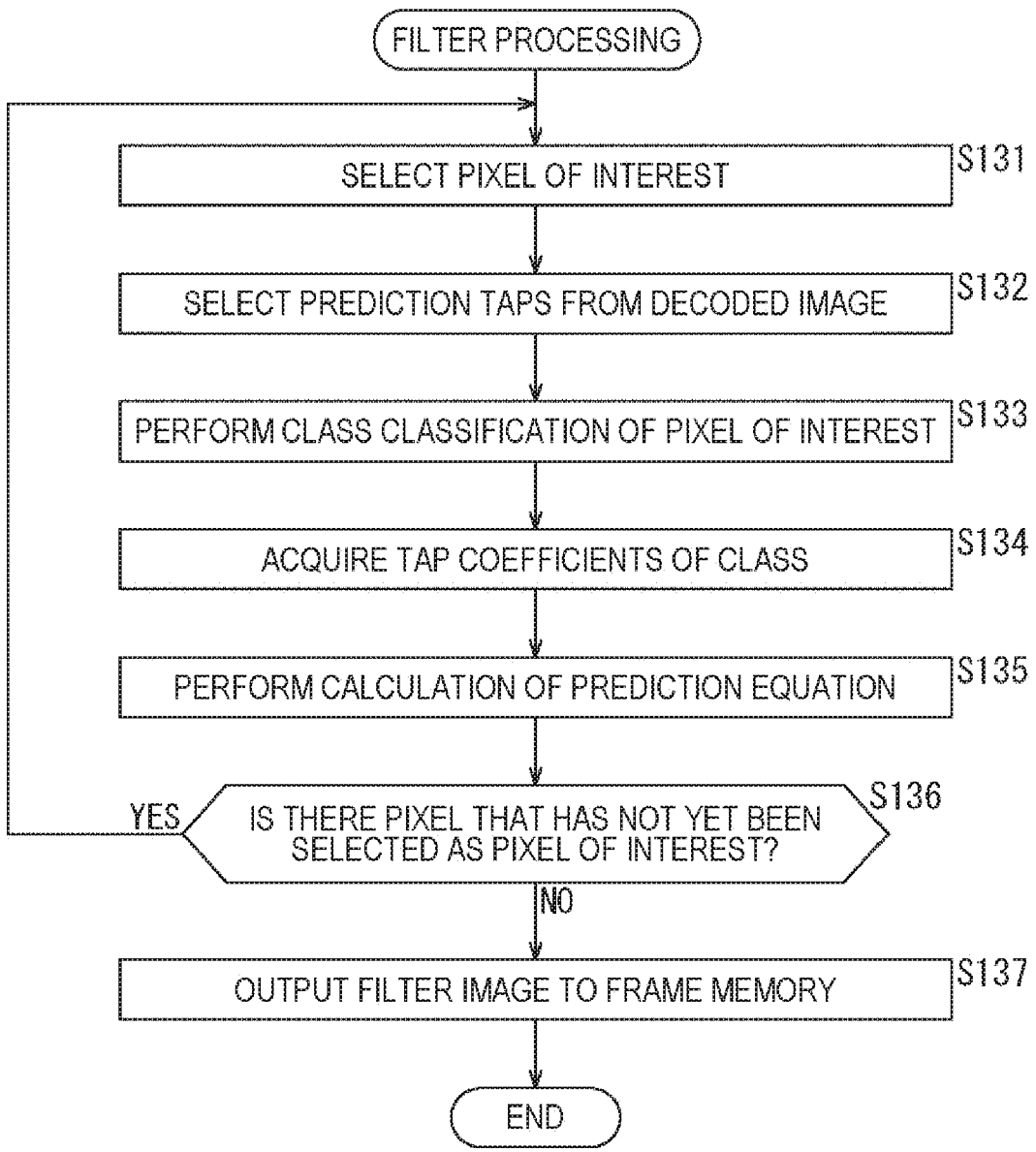
FIG. 24 is a flowchart illustrating an example of filter processing.

FIG. 24 is a flowchart illustrating an example of the filter processing performed in step S122 of FIG. 23.

In step S131, the prediction device 232 (FIG. 21) of the ILF 211 selects, as a pixel of interest, one of pixels that has not yet been set as the pixel of interest among pixels of the decoded image (block as the decoded image) supplied from the calculation unit 210, and the processing proceeds to step S132.

In step S132, the prediction device 232 selects, as prediction taps from the decoded image, pixels included in the terms of the reduced prediction equation of the adoption pattern (selection pattern determined as the adoption pattern) represented by the latest selection information stored in the filter information storage unit 281 in the latest step S106 (FIG. 22), and the processing proceeds to step S133.

In step S133, the prediction device 232 performs class classification of the pixel of interest, and the processing proceeds to step S134.

In step S134, the prediction device 232 acquires the tap coefficients of the class of the pixel of interest obtained by the class classification of the pixel of interest from the tap coefficients for each latest class stored in the filter information storage unit 281 in step S106 (FIG. 22), and the processing proceeds to step S135.

In step S135, the prediction device 232 specifies the expression format (the optimum expression format) of the tap coefficients (each of the first-order coefficient and the second-order coefficient) from the latest format information stored in the filter information storage unit 281 in step S106 (FIG. 22). Moreover, the prediction device 232 specifies the adoption pattern for the reduced polynomial from the latest selection information stored in the filter information storage unit 281 in step S106.

Then, the prediction device 232 performs filter processing of applying the reduced prediction equation of the adoption pattern including the tap coefficients of the class of the pixel of interest in the optimum expression format to the decoded image, in other words, calculation (product-sum calculation) of the reduced prediction equation for the adoption pattern including the pixels as the prediction taps of the decoded image and the tap coefficients of the class of the pixel of interest in the optimum expression format, to obtain a filter image.

Thereafter, the processing proceeds from step S135 to step S136, and the prediction device 232 determines whether or not there is a pixel that has not yet been set as the pixel of interest, among the pixels of the decoded image (block as the decoded image) from the calculation unit 210. In step S136, in a case where it is determined that there is a pixel that has not yet been set as the pixel of interest, the processing returns to step S131, and similar processing is repeated.

Furthermore, in step S136, in a case where it is determined that there is no pixel that has not yet been set as the pixel of interest, the processing proceeds to step S137, and the prediction device 232 supplies the filter image including pixel values obtained for the decoded image (block as the decoded image) from the calculation unit 210, to the frame memory 212 (FIG. 18). Then, the filter processing is ended, and the processing returns.

<Configuration Example of Decoding Device 12>

Figure 25:
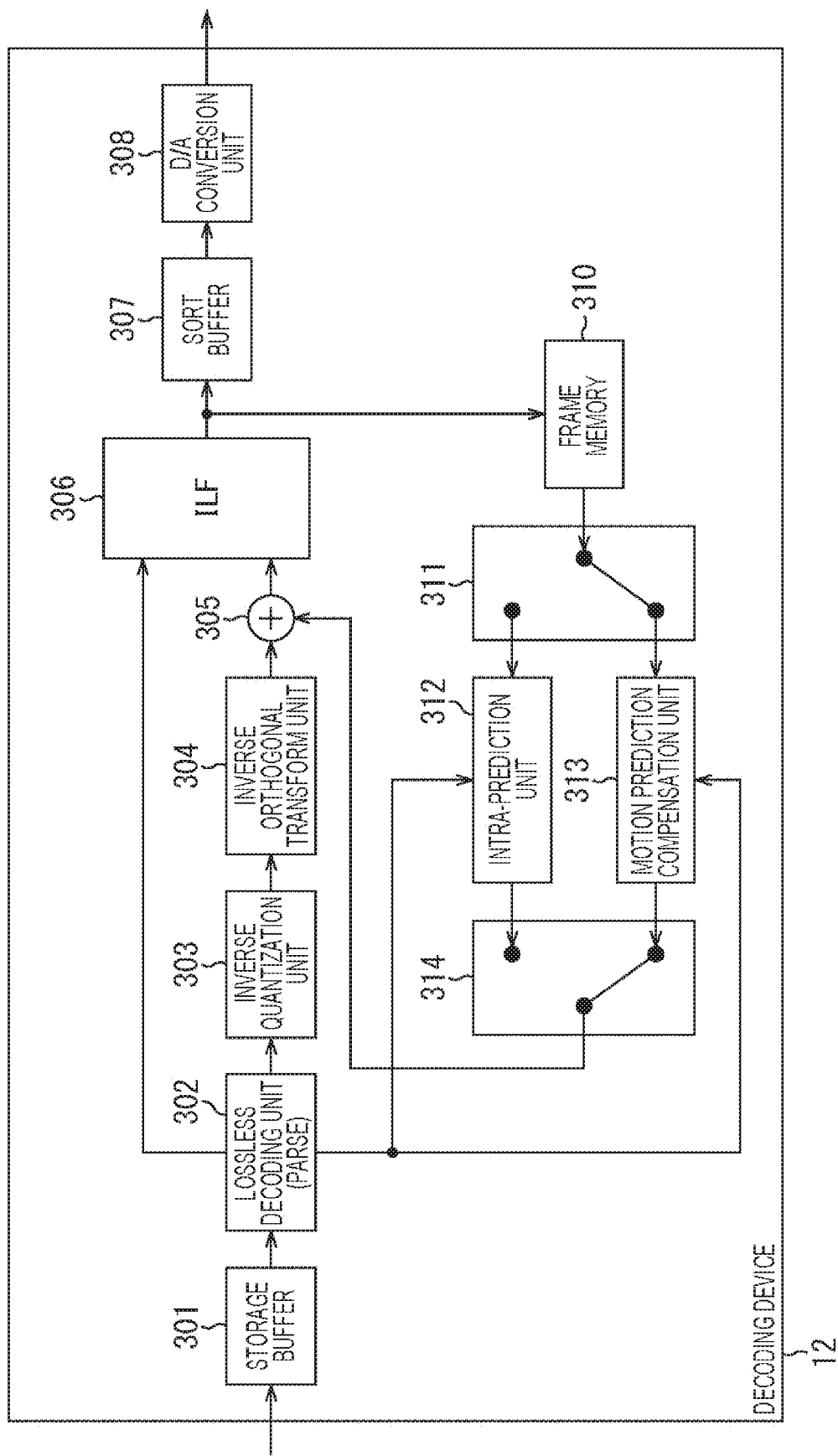
FIG. 25 is a block diagram illustrating a detailed configuration example of the decoding device 12.

FIG. 25 is a block diagram illustrating a detailed configuration example of the decoding device 12 of FIG. 8.

In FIG. 25, the decoding device 12 includes a storage buffer 301, a lossless decoding unit 302, an inverse quantization unit 303, an inverse orthogonal transform unit 304, a calculation unit 305, an ILF 306, a sort buffer 307, and a D/A conversion unit 308. Furthermore, the decoding device 12 includes a frame memory 310, a selection unit 311, an intra-prediction unit 312, a motion prediction compensation unit 313, and a selection unit 314.

The storage buffer 301 temporarily stores the encoded bit stream transmitted from the encoding device 11, and supplies the encoded bit stream to the lossless decoding unit 302 at a predetermined timing.

The lossless decoding unit 302 receives the encoded bit stream from the storage buffer 301, and decodes the encoded bit stream with a method corresponding to the encoding method of the lossless encoding unit 206 in FIG. 18.

Then, the lossless decoding unit 302 supplies quantization coefficients as coded data included in a result of decoding the encoded bit stream to the inverse quantization unit 303.

Furthermore, the lossless decoding unit 302 has a function of performing parsing. The lossless decoding unit 302 parses the result of decoding the encoded bit stream, to obtain necessary encoding information and filter information, and supplies the encoding information to necessary block such as the intra-prediction unit 312, the motion prediction compensation unit 313, and others. Moreover, the lossless decoding unit 302 supplies the filter information to the ILF 306.

The inverse quantization unit 303 performs inverse quantization on the quantization coefficients as the coded data from the lossless decoding unit 302 with a method corresponding to the quantization method of the quantization unit 205 in FIG. 18, and supplies orthogonal transform coefficients obtained by the inverse quantization to the inverse orthogonal transform unit 304.

The inverse orthogonal transform unit 304 performs inverse orthogonal transform on the orthogonal transform coefficients supplied from the inverse quantization unit 303 with a method corresponding to the orthogonal transform method of the orthogonal transform unit 204 in FIG. 18, and supplies a residual obtained as a result of the inverse orthogonal transform to the calculation unit 305.

The calculation unit 305 is supplied with the residual from the inverse orthogonal transform unit 304, and is also supplied with a predicted image from the intra-prediction unit 312 or the motion prediction compensation unit 313 via the selection unit 314.

The calculation unit 305 adds the residual from the inverse orthogonal transform unit 304 and the predicted image from the selection unit 314 together, to generate a decoded image, and supplies the decoded image to the ILF 306.

The ILF 306 restores (predicts) the original image by performing filter processing based on the class classification prediction processing, similarly to the ILF 211 in FIG. 18.

In other words, the ILF 306 performs calculation of the reduced prediction equation using the tap coefficients for each class included in the filter information from the lossless decoding unit 302, with the decoded image from the calculation unit 305 as the first image, thereby converting the decoded image as the first image into a filter image as the second image corresponding to the original image (generating the filter image) and outputting the filter image.

The filter image output by the ILF 306 is an image similar to the filter image output by the ILF 211 of FIG. 18, and is supplied to the sort buffer 307 and the frame memory 310.

The sort buffer 307 temporarily stores the filter image supplied from the ILF 306 as a restored image obtained by restoring the original image, and sorts the order of frames (pictures) of the restored image from the encoding (decoding) order to the display order, and supplies the restored image to the D/A conversion unit 308.

The D/A conversion unit 308 performs D/A conversion on the restored image supplied from the sort buffer 307, and outputs the restored image to a display (not illustrated) for display.

The frame memory 310 temporarily stores the filter image supplied from the ILF 306. Moreover, the frame memory 310 supplies, to the selection unit 311, the filter image as a reference image to be used for generating the predicted image, at a predetermined timing or on the basis of an external request from the intra-prediction unit 312, the motion prediction compensation unit 313, or the like.

The selection unit 311 selects a supply destination of the reference image supplied from the frame memory 310. In a case where an image subjected to intra-encoding is decoded, the selection unit 311 supplies the reference image supplied from the frame memory 310 to the intra-prediction unit 312. Furthermore, in a case where an image subjected to inter-encoding is decoded, the selection unit 311 supplies the reference image supplied from the frame memory 310 to the motion prediction compensation unit 313.

In accordance with the prediction mode included in the encoding information supplied from the lossless decoding unit 302, in the intra-prediction mode used in the intra-prediction unit 214 of FIG. 18, the intra-prediction unit 312 performs intra-prediction by using the reference image supplied via the selection unit 311 from the frame memory 310. Then, the intra-prediction unit 312 supplies the predicted image obtained by the intra-prediction to the selection unit 314.

In accordance with the prediction mode included in the encoding information supplied from the lossless decoding unit 302, in the inter-prediction mode used in the motion prediction compensation unit 215 in FIG. 18, the motion prediction compensation unit 313 performs inter-prediction by using the reference image supplied via the selection unit 311 from the frame memory 310. The inter-prediction is performed by using the motion information and the like included in the encoding information supplied from the lossless decoding unit 302, as necessary.

The motion prediction compensation unit 313 supplies the predicted image obtained by the inter-prediction to the selection unit 314.

The selection unit 314 selects the predicted image supplied from the intra-prediction unit 312 or the predicted image supplied from the motion prediction compensation unit 313, and supplies the selected predicted image to the calculation unit 305.

Note that, in FIG. 25, the lossless decoding unit 302 corresponds to the parsing unit 31 of FIG. 8, from the inverse quantization unit 303 to the calculation unit 305 correspond to the decoding unit 32 of FIG. 8, and the ILF 306 corresponds to the filter unit 33 of FIG. 8.

<Configuration Example of ILF 306>

Figure 26:
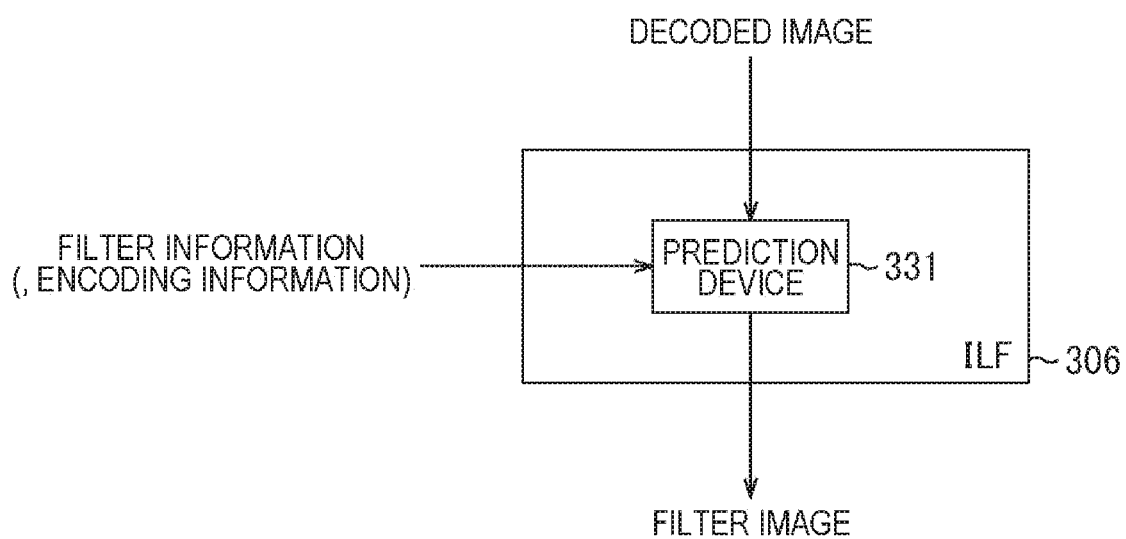
FIG. 26 is a block diagram illustrating a configuration example of an ILF 306.

FIG. 26 is a block diagram illustrating a configuration example of the ILF 306 of FIG. 25.

In FIG. 26, the ILF 306 includes a prediction device 331.

The prediction device 331 is supplied with the decoded image from the calculation unit 305 (FIG. 25), and is also supplied with the filter information (and moreover, the encoding information as necessary) from the lossless decoding unit 302.

Similarly to the prediction device 232 of FIG. 19, the prediction device 331 performs, with the decoded image as the first image, filter processing (class classification prediction processing as the filter processing) of applying a higher-order prediction equation using the tap coefficients for each class to the first image, to generate a filter image that is a predicted value of the second image as the original image, and supplies the filter image to the sort buffer 307 and the frame memory 310 (FIG. 25).

Note that, in the prediction device 331, the tap coefficients used for the filter processing are included in, for example, the filter information.

Furthermore, in the prediction device 331, the filter processing can be performed by using the encoding information, similarly to the prediction device 232 of FIG. 19.

<Configuration Example of Prediction Device 331>

Figure 27:
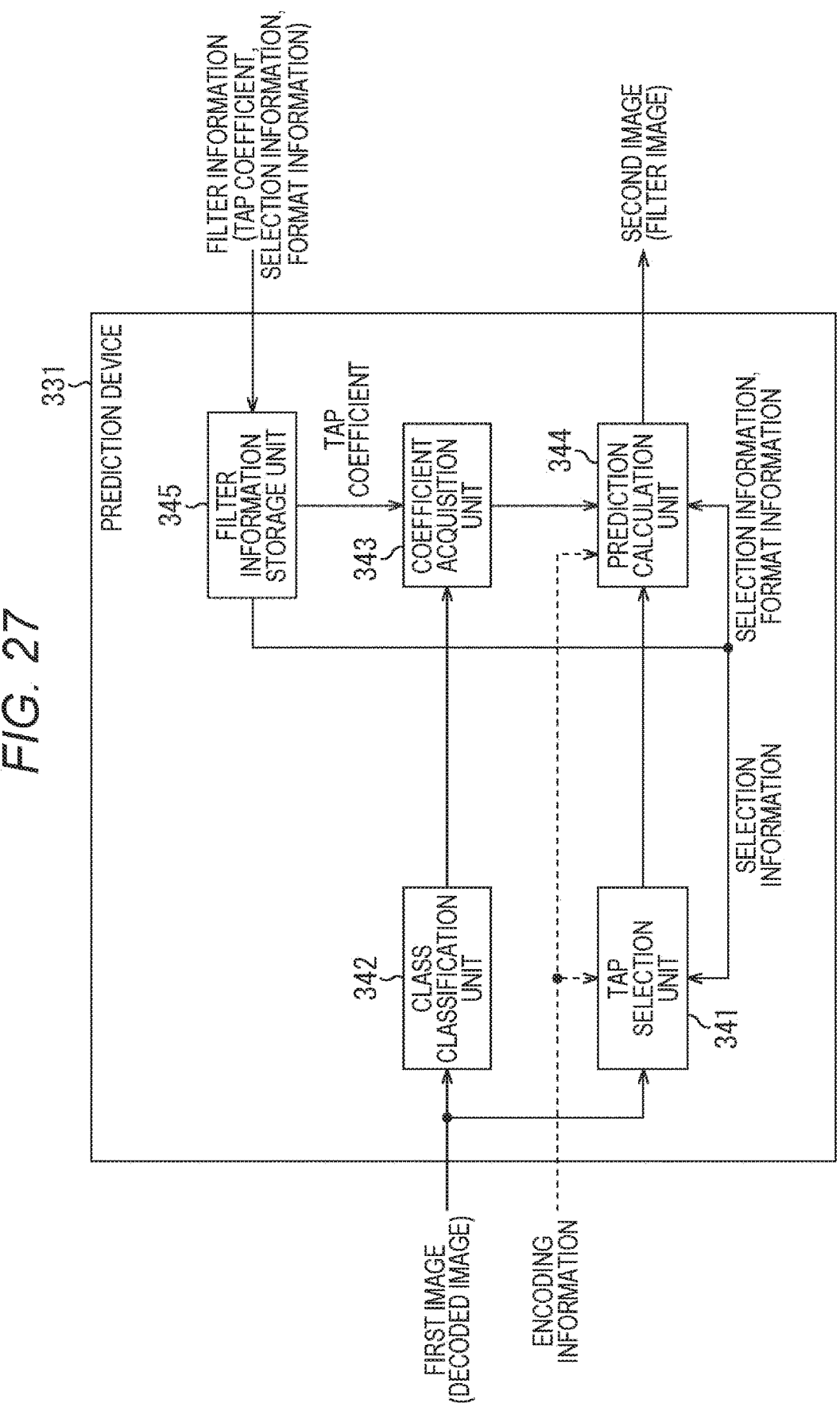
FIG. 27 is a block diagram illustrating a configuration example of a prediction device 331.

FIG. 27 is a block diagram illustrating a configuration example of the prediction device 331 of FIG. 26.

In FIG. 27, the prediction device 331 includes a tap selection unit 341, a class classification unit 342, a coefficient acquisition unit 343, a prediction calculation unit 344, and a filter information storage unit 345.

From the tap selection unit 341 to the filter information storage unit 345 are respectively configured similarly to from the tap selection unit 271 to the prediction calculation unit 274 and the filter information storage unit 281 of FIG. 21, and in the prediction device 331, since processing similar to that in the prediction device 232 in FIG. 21 is performed, the description will be omitted.

<Decoding Processing>

Figure 28:
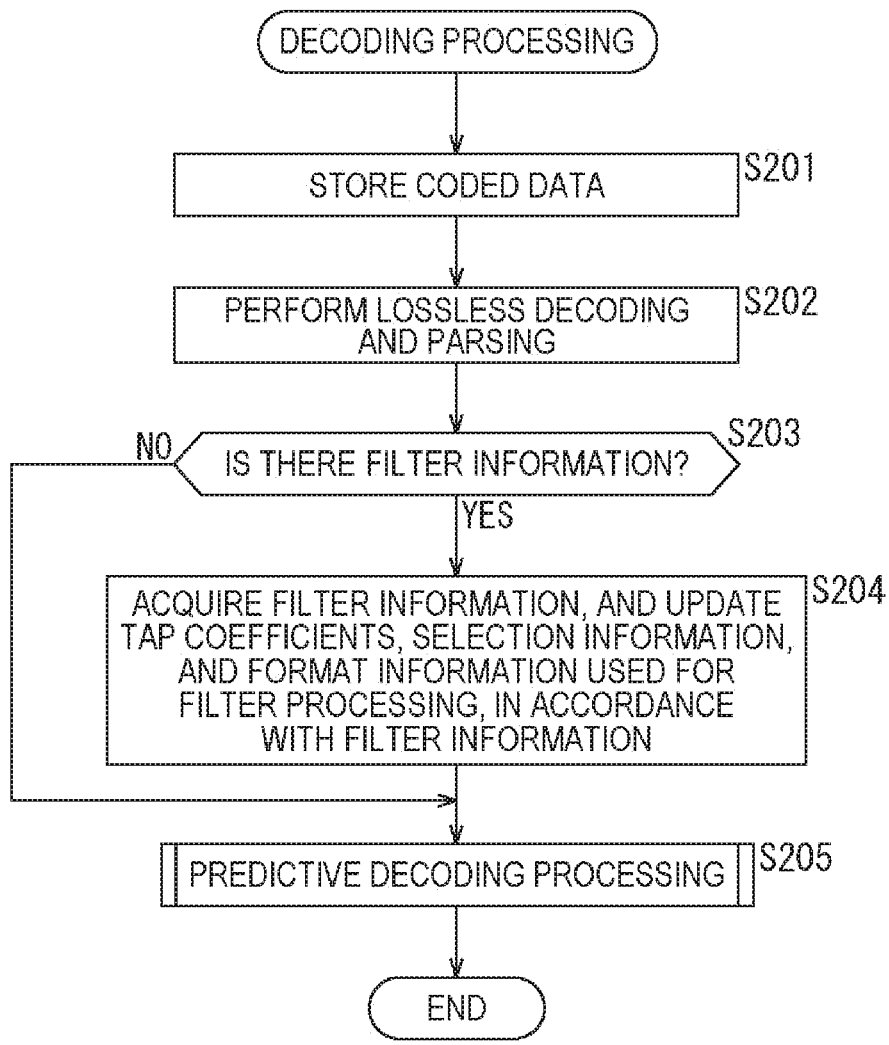
FIG. 28 is a flowchart illustrating an example of the decoding processing by the decoding device 12.

FIG. 28 is a flowchart illustrating an example of the decoding processing by the decoding device 12 of FIG. 25.

In the decoding processing, in step S201, the storage buffer 301 temporarily stores the encoded bit stream transmitted from the encoding device 11, and appropriately supplies the encoded bit stream to the lossless decoding unit 302, and the processing proceeds to step S202.

In step S202, the lossless decoding unit 302 receives and decodes the encoded bit stream supplied from the storage buffer 301, and supplies the quantization coefficients as the coded data included in the result of decoding the encoded bit stream to the inverse quantization unit 303.

Furthermore, the lossless decoding unit 302 parses the result of decoding the encoded bit stream, and in a case where the result of decoding the encoded bit stream includes filter information or encoding information, the lossless decoding unit 302 obtains the filter information or the encoding information. Then, the lossless decoding unit 302 supplies necessary encoding information to necessary blocks such as the intra-prediction unit 312, the motion prediction compensation unit 313, and others. Furthermore, the lossless decoding unit 302 supplies the filter information, and moreover, the necessary encoding information to the ILF 306.

Thereafter, the processing proceeds from step S202 to step S203, and the ILF 306 determines whether or not the filter information is supplied from the lossless decoding unit 302.

In step S203, in a case where it is determined that the filter information is not supplied, the processing skips step S204, and proceeds to step S205.

Furthermore, in step S203, in a case where it is determined that the filter information is supplied, the processing proceeds to step S204, and the prediction device 331 (FIG. 27) acquires the filter information from the lossless decoding unit 302. Moreover, in accordance with the tap coefficients for each class, the selection information, and the format information included in the filter information from the lossless decoding unit 302, the prediction device 331 updates the tap coefficients for each class, the selection information, and the format information stored in the filter information storage unit 345 of the prediction device 331.

Then, the processing proceeds from step S204 to step S205, predictive decoding processing is performed, and the decoding processing ends.

Figure 29:
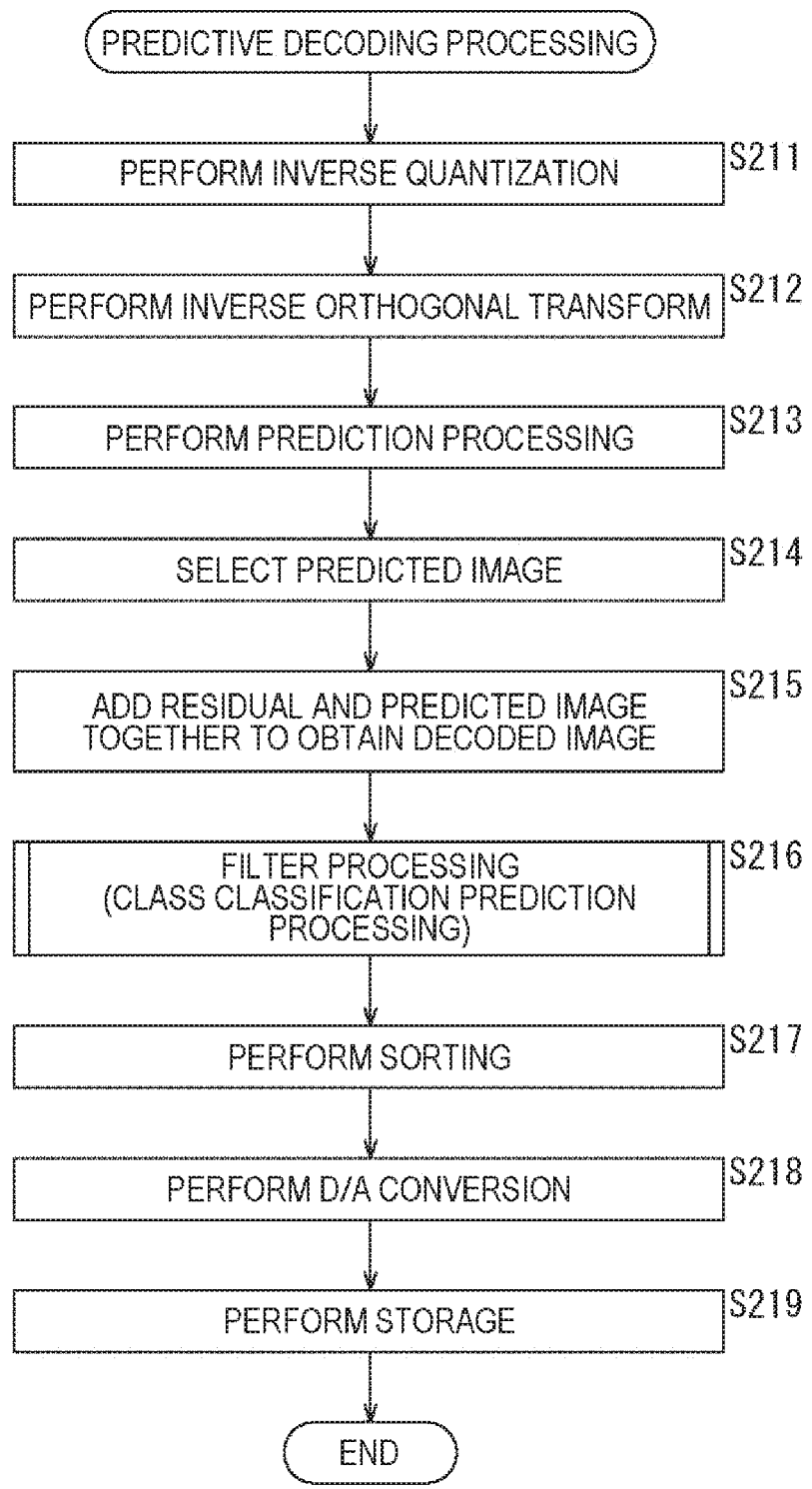
FIG. 29 is a flowchart illustrating an example of predictive decoding processing.

FIG. 29 is a flowchart illustrating an example of the predictive decoding processing in step S205 of FIG. 28.

In step S211, the inverse quantization unit 303 performs inverse quantization on the quantization coefficients from the lossless decoding unit 302, and supplies orthogonal transform coefficients obtained as a result of the inverse quantization to the inverse orthogonal transform unit 304, and the processing proceeds to step S212.

In step S212, the inverse orthogonal transform unit 304 performs inverse orthogonal transform on the orthogonal transform coefficients from the inverse quantization unit 303, and supplies a residual obtained as a result of the inverse orthogonal transform to the calculation unit 305, and the processing proceeds to step S213.

In step S213, the intra-prediction unit 312 or the motion prediction compensation unit 313 performs intra-prediction processing or inter-motion prediction processing of generating a predicted image, by using the reference image supplied via the selection unit 311 from the frame memory 310, and the encoding information supplied from the lossless decoding unit 302. Then, the intra-prediction unit 312 or the motion prediction compensation unit 313 supplies the predicted image obtained by the intra-prediction processing or the inter-motion prediction processing to the selection unit 314, and the processing proceeds from step S213 to step S214.

In step S214, the selection unit 314 selects the predicted image supplied from the intra-prediction unit 312 or the motion prediction compensation unit 313, and supplies the predicted image to the calculation unit 305, and the processing proceeds to step S215.

In step S215, the calculation unit 305 generates a decoded image by adding the residual from the inverse orthogonal transform unit 304 and the predicted image from the selection unit 314 together. Then, the calculation unit 305 supplies the decoded image to the ILF 306, and the processing proceeds from step S215 to step S216.

In step S216, the ILF 306 performs the class classification prediction processing as filter processing using a higher-order prediction equation on the decoded image from the calculation unit 305, and supplies a filter image obtained by the filter processing to the sort buffer 307 and the frame memory 310, and the processing proceeds from step S216 to step S217.

In step S217, the sort buffer 307 temporarily stores the filter image supplied from the ILF 306 as a restored image. Moreover, the sort buffer 307 sorts the stored restored images in the display order, and supplies the sorted images to the D/A conversion unit 308, and the processing proceeds from step S217 to step S218.

In step S218, the D/A conversion unit 308 performs D/A conversion on the restored image from the sort buffer 307, and the processing proceeds to step S219. The restored image after the D/A conversion is output to a display (not illustrated) for display.

In step S219, the frame memory 310 stores the filter image supplied from the ILF 306 as the restored image, and the decoding processing ends. The restored image stored in the frame memory 310 is used as a reference image from which a predicted image is generated in the intra-prediction processing or the inter-motion prediction processing in step S213.

Figure 30:
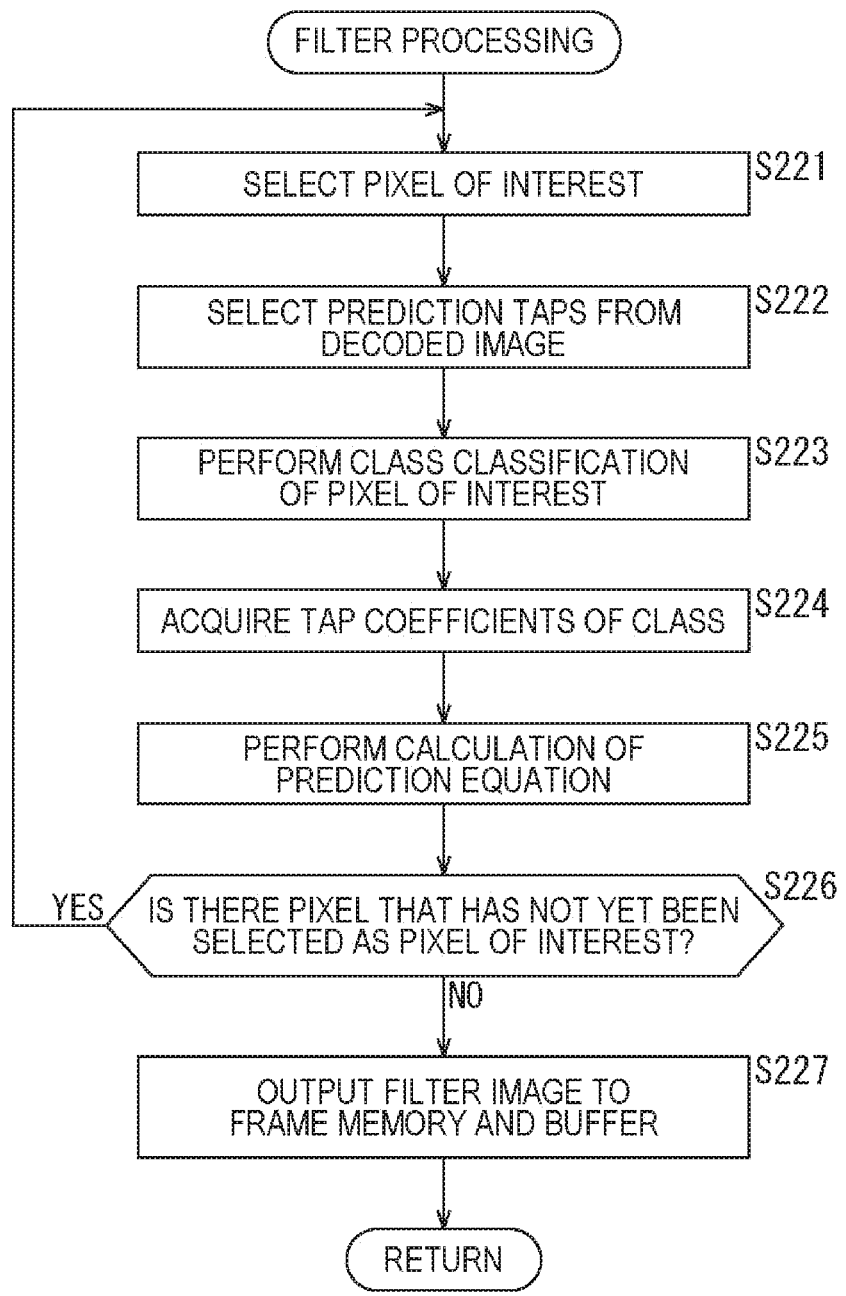
FIG. 30 is a flowchart illustrating an example of the filter processing.

FIG. 30 is a flowchart illustrating an example of the filter processing performed in step S216 of FIG. 29.

In step S221, the prediction device 331 (FIG. 27) of the ILF 306 selects, as a pixel of interest, one of pixels that has not yet been set as the pixel of interest among pixels of the decoded image (block as the decoded image) supplied from the calculation unit 305, and the processing proceeds to step S222.

In step S222, the prediction device 331 selects, as prediction taps from the decoded image, pixels included in the terms of the reduced prediction equation of the adoption pattern (selection pattern determined as the adoption pattern) represented by the latest selection information stored in the filter information storage unit 345 in the latest step S204 (FIG. 28), and the processing proceeds to step S223.

In step S223, the prediction device 331 performs class classification of the pixel of interest, and the processing proceeds to step S224.

In step S224, the prediction device 331 acquires the tap coefficients of the class of the pixel of interest obtained by the class classification of the pixel of interest from the tap coefficients for each latest class stored in the filter information storage unit 345 in step S204 (FIG. 28), and the processing proceeds to step S225.

In step S225, the prediction device 331 specifies the expression format (the optimum expression format) of the tap coefficients (each of the first-order coefficient and the second-order coefficient) from the latest format information stored in the filter information storage unit 345 in step S204 (FIG. 28). Moreover, the prediction device 331 specifies the adoption pattern for the reduced polynomial from the latest selection information stored in the filter information storage unit 345 in step S204.

Then, the prediction device 331 performs filter processing of applying the reduced prediction equation of the adoption pattern including the tap coefficients of the class of the pixel of interest in the optimum expression format to the decoded image, in other words, calculation (product-sum calculation) of the reduced prediction equation for the adoption pattern including the pixels as the prediction taps of the decoded image and the tap coefficients of the class of the pixel of interest in the optimum expression format, to obtain a filter image.

Thereafter, the processing proceeds from step S225 to step S226, and the prediction device 331 determines whether or not there is a pixel that has not yet been set as the pixel of interest, among the pixels of the decoded image (block as the decoded image) from the calculation unit 305. In step S226, in a case where it is determined that there is a pixel that has not yet been set as the pixel of interest, the processing returns to step S221, and similar processing is repeated.

Furthermore, in step S226, in a case where it is determined that there is no pixel that has not yet been set as the pixel of interest, the processing proceeds to step S227, and the prediction device 331 supplies the filter image including pixel values obtained for the decoded image (block as the decoded image) from the calculation unit 305, to the sort buffer 307 and the frame memory 310 (FIG. 25). Then, the filter processing is ended, and the processing returns.

Note that, in FIGS. 18 to 30, in the encoding device 11, tap coefficient learning is sequentially performed, and tap coefficients obtained by the tap coefficient learning is included in the filter information and transmitted; however, it is possible to perform the tap coefficient learning by using a large number of learning images in advance, and to preset the tap coefficients obtained by the tap coefficient learning, in the encoding device 11 and the decoding device 12. In this case, it is not necessary to transmit the tap coefficients from the encoding device 11 to the decoding device 12, so that the coding efficiency can be improved.

Furthermore, in FIGS. 18 to 30, in the encoding device 11, the plurality of selection patterns is prepared in advance as the selection patterns for selecting the terms to be adopted in the reduced prediction equation, and among the plurality of selection patterns, the selection pattern that optimizes the coding efficiency is determined as the adoption pattern; however, the determination of the adoption pattern from the plurality of selection patterns can be performed depending on information obtained from the encoded bit stream, in other words, for example, the encoding information such as the quantization parameter QP, and the image feature value of the decoded image.

In other words, for example, for each of a plurality of the quantization parameters QP, a selection pattern that improves the coding efficiency can be obtained in advance, and in the encoding device 11 and the decoding device 12, from among the plurality of selection patterns obtained for the plurality of quantization parameters QP, a selection pattern for the quantization parameter QP of the pixel of interest (for example, the average value of QP of the frame of the pixel of interest, and the like) can be determined as the adoption pattern. In this case, it is not necessary to transmit the selection information from the encoding device 11 to the decoding device 12, so that the coding efficiency can be improved.

Furthermore, the selection patterns for selecting the terms to be adopted in the reduced prediction equation can be fixed to one pattern in advance, and in the encoding device 11 and the decoding device 12, the filter processing can be performed by using the reduced prediction equation of the fixed selection pattern. In this case, it is not necessary to transmit the selection information from the encoding device 11 to the decoding device 12, so that the coding efficiency can be improved.

<Description of Computer to which the Present Technology is Applied>

Next, a series of processing described above can be performed by hardware or software. In a case where the series of processing is performed by software, a program constituting the software is installed in a general-purpose computer or the like.

Figure 31:
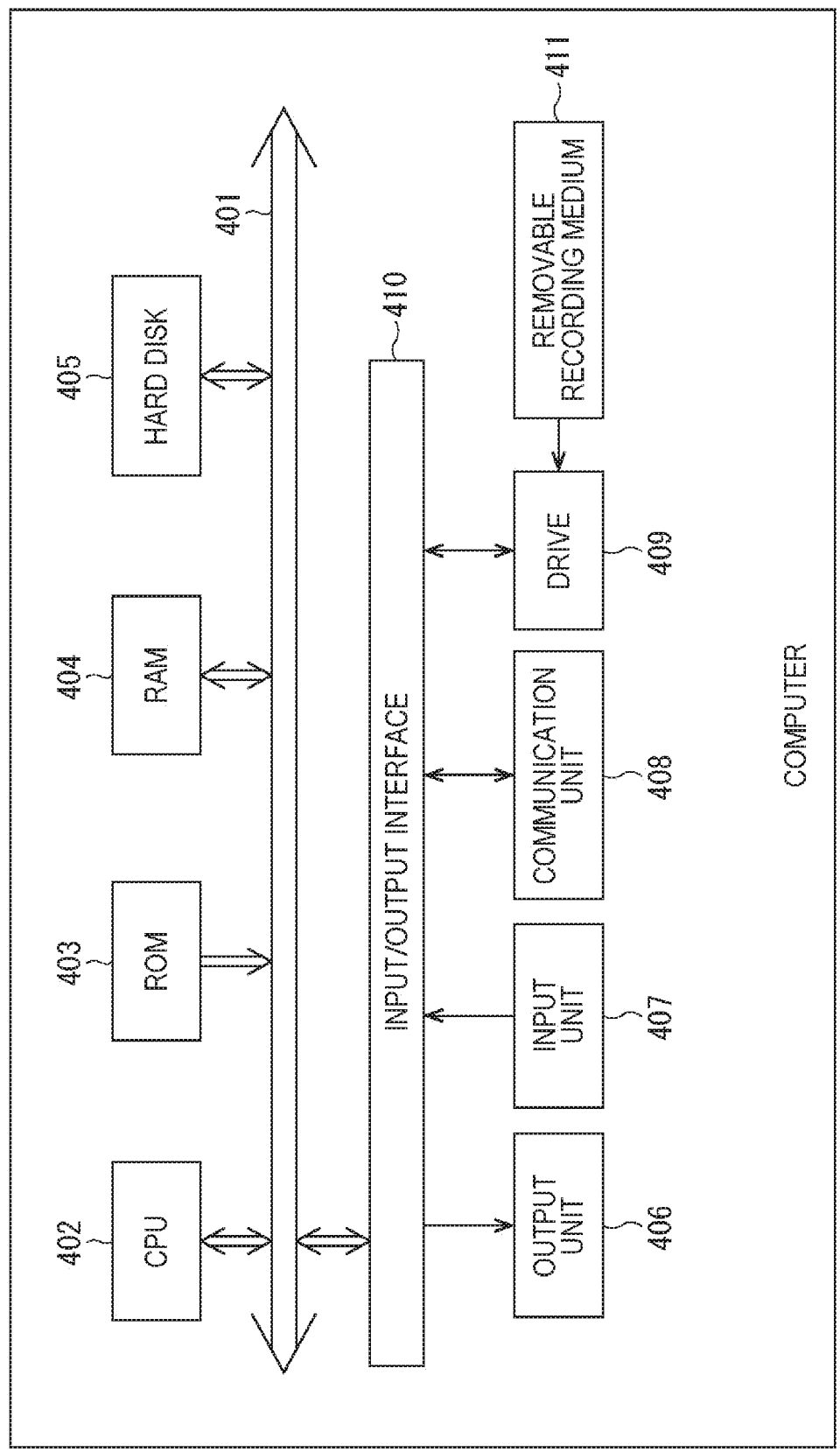
FIG. 31 is a block diagram illustrating a configuration example of an embodiment of a computer to which the present technology is applied.

FIG. 31 is a block diagram illustrating a configuration example of an embodiment of a computer in which a program for executing the series of processing described above is installed.

The program can be recorded in advance on a hard disk 405 or a ROM 403 as a recording medium incorporated in the computer.

Alternatively, the program can be stored (recorded) in a removable recording medium 411. Such a removable recording medium 411 can be provided as so-called packaged software. Here, examples of the removable recording medium 411 include a flexible disk, a Compact Disc Read Only Memory (CD-ROM), a Magneto Optical (MO) disk, a Digital Versatile Disc (DVD), a magnetic disk, a semiconductor memory, and the like.

Note that, the program can be installed on the computer from the removable recording medium 411 as described above, or can be downloaded to the computer via a communications network or a broadcast network and installed on the hard disk 405 incorporated. In other words, for example, the program can be wirelessly transferred from a download site to the computer via an artificial satellite for digital satellite broadcasting, or can be transmitted to the computer via a network such as a Local Area Network (LAN) or the Internet by wire.

The computer incorporates a Central Processing Unit (CPU) 402, and an input/output interface 410 is connected to the CPU 402 via a bus 401.

The CPU 402 executes the program stored in the Read Only Memory (ROM) 403 according to a command when the command is input by a user operating an input unit 407 or the like via the input/output interface 410. Alternatively, the CPU 402 loads the program stored in the hard disk 405 into a random access memory (RAM) 404 and executes the program.

The CPU 402 therefore performs the processing according to the above-described flowchart or the processing performed by the configuration of the above-described block diagram. Then, the CPU 402 causes the processing result to be output from an output unit 406 or transmitted from a communication unit 408 via the input/output interface 410 as necessary, and further, recorded on the hard disk 405, for example.

Note that, the input unit 407 includes a keyboard, a mouse, a microphone, and the like. Furthermore, the output unit 406 includes a Liquid Crystal Display (LCD), a speaker, and the like.

Here, in the present specification, the processing performed by the computer in accordance with the program does not necessarily have to be performed chronologically in the order described as the flowchart. In other words, the processing performed by the computer in accordance with the program also includes processing executed in parallel or individually (for example, parallel processing or processing by an object).

Furthermore, the program may be processed by one computer (processor) or may be distributed and processed by a plurality of computers. Moreover, the program may be transferred to a remote computer and executed.

Moreover, in the present specification, a system means a set of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Note that, the embodiment of the present technology is not limited to the embodiment described above, and various modifications are possible without departing from the scope of the present technology.

For example, the present technology can adopt a configuration of cloud computing that shares one function in a plurality of devices via a network to process in cooperation.

Furthermore, each step described in the above flowchart can be executed by sharing in a plurality of devices, other than being executed by one device.

Moreover, in a case where a plurality of pieces of processing is included in one step, the plurality of pieces of processing included in the one step can be executed by sharing in a plurality of devices, other than being executed by one device.

Furthermore, the advantageous effects described in the present specification are merely examples and are not limited to them, and other effects may be included.

Note that, the present technology can have the following configurations.

<1>
A decoding device including:
a decoding unit that decodes coded data included in an encoded bit stream by using a filter image, to generate a decoded image; and
a filter unit that generates the filter image by performing, on the decoded image generated by the decoding unit, filter processing of applying a prediction equation including a second-order or higher higher-order term and performing a product-sum calculation of predetermined tap coefficients and pixels of the decoded image.

<2>
The decoding device according to <1>, in which
the filter unit performs the filter processing on a pixel of interest among the pixels of the decoded image, by using a reduced prediction equation that is the prediction equation including some terms selected from an all combinations prediction equation that is the prediction equation including all candidate pixels predetermined as candidates for pixels to be prediction taps used in the calculation of the prediction equation.

<3>
The decoding device according to <2>, in which
the filter unit performs the filter processing by using the reduced prediction equation including a term of a pixel at a position close to the pixel of interest, the term being selected from the all combinations prediction equation.

<4>
The decoding device according to <2> or <3>, further including
a parsing unit that parses selection information representing a selection pattern for selecting a term included in the reduced prediction equation included in the encoded bit stream, in which
the filter unit performs the filter processing by using the reduced prediction equation of a selection pattern represented by the selection information parsed by the parsing unit.

<5>
The decoding device according to <2>, in which
the filter unit performs the filter processing by using the reduced prediction equation including the some terms selected depending on a selection pattern determined depending on encoding information regarding encoding of an original image from among a plurality of the selection patterns for selecting a term included in the reduced prediction equation.

<6>
The decoding device according to any of <1> to <5>, further including
a parsing unit that parses format information representing an expression format expressing with a predetermined bit depth a tap coefficient of a term of each order of the prediction equation included in the encoded bit stream, in which
the filter unit performs the filter processing by using the prediction equation including the tap coefficients in the expression format represented by the format information parsed by the parsing unit.

<7>
The decoding device according to any of <1> to <6>, further including
a parsing unit that parses the tap coefficients included in the encoded bit stream, in which
the filter unit performs the filter processing by using the prediction equation including the tap coefficients parsed by the parsing unit.

<8>
The decoding device according to any of <1> to <7>, in which
the filter unit
performs class classification that classifies a pixel of interest among the pixels of the decoded image into one of a plurality of classes, and
performs, on the decoded image, the filter processing of applying the prediction equation including the tap coefficients of the class of the pixel of interest.

<9>
The decoding device according to any of <1> to <8>, in which
the decoding unit decodes the coded data with a Coding Unit (CU) of a Quad-Tree Block Structure or a Quad Tree Plus Binary Tree (QTBT) Block Structure as a unit of processing.

<10>
A decoding method including:
decoding coded data included in an encoded bit stream by using a filter image, to generate a decoded image; and
generating the filter image by performing, on the decoded image, filter processing of applying a prediction equation including a second-order or higher higher-order term and performing a product-sum calculation of predetermined tap coefficients and pixels of the decoded image.

<11>
An encoding device including:
a filter unit that generates a filter image by performing, on a decoded image locally decoded, filter processing of applying a prediction equation including a second-order or higher higher-order term and performing a product-sum calculation of predetermined tap coefficients and pixels of the decoded image; and
an encoding unit that encodes an original image by using the filter image generated by the filter unit.

<12>
The encoding device according to <11>, in which
the filter unit performs the filter processing on a pixel of interest among the pixels of the decoded image, by using a reduced prediction equation that is the prediction equation including some terms selected from an all combinations prediction equation that is the prediction equation including all candidate pixels predetermined as candidates for pixels to be prediction taps used in the calculation of the prediction equation.

<13>
The encoding device according to <12>, in which
the filter unit performs the filter processing by using the reduced prediction equation including a term of a pixel at a position close to the pixel of interest, the term being selected from the all combinations prediction equation.

<14>
The encoding device according to <12> or <13>, in which
the encoding unit generates an encoded bit stream including coded data obtained by encoding the original image, and selection information representing a selection pattern for selecting a term included in the reduced prediction equation.

<15>
The encoding device according to <12>, in which
the filter unit performs the filter processing by using the reduced prediction equation including the some terms selected depending on a selection pattern determined depending on encoding information regarding encoding of the original image from among a plurality of the selection patterns for selecting a term included in the reduced prediction equation.

<16>

The encoding device according to any of <11> to <15>, in which the filter unit determines, for each order, an expression format expressing with a predetermined bit depth a tap coefficient of a term of each order of the prediction equation.

<17>

The encoding device according to <16>, in which the filter unit determines an expression format having a greater bit depth representing after a decimal point than that of an expression format of a first-order term tap coefficient of the prediction equation, as an expression format of a second-order or higher higher-order term tap coefficient of the prediction equation.

<18>

The encoding device according to <16> or <17>, in which the encoding unit generates an encoded bit stream including coded data obtained by encoding the original image, and format information representing the expression format.

<19>

The encoding device according to any of <11> to <18>, in which the encoding unit generates an encoded bit stream including coded data obtained by encoding the original image, and the tap coefficients.

<20>

The encoding device according to any of <11> to <19>, in which the filter unit obtains the tap coefficients of each of a plurality of classes by using the decoded image and an original image for the decoded image, and performing, for each class, learning to statistically minimize a prediction error of a predicted value of the original image obtained by applying the prediction equation to the decoded image, performs class classification that classifies a pixel of interest among the pixels of the decoded image into one of the plurality of classes, and performs, on the decoded image, the filter processing of applying the prediction equation including the tap coefficients of the class of the pixel of interest.

<21>

The encoding device according to any of <11> to <20>, in which the encoding unit encodes the original image with a Coding Unit (CU) of a Quad-Tree Block Structure or a Quad Tree Plus Binary Tree (QTBT) Block Structure as a unit of processing.

<22>

An encoding method including:

generating a filter image by performing, on a decoded image locally decoded, filter processing of applying a prediction equation including a second-order or higher higher-order term and performing a product-sum calculation of predetermined tap coefficients and pixels of the decoded image; and encoding an original image by using the filter image.

REFERENCE SIGNS LIST

11 Encoding device
12 Decoding device
21 Encoding unit
23 Local decoding unit
24 Filter unit
31 Parsing unit
32 Decoding unit
33 Filter unit
41 Class classification unit
42 Learning unit
43 DB
44 Determination unit
45 DB
46 Prediction unit
51 Class classification unit
52 Prediction unit
100 Prediction device
101 Tap selection unit
102 Class classification unit
103 Coefficient acquisition unit
104 Prediction calculation unit
110 Learning device
111 Teacher image generation unit
112 Student image generation unit
113 Learning unit
121 Tap selection unit
122 Class classification unit
123 Addition unit
124 Coefficient calculation unit
130 Prediction device
131 Coefficient acquisition unit
140 Learning device
141 Parameter generation unit
142 Student image generation unit
143 Learning unit
151 Addition unit
152 Coefficient calculation unit
201 A/D conversion unit
202 Sort buffer
203 Calculation unit
204 Orthogonal transform unit
205 Quantization unit
206 Lossless encoding unit
207 Storage buffer
208 Inverse quantization unit
209 Inverse orthogonal transform unit
210 Calculation unit
211 ILF
212 Frame memory
213 Selection unit
214 Intra-prediction unit
215 Motion prediction compensation unit
216 Predicted image selection unit
217 Rate control unit
231 Learning device
232 Prediction device
241 Selection pattern setting unit
242 Learning unit
243 Determination unit
251 Tap selection unit
252 Class classification unit
253 Addition unit
254 Coefficient calculation unit
271 Tap selection unit
272 Class classification unit
273 Coefficient acquisition unit
274 Prediction calculation unit
281 Filter information storage unit
301 Storage buffer
302 Lossless decoding unit
303 Inverse quantization unit
304 Inverse orthogonal transform unit
305 Calculation unit
306 ILF 307 Sort buffer
308 D/A conversion unit
310 Frame memory
311 Selection unit
312 Intra-prediction unit
313 Motion prediction compensation unit
314 Selection unit
331 Prediction device
341 Tap selection unit
342 Class classification unit
343 Coefficient acquisition unit
344 Prediction calculation unit
345 Filter information storage unit
401 Bus
402 CPU
403 ROM
404 RAM
405 Hard disk
406 Output unit
407 Input unit
408 Communication unit
409 Drive
410 Input/output interface
411 Removable recording medium

The invention claimed is:

1. A decoding device, comprising:
   circuitry configured to:
   receive an encoded bit stream that includes coded data and a plurality of tap coefficients;
   decode the coded data based on a first filter image, to generate a decoded image; and
   execute filter processing on the decoded image to generate a second filter image, wherein the filter processing includes:
   application of a prediction equation including at least one of a second-order term or a higher-order term, wherein
   the second-order term includes a product of two prediction taps of a plurality of prediction taps,
   an order of the higher-order term is higher than an order of the second-order term, and
   the plurality of prediction taps corresponds to a plurality of pixels of the decoded image, and product-sum calculation of the plurality of tap coefficients and the plurality of prediction taps.

2. The decoding device according to claim 1, wherein
   the prediction equation corresponds to an all combinations prediction equation that includes a plurality of terms,
   the plurality of terms includes candidate pixels of the plurality of pixels as the plurality of prediction taps, and
   the circuitry is further configured to:
   select a set of terms of the plurality of terms of the all combinations prediction equation; and
   execute the filter processing on a pixel of interest among the plurality of pixels of the decoded image, based on a reduced prediction equation that includes the set of terms selected from the all combinations prediction equation.

3. The decoding device according to claim 2, wherein
   the circuitry is further configured to execute the filter processing based on the reduced prediction equation including a term of a pixel of the plurality of pixels,
   the pixel is at a position adjacent to the pixel of interest, and
   the term is from the plurality of terms of the all combinations prediction equation.

4. The decoding device according to claim 2, wherein
   the encoded bit stream further includes selection information representing a selection pattern for selection of a term of the set of terms in the reduced prediction equation, and
   the circuitry is further configured to:
   parse the selection information included in the encoded bit stream; and
   execute the filter processing based on the reduced prediction equation of the selection pattern represented by the parsed selection information.

5. The decoding device according to claim 2, wherein
   the encoded bit stream further includes encoding information regarding encoding of an original image,
   the circuitry is further configured to:
   determine, based on the encoding information, a selection pattern from a plurality of selection patterns;
   select the set of terms based on the selection pattern; and
   execute the filter processing based on the reduced prediction equation including the set of terms, and
   the plurality of selection patterns is for selection of a term of the plurality of terms for the reduced prediction equation.

6. The decoding device according to claim 1, wherein
   the encoded bit stream further includes format information representing an expression format,
   the expression format expresses with a specific bit depth a tap coefficient of the plurality of tap coefficients of the at least one of the second-order term or the higher-order term, and
   the circuitry is further configured to:
   parse the format information included in the encoded bit stream; and,
   execute the filter processing based on the prediction equation including the plurality of tap coefficients in the expression format represented by the parsed format information.

7. The decoding device according to claim 1, wherein the circuitry is further configured to:
   parse the plurality of tap coefficients included in the encoded bit stream; and
   execute the filter processing based on prediction equation including the parsed plurality of tap coefficients.

8. The decoding device according to claim 1, wherein the circuitry is further configured to:
   execute class classification that classifies a pixel of interest among the plurality of pixels of the decoded image into a class of a plurality of classes; and
   execute, on the decoded image, the filter processing that includes the application of the prediction equation including the plurality of tap coefficients of the class of the pixel of interest.

9. The decoding device according to claim 1, wherein
   the circuitry is further configured to decode the coded data with a Coding Unit (CU), and
   the CU includes one of a Quad-Tree Block Structure or a Quad Tree Plus Binary Tree (QTBT) Block Structure as a unit of processing.

10. A decoding method, comprising:
    receiving an encoded bit stream that includes coded data and a plurality of tap coefficients;
    decoding the coded data based on a first filter image, to generate a decoded image; and executing filter processing on the decoded image for generating a second filter image, wherein the filter processing includes:
applying a prediction equation including at least one of a second-order term or a higher-order term, wherein the second-order term includes a product of two prediction taps of a plurality of prediction taps,
an order of the higher-order term is higher than an order of the second-order term, and
the plurality of prediction taps corresponds to a plurality of pixels of the decoded image, and
executing product-sum calculation of the plurality of tap coefficients and the plurality of prediction taps.

11. An encoding device, comprising:
circuitry configured to:
acquire a locally decoded image;
execute filter processing on the locally decoded image to generate a filter image, wherein the filter processing includes:
application of a prediction equation including at least one of a second-order term or a higher-order term, wherein
the second-order term includes a product of two prediction taps of a plurality of prediction taps,
an order of the higher-order term is higher than an order of the second-order term, and
the plurality of prediction taps corresponds to a plurality of pixels of the locally decoded image, and
product-sum calculation of a plurality of tap coefficients and the plurality of prediction taps; and
encode an original image based on the filter image to obtain coded data.

12. The encoding device according to claim 11, wherein the prediction equation corresponds to an all combinations prediction equation that includes a plurality of terms,
the plurality of terms includes candidate pixels of the plurality of pixels as the plurality of prediction taps, and
the circuitry is further configured to:
select a set of terms of the plurality of terms of the all combinations prediction equation; and
execute the filter processing on a pixel of interest among the plurality of pixels of the locally decoded image, based on a reduced prediction equation that includes the set of terms selected from the all combinations prediction equation.

13. The encoding device according to claim 12, wherein the circuitry is further configured to execute the filter processing based on the reduced prediction equation including a term of a pixel of the plurality of pixels,
the pixel is at a position adjacent to the pixel of interest, and
the term is from the plurality of terms of the all combinations prediction equation.

14. The encoding device according to claim 12, wherein the circuitry is further configured to generate an encoded bit stream including:
the coded data obtained by the encoding of the original image, and
selection information representing a selection pattern for selection of a term of the plurality of terms for the reduced prediction equation.

15. The encoding device according to claim 12, wherein the circuitry is further configured to:
determine, based on encoding information regarding the encoding of the original image, a selection pattern from a plurality of selection patterns;
select the set of terms based on the selection pattern; and
execute the filter processing based on reduced prediction equation including the set of terms, and
the plurality of selection patterns is for selection of a term of the plurality of terms for the reduced prediction equation.

16. The encoding device according to claim 11, wherein the circuitry is further configured to determine, for the at least one of the second-order term or the higher-order term, an expression format expressing with a specific bit depth a tap coefficient of the plurality of tap coefficients of the at least one of the second-order term or the higher-order term.

17. The encoding device according to claim 16, wherein the circuitry is further configured to determine, as the expression format of the tap coefficient of the at least one of the second-order term or the higher-order term, an expression format having a bit depth, representing after a decimal point, greater than that of an expression format of a first-order term tap coefficient of the prediction equation.

18. The encoding device according to claim 16, wherein the circuitry is further configured to generate an encoded bit stream including:
the coded data obtained by the encoding of the original image, and
format information representing the expression format.

19. The encoding device according to claim 11, wherein the circuitry is further configured to generate an encoded bit stream including the coded data and the plurality of tap coefficients.

20. The encoding device according to claim 11, wherein the circuitry is further configured to:
obtain the plurality of tap coefficients of each of a plurality of classes based on the locally decoded image and a specific image for the locally decoded image;
execute, for each class of the plurality of classes, learning to statistically minimize a prediction error of a predicted value of the specific image, wherein the predicted value of the specific image is based on the application of the prediction equation to the locally decoded image;
execute class classification that classifies a pixel of interest among the plurality of pixels of the locally decoded image into a class of the plurality of classes; and
execute, on the locally decoded image, the filter processing that includes the application of the prediction equation including the plurality of tap coefficients of the class of the pixel of interest.

21. The encoding device according to claim 11, wherein the circuitry is further configured to encode the original image with a Coding Unit (CU), and
the CU includes one of a Quad-Tree Block Structure or a Quad Tree Plus Binary Tree (QTBT) Block Structure as a unit of processing.

22. An encoding method, comprising:
obtaining a locally decoded image;
executing filter processing on the locally decoded image for generating a filter image, wherein the filter processing includes:
applying a prediction equation including at least one of a second-order term or a higher-order term, wherein the second-order term includes a product of two prediction taps of a plurality of prediction taps, an order of the higher-order term is higher than an order of the second-order term, and the plurality of prediction taps corresponds to a plurality of pixels of the locally decoded image, and executing product-sum calculation of a plurality of tap coefficients and the plurality of prediction taps; and encoding an original image based on by using the filter image.

* * * * *